US011537645B2

(12) United States Patent
Galitsky

(10) Patent No.: US 11,537,645 B2
(45) Date of Patent: Dec. 27, 2022

(54) BUILDING DIALOGUE STRUCTURE BY USING COMMUNICATIVE DISCOURSE TREES

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 248 days.

(21) Appl. No.: 16/240,232

(22) Filed: Jan. 4, 2019

(65) Prior Publication Data

US 2019/0236085 A1 Aug. 1, 2019

Related U.S. Application Data

(60) Provisional application No. 62/746,261, filed on Oct. 16, 2018, provisional application No. 62/729,335, (Continued)

(51) Int. Cl.
*G06F 16/332* (2019.01)
*G06F 16/31* (2019.01)
(Continued)

(52) U.S. Cl.
CPC ........ *G06F 16/3329* (2019.01); *G06F 16/322* (2019.01); *G06F 16/3349* (2019.01); (Continued)

(58) Field of Classification Search
CPC .............. G06F 16/3329; G06F 16/322; G06F 16/3349; G06F 40/35; G06K 9/6276; (Continued)

(56) References Cited

U.S. PATENT DOCUMENTS 5,495,605 A * 2/1996 Cadot ............... G06F 16/24537
6,112,168 A 8/2000 Corston et al.
(Continued)

FOREIGN PATENT DOCUMENTS

WO 2015089822 6/2015

OTHER PUBLICATIONS

International Application No. PCT/US2019/031580, International Preliminary Report on Patentability, dated Nov. 19, 2020, 8 pages.
(Continued)

*Primary Examiner* — Hicham Skhoun
(74) *Attorney, Agent, or Firm* — Kilpatrick Townsend & Stockton LLP

(57) ABSTRACT

Systems, devices, and methods of the present invention detect rhetoric agreement between texts. In an example, a rhetoric agreement application accesses a multi-part initial query and generates a question communicative discourse tree that represents rhetorical relationships between fragments of the query. The application identifies a sub-discourse tree from the question communicative discourse tree. The application generates a candidate answer communicative discourse tree for each candidate answer of a set of candidate answers. The application computes a level of complementarity between the sub-discourse tree and each candidate answer discourse tree by applying a classification model to the sub-discourse tree and candidate answer communicative discourse trees. The application selects an answer from the candidate answers based on the computed complementarity, thereby building a dialogue structure of an interactive session.

16 Claims, 21 Drawing Sheets

FIG. 1

Related U.S. Application Data filed on Sep. 10, 2018, provisional application No. 62/646,759, filed on Mar. 22, 2018, provisional application No. 62/623,996, filed on Jan. 30, 2018.

(51) Int. Cl.
  *G06K 9/62* (2022.01)
  *G06F 16/33* (2019.01)
  *G10L 15/08* (2006.01)
  *G06N 20/10* (2019.01)

(52) U.S. Cl.
  CPC ........... *G06K 9/6276* (2013.01); *G06N 20/10* (2019.01); *G10L 15/08* (2013.01)

(58) Field of Classification Search
  CPC ........ G10L 15/08; G06N 20/10; G06N 5/003; G06N 5/022; G06N 3/006
  USPC .......................................................... 707/736
  See application file for complete search history.

(56) References Cited

U.S. PATENT DOCUMENTS

| | | | |
|---|---|---|---|
| 6,181,909 B1 | 1/2001 | Burstein et al. | |
| 6,675,159 B1* | 1/2004 | Lin ....................... | G06F 16/353 |
| 6,731,307 B1 | 5/2004 | Strubbe et al. | |
| 7,152,031 B1* | 12/2006 | Jensen ................ | G06F 16/3344 |
| | | | 704/10 |
| 7,519,529 B1* | 4/2009 | Horvitz ................ | G06F 16/35 |
| | | | 704/7 |
| 7,840,556 B1* | 11/2010 | Dayal ................. | G06F 16/2453 |
| | | | 707/721 |
| 9,037,464 B1* | 5/2015 | Mikolov ............... | G10L 15/06 |
| | | | 704/255 |
| 9,292,490 B2* | 3/2016 | Kimelfeld ............ | G06F 40/205 |
| 9,449,080 B1 | 9/2016 | Zhang | |
| 9,559,993 B2 | 1/2017 | Palakovich et al. | |
| 9,582,501 B1 | 2/2017 | Salmon et al. | |
| 9,646,078 B2 | 5/2017 | Galitsky et al. | |
| 10,019,716 B1 | 7/2018 | Ainslie et al. | |
| 10,599,885 B2 | 3/2020 | Galitsky | |
| 10,679,011 B2 | 6/2020 | Galitsky | |
| 10,796,099 B2 | 10/2020 | Galitsky et al. | |
| 10,796,102 B2 | 10/2020 | Galitsky | |
| 10,817,670 B2 | 10/2020 | Galitsky | |
| 10,839,154 B2 | 11/2020 | Galitsky | |
| 10,853,581 B2 | 12/2020 | Galitsky | |
| 11,100,144 B2 | 8/2021 | Galitsky | |
| 11,328,016 B2 | 5/2022 | Galitsky | |
| 11,347,946 B2 | 5/2022 | Galitsky | |
| 11,373,632 B2 | 6/2022 | Galitsky | |
| 11,386,274 B2 | 7/2022 | Galitsky | |
| 2001/0007987 A1 | 7/2001 | Igata | |
| 2001/0053968 A1* | 12/2001 | Galitsky ................ | G06F 16/38 |
| | | | 704/9 |
| 2002/0040292 A1 | 4/2002 | Marcu | |
| 2002/0046018 A1* | 4/2002 | Marcu ..................... | G06F 40/35 |
| | | | 704/9 |
| 2003/0138758 A1 | 7/2003 | Burstein et al. | |
| 2004/0044519 A1 | 3/2004 | Polanyi et al. | |
| 2004/0148170 A1 | 7/2004 | Acero et al. | |
| 2005/0086592 A1 | 4/2005 | Polanyi et al. | |
| 2005/0108001 A1* | 5/2005 | Aarskog ............... | G06F 40/253 |
| | | | 704/10 |
| 2007/0073533 A1* | 3/2007 | Thione .................... | G06F 40/35 |
| | | | 704/9 |
| 2007/0136284 A1 | 6/2007 | Cobb et al. | |
| 2007/0192306 A1 | 8/2007 | Papakonstantinou et al. | |
| 2007/0294229 A1 | 12/2007 | Au | |
| 2008/0172409 A1* | 7/2008 | Botros ................ | G06F 16/9038 |
| 2008/0228467 A1* | 9/2008 | Womack ................ | G06F 40/30 |
| | | | 704/9 |
| 2009/0089252 A1* | 4/2009 | Galitsky ............... | G06F 16/245 |
| 2009/0100053 A1 | 4/2009 | Boschee et al. | |
| 2009/0248399 A1 | 10/2009 | Au | |
| 2009/0282019 A1* | 11/2009 | Galitsky ............... | G06F 40/279 |
| 2010/0169359 A1 | 7/2010 | Barrett et al. | |
| 2011/0119049 A1 | 5/2011 | Ylonen | |
| 2011/0153673 A1 | 6/2011 | Boschee et al. | |
| 2012/0041950 A1* | 2/2012 | Koll .................. | G06F 16/90332 |
| | | | 707/728 |
| 2012/0078902 A1* | 3/2012 | Duboue ................ | G06F 16/334 |
| | | | 707/736 |
| 2013/0046757 A1 | 2/2013 | Salvetti et al. | |
| 2013/0204611 A1 | 8/2013 | Tsuchida et al. | |
| 2014/0040288 A1* | 2/2014 | Galitsky ........... | G06F 16/24578 |
| | | | 707/755 |
| 2014/0122083 A1 | 5/2014 | Xiaojiang | |
| 2014/0136188 A1* | 5/2014 | Wroczynski .......... | G06F 40/284 |
| | | | 704/9 |
| 2015/0039295 A1 | 2/2015 | Soschen | |
| 2015/0046492 A1 | 2/2015 | Balachandran | |
| 2015/0051900 A1* | 2/2015 | Kimelfeld ............ | G06F 40/205 |
| | | | 704/9 |
| 2015/0149461 A1 | 5/2015 | Aguilar Lemarroy et al. | |
| 2015/0161512 A1* | 6/2015 | Byron .................... | G06N 20/00 |
| | | | 706/12 |
| 2016/0034457 A1 | 2/2016 | Bradley et al. | |
| 2016/0055240 A1 | 2/2016 | Tur et al. | |
| 2016/0085743 A1 | 3/2016 | Haley | |
| 2016/0086601 A1 | 3/2016 | Chotimongkol et al. | |
| 2016/0099892 A1* | 4/2016 | Palakovich ............. | H04L 51/02 |
| | | | 709/206 |
| 2016/0232152 A1 | 8/2016 | Mahamood | |
| 2016/0245779 A1 | 8/2016 | Khalaj Amineh et al. | |
| 2016/0246779 A1 | 8/2016 | Ho et al. | |
| 2016/0247068 A1* | 8/2016 | Lin ......................... | G06N 5/02 |
| 2017/0032053 A1 | 2/2017 | LeTourneau | |
| 2017/0116982 A1 | 4/2017 | Gelfenbeyn et al. | |
| 2017/0228368 A1 | 8/2017 | Carter et al. | |
| 2017/0286390 A1 | 10/2017 | Yashpe et al. | |
| 2018/0181648 A1 | 6/2018 | Chen | |
| 2018/0189385 A1* | 7/2018 | Sun .................. | G06F 16/24578 |
| 2018/0314689 A1 | 11/2018 | Wang et al. | |
| 2018/0365228 A1 | 12/2018 | Galitsky | |
| 2018/0365593 A1 | 12/2018 | Galitsky | |
| 2018/0373701 A1* | 12/2018 | McAteer ............. | G06F 16/9024 |
| 2019/0005027 A1 | 1/2019 | He et al. | |
| 2019/0057157 A1 | 2/2019 | Mandal et al. | |
| 2019/0103111 A1 | 4/2019 | Tiwari et al. | |
| 2019/0163756 A1* | 5/2019 | Bull .................. | G06F 16/24535 |
| 2019/0354544 A1* | 11/2019 | Hertz .................... | G06N 20/10 |

OTHER PUBLICATIONS

U.S. Appl. No. 15/975,683, "Non-Final Office Action", dated Oct. 31, 2019, 27 pages.
U.S. Appl. No. 15/975,685, "Non-Final Office Action", dated Nov. 15, 2019, 23 pages.
U.S. Appl. No. 16/010,091, "Non-Final Office Action", dated Nov. 18, 2019, 26 pages.
U.S. Appl. No. 16/010,141, "Non-Final Office Action", dated Feb. 24, 2020, 12 pages.
U.S. Appl. No. 16/010,156, "Notice of Allowance", dated Feb. 6, 2020, 13 pages.
U.S. Appl. No. 16/010,156, "Notice of Allowance", dated Nov. 7, 2019, 13 pages.
U.S. Appl. No. 16/145,702, "Non-Final Office Action", dated Feb. 5, 2020, 30 pages.
Artooras et al., "Stanford NLP-VP vs NP", Stack Overflow Website, Available online at: https://stackoverflow.com/questions/35872324/stanford-nlp-vp-vs-np/35887762, Mar. 8-9, 2016, 2 pages.
Galitsky et al., "Style and Genre Classification by Means of Deep Textual Parsing", Computational Linguistics and Intellectual Technologies: Proceedings of the International Conference "Dialogue 2016", Jun. 2016, pp. 1-45.
Kittredge et al., "An Advanced English Grammar with Exercises", The Athenaeum Press, 1913.

(56) References Cited

OTHER PUBLICATIONS

Marcu et al., "An Unsupervised Approach to Recognizing Discourse Relations", Proceedings of the 40th Annual Meeting of the Association for Computational Linguistics (ACL), 2002, 8 pages.
Tai et al., "Improved Semantic Representations from Tree-Structured Long Short-Term Memory Networks", Available Online at: https://arxiv.org/pdf/1503.00075.pdf, May 30, 2015, 11 pages.
Galitsky et al., Chatbot with a Discourse Structure-Driven Dialogue Management, Proceedings of the Software Demonstrations of the 15th Conference of the European Chapter of the Association for Computational Linguistics Available on Internet at: https://pdfs.semanticscholar.org/439f/cbe14dbc84b694bae2ee42a914d743126d12.pdf, Apr. 2017, pp. 87-90.
U.S. Appl. No. 15/975,683, Non-Final Office Action, dated Mar. 19, 2020, 16 pages.
U.S. Appl. No. 15/975,683, Notice of Allowance, dated Jun. 12, 2020, 17 pages.
U.S. Appl. No. 15/975,685, Non-Final Office Action, dated Apr. 1, 2020, 23 pages.
U.S. Appl. No. 15/975,685, Notice of Allowance, dated Jul. 24, 2020, 17 pages.
U.S. Appl. No. 16/010,091, Notice of Allowance, dated Mar. 19, 2020, 13 pages.
U.S. Appl. No. 16/010,141, Final Office Action, dated Jul. 30, 2020, 14 pages.
U.S. Appl. No. 16/145,702, Final Office Action, dated May 6, 2020, 19 pages.
U.S. Appl. No. 16/145,702, Notice of Allowance, dated Jul. 1, 2020, 15 pages.
U.S. Appl. No. 16/145,777, Non-Final Office Action, dated Apr. 3, 2020, 18 pages.
U.S. Appl. No. 16/145,777, Notice of Allowance, dated Jul. 15, 2020, 17 pages.
U.S. Appl. No. 16/260,930, Non-Final Office Action, dated Aug. 12, 2020, 9 pages.
U.S. Appl. No. 16/260,939, Non-Final Office Action, dated May 1, 2020, 10 pages.
U.S. Appl. No. 16/260,939, Notice of Allowance, dated Jun. 12, 2020, 14 pages.
Galitsky et al., "Discourse-level Dialogue Management", In Developing Enterprise Chatbots: Springer Nature, 2019, pp. 365-387.
Galitsky et al., "Finding Maximal Common Sub-Parse Thickets for Multi-Sentence Search", IJCAI Workshop on Graphs and Knowledge Representation, IJCAI, 2013, 19 pages.
Galitsky et al., "Text Classification Based on Deep Textual Parsing", Available Online at: http://ceur-ws.org/Vol-1886/paper_8.pdf, 2011, 9 pages.
Hara et al., "Exploring Difficulties in Parsing Imperatives and Questions", Proceedings of the 5th International Joint Conference on Natural Language Processing, Nov. 8-13, 2011, pp. 749-757.
Johnson et al., "The FrameNet Tagset for Frame-Semantic and Syntactic Coding of Predicate-Argument Structure", Proceedings of the First Meeting of the North American Chapter of the Association for Computational Linguistics, Apr. 2000, pp. 56-62.
Mikolov et al., "Distributed Representations of Phrases and Their Compositionality", Proceedings of the 26th International Conference on Neural Information Processing Systems, vol. 2, Dec. 5-10, 2013, pp. 1-9.
International Application No. PCT/US2018/053392, International Preliminary Report on Patentability, dated Apr. 9, 2020, 7 pages.
International Application No. PCT/US2019/015696, International Preliminary Report on Patentability, dated Aug. 13, 2020, 8 pages.
2009 Annual Study: Global Cost of a Data Breach, Ponemon Institute, LLC, PGP, Apr. 2010, 36 pages.
Data Loss Prevention, Trend Micro, Available online at: http://www.trendmicro.co.in/cloud-content/us/pdfs/business/datasheets/ds_data-loss-prevention.pdf, 2010, 2 pages.
Data Loss Prevention Products & Services, Symantec, Available online at: http://www.symantec.com/business/theme.jsp?themeid=vontu, Accessed from Internet on Aug. 30, 2018, 6 pages.

Exploring Dialog Management for Bots, Chatbots Magazine, Available online at: https://chatbotsmagazine.com/exploring-dialog-management-for-bots-cbb8665a2fd3, Jul. 11, 2016, 7 pages.
Global Security Report 2010, Trustwave, Available online at: https://www.trustwave.com/Resources/Library/Documents/2010-Trustwave-Global-Security-Report/, 2010, 49 pages.
Ignore, Deny, Downplay: Accounts of Syrians from Douma Have No Place in Western Narrative, Russia Today, Available online at: https://www.rt.com/news/425438-douma-witnesses-gas-attack-syria/, Apr. 28, 2018, 8 pages.
Language Data, Yahoo Labs, Available online at: https://webscope.sandbox.yahoo.com/catalog.php?datatype=l&guccounter=1, Accessed from Internet on Aug. 19, 2019, 5 pages.
Malaysia Airlines Flight 17, Wikipedia, 2016, 38 pages.
Shadow Chairman of Investigative Committee, Crime Russia, Available online at: https://crimerussia.com/corruption/tenevoy-direktor-skr/, Aug. 25, 2016, 5 pages.
Welcome to Apache Lucene, Apache Lucene 7.5.0 and Apache Solr 7.5.0, Available online at: www.lucene.apache.org, Sep. 24, 2018, 38 pages.
U.S. Appl. No. 16/145,702, Final Office Action, dated Sep. 10, 2019, 25 pages.
U.S. Appl. No. 16/145,702, First Action Interview Office Action Summary dated Apr. 29, 2019, 8 pages.
U.S. Appl. No. 16/145,702, First Action Interview Pilot Program Pre-Interview Communication dated Feb. 7, 2019, 6 pages.
Airenti et al., Conversation and Behavior Games in the Pragmatics of Dialogue, Cognitive Science, vol. 17, No. 2, Apr.-Jun. 1993, pp. 197-256.
Allen et al., Analyzing Intention in Utterances, Artificial Intelligence, vol. 15, No. 3, Dec. 1980, pp. 143-178.
Bengio et al., A Neural Probabilistic Language Model, Journal of Machine Learning Research, vol. 3, Feb. 3, 2003, pp. 1137-1155.
Blaylock, Managing Communicative Intentions in Dialogue Using a Collaborative Problem-Solving Model, The University of Rochester, Computer Science Department, Technical Report 774, Apr. 2002, 56 pages.
Blaylock et al., Managing Communicative Intentions with Collaborative Problem Solving, Current and New Directions in Discourse and Dialogue, 2003, pp. 63-84.
Boyer et al., MJRTY-A Fast Majority Vote Algorithm, Chapter 5, Automated Reasoning, 1991, pp. 105-117.
Carlson et al., Discourse Tagging Reference Manual, Available Online at: https://www.isi.edu/~marcu/discourse/tagging-ref-manual.pdf, Sep. 11, 2001, 87 pages.
Chali et al., Complex Question Answering: Unsupervised Learning Approaches and Experiments, Journal of Artificial Intelligence Research, vol. 35, May 2009, pp. 1-47.
Chen, Understanding Mental States in Natural Language, Proceedings of the 8th International Conference on Computational Semantics, Jan. 2009, pp. 61-72.
Cohen, Enron Email Dataset, Available online at: https://www.cs.cmu.edu/~enron/, Aug. 21, 2009, 1 page.
Cohen et al., Intention is Choice with Commitment, Artificial Intelligence, vol. 42, Nos. 2-3, Mar. 1990, pp. 213-261.
Collins et al., "New Ranking Algorithms for Parsing and Tagging: Kernels Over Discrete Structures, and The Voted Perceptron", Proceedings of the 40th Annual Meeting of the Association for Computational Linguistics (ACL), Philadelphia, Jul. 2002, pp. 263-270.
Cristea et al., Veins Theory: A Model of Global Discourse Cohesion and Coherence, In C. Boitet & P. Whitelock (Eds.), 17th International Conference on Computational Linguistics, 1998, pp. 281-285.
Croft et al., Search Engines-Information Retrieval in Practice, Pearson Education, 2010, 542 pages.
De Boni, Using Logical Relevance for Question Answering, Journal of Applied Logic, vol. 5, No. 1, Mar. 2007, pp. 92-103.
De Mori et al., Spoken Language Understanding, IEEE Signal Processing Magazine, vol. 25, No. 3, May 2008, pp. 50-58.
Dijkstra, Programming Considered as a Human Activity, Proc. IFIP Congress, 1965, 7 pages.

(56) References Cited

OTHER PUBLICATIONS

Ebrahim, NLP Tutorial Using Python NLTK (Simple Examples), Available Online at https://dzone.com/articles/nlp-tutorial-using-python-nltk-simple-examples, Sep. 24, 2017, pp. 1-10.

Endres-Niggemeyer et al., Summarizing Text for Intelligent Communication, Dagstuhl Seminar Report 79, 1995, 36 pages.

Feng et al., A Linear-Time Bottom-Up Discourse Parser with Constraints and Post-Editing, In Proceedings of the 52nd Annual Meeting of the Association for Computational Linguistics, Jun. 23-25, 2014, pp. 511-521.

Feng et al., Classifying Arguments by Scheme, In Proceedings of the 49th Annual Meeting of the Association for Computational Linguistics, vol. 1, Jun. 19-24, 2011, pp. 987-996.

Feng et al., Distributional Footprints of Deceptive Product Reviews, Proceedings of the Sixth International AAAI Conference on Weblogs and Social Media, The AAAI Press, Jan. 2012, pp. 98-105.

Feng, RST-Style Discourse Parsing and Its Applications in Discourse Analysis, University of Toronto, Jun. 2015, 189 pages.

Feng et al., Syntactic Stylometry for Deception Detection, In ACL 12, Proceedings of the 50th Annual Meeting of the Association for Computational Linguistics, Jul. 8-14, 2012, pp. 171-175.

Ferraiolo et al., Role-Based Access Controls, Proceedings of the 15th NIST-NSA National Computer Security Conference, Oct. 13-16, 1992, pp. 554-563.

Ferretti et al., A Possibilistic Defeasible Logic Programming Approach to Argumentation based Decision-making, Journal of Experimental & Theoretical Artificial Intelligence, vol. 26, No. 4, Jun. 10, 2014, pp. 519-550.

Finn, A Question Writing Algorithm, Journal of Reading Behavior, VII, vol. 4, 1975, pp. 341-367.

Fornaciari et al., Identifying Fake Amazon Reviews as Learning from Crowds, In Proceedings of the 14th Conference of the European Chapter of the Association for Computational Linguistics, Apr. 26-30, 2014, pp. 279-287.

Galitsky et al., Concept-Based Learning of Human Behavior for Customer Relationship Management, Information Sciences, vol. 181, No. 10, May 15, 2011, pp. 2016-2035.

Galitsky, Discovering Rhetorical Agreement between a Request and Response, Dialogue & Discourse, vol. 8, No. 2, Dec. 1, 2017, pp. 167-205.

Galitsky et al., Improving Text Retrieval Efficiency with Pattern Structures on Parse Thickets, Formal Concept Analysis Meets Information Retrieval, ECIR, 2013, 16 pages.

Galitsky et al., Improving Trust in Automation of Social Promotion, Association for the Advancement of Artificial Intelligence, 2014, pp. 28-35.

Galitsky et al., Inferring the Semantic Properties of Sentences by Mining Syntactic Parse Trees, Data & Knowledge Engineering, vols. 81-82, Nov.-Dec. 2012, 44 pages.

Galitsky et al., Learning Communicative Actions of Conflicting Human Agents, Journal of Experimental & Theoretical Artificial Intelligence, vol. 20, No. 4, Dec. 2008, pp. 277-317.

Galitsky, Learning Noisy Discourse Trees, Computational Linguistics and Intellectual Technologies, Proceedings of the International Conference, Dialogue 2017. Available online at: http://www.dialog-21.ru/media/3911/galitskyb.pdf, May 31-Jun. 3, 2017, 14 pages.

Galitsky, Learning Parse Structure of Paragraphs and its Applications in Search, Engineering Applications of Artificial Intelligence, vol. 32, Jun. 2014, pp. 160-184.

Galitsky, Machine Learning of Syntactic Parse Trees for Search and Classification of Text, Engineering Applications of Artificial Intelligence, vol. 26, No. 3, Mar. 2013, pp. 1072-1091.

Galitsky, Matching Parse Thickets for Open Domain Question Answering, Data & Knowledge Engineering, vol. 107, Dec. 9, 2016, pp. 24-50.

Galitsky, Natural Language Question Answering System, Technique of Semantic Headers, Advanced Knowledge International, vol. 2, Apr. 2003, 333 pages.

Galitsky et al., On a Chat Bot Finding Answers with Optimal Rhetoric Representation, RANLP-Recent Advances in Natural Language Processing Meet Deep Learning, Nov. 10, 2017, pp. 253-259.

Galitsky et al., Parse Thicket Representations for Answering Multi-Sentence Search, International Conference on Conceptual Structures, 2013, 13 pages.

Galitsky et al., Rhetoric Map of an Answer to Compound Queries, In Proceedings of the 53rd Annual Meeting of the 20 Association for Computational Linguistics and the 7th International Joint Conference of Natural Language Processing, Jul. 26-31, 2015, pp. 681-686.

Galitsky et al., Text Classification into Abstract Classes Based on Discourse Structure, Proceedings of Recent Advances in Natural Language Processing, Sep. 7-9, 2015, pp. 200-207.

Galitsky et al., Text Integrity Assessment: Sentiment Profile vs Rhetoric Structure, CICLing, Springer International Publishing, Apr. 14-20, 2015, pp. 126-139.

Galitsky, Using Extended Tree Kernels to Recognize Metalanguage in Text, Studies in Computational Intelligence, Feb. 2017, 26 pages.

Grefenstette et al., Multi-Step Regression Learning for Compositional Distributional Semantics, In Proceedings of the 26 Tenth International Conference on Computational Semantics. Association for Computational Linguistics, Mar. 2013, 11 pages.

Grefenstette, Towards a Formal Distributional Semantics: Simulating Logical Calculi with Tensors, University of Oxford, Apr. 2013, 10 pages.

Grosz et al., Attention, Intentions, and the Structure of Discourse, Computational Linguistics, vol. 12, No. 3, Jul.-Sep. 1986, pp. 175-204.

Grosz et al., Discourse Analysis, in Understanding Spoken Language, Elsevier North-Holland, 1978, pp. 234-268.

Hai et al., Deceptive Review Spam Detection via Exploiting Task Relatedness and Unlabeled Data, In Proceedings of the 2016 Conference on Empirical Methods in Natural Language Processing, Nov. 1-5, 2016, pp. 1817-1826.

Hart et al., Text Classification for Data Loss Prevention, Proceedings of the 11th International Conference on Privacy Enhancing Technologies, Hewlett-Packard Development Company, L.P., Jul. 27-29, 2011, 21 pages.

Haussler, Convolution Kernels on Discrete Structures UCSC-CRL-99-10, UCSB Technical Report, Jul. 8, 1999, 38 pages.

Hernault et al., A Sequential Model for Discourse Segmentation, Proceedings of the 11th International Conference on Computational Linguistics and Intelligent Text Processing, Mar. 21-27, 2010, pp. 315-326.

Houngbo et al., An Automated Method to Build A Corpus of Rhetorically-Classified Sentences in Biomedical Texts, Proceedings of the First Workshop on Argumentation Mining, Association for Computational Linguistics, Jun. 26, 2014, pp. 19-23.

Iruskieta et al., A Qualitative Comparison Method for Rhetorical Structures: Identifying Different Discourse Structures in Multilingual Corpora, Lang Resources & Evaluation, vol. 49, No. 2, May 8, 2014, 47 pages.

Jansen et al., Discourse Complements Lexical Semantics for Nonfactoid Answer Reranking, In Proceedings of the 52nd Annual Meeting of the Association for Computational Linguistics, Jun. 23-25, 2014, pp. 977-986.

John et al., Estimating Continuous Distributions in Bayesian Classifiers, Proceedings of the Eleventh Conference on Uncertainty in Artificial Intelligence, 1995, pp. 338-345.

Joty et al., A Novel Discriminative Framework for Sentence-Level Discourse Analysis, Proceedings of the Joint Conference on Empirical Methods in Natural Language Processing and Computational Natural Language Learning, Jul. 12-14, 2012, pp. 904-915.

Joty et al., CODRA: A Novel Discriminative Framework for Rhetorical Analysis, Computational Linguistics, vol. 41, No. 3, Mar. 18, 2015, pp. 385-435.

Joty et al., Combining Intra- and Multi-Sentential Rhetorical Parsing for Document-Level Discourse Analysis, 51st Annual Meeting of the Association for Computational Linguistics, Aug. 4-9, 2013, pp. 486-496.

(56) References Cited

OTHER PUBLICATIONS

Joty et al., Discriminative Reranking of Discourse Parses Using Tree Kernels, Proceedings of the 2014 Conference on Empirical Methods in Natural Language Processing, Oct. 25-29, 2014, pp. 2049-2060.
Jurafsky et al., Speech and Language Processing: An Introduction to Natural Language Processing, Computational Linguistics, and Speech Recognition, Pearson, Prentice Hall, 2000, pp. 719-761.
Kate et al., Learning to Transform Natural to Formal Languages, Proceedings of the 20th National Conference on Artificial Intelligence, Jul. 2005, pp. 1062-1068.
Kipper et al., A Large-Scale Classification of English Verbs, Language Resources and Evaluation, vol. 42, No. 1, Mar. 2008, pp. 21-40.
Kipper et al., VerbNet Overview, Extensions, Mappings and Applications, Proceedings of Human Language Technologies, Annual Conference of the North American Chapter of the Association for Computational Linguistics, Companion, vol. Tutorial Abstracts, Jun. 2009, pp. 13-14.
Kirschner et al., Linking the Thoughts: Analysis of Argumentation Structures in Scientific Publications, Proceedings of the 2nd Workshop on Argumentation Mining, Jun. 4, 2015, pp. 1-11.
Klennera, Model For Multi-Perspective Opinion Inferences, Proceedings of IJCAI Workshop Natural Language Meets Journalism, Jul. 9, 2016, pp. 6-11.
Kohavia, Study of Cross-Validation and Bootstrap for Accuracy Estimation and Model Selection, International Joint Conference on Artificial Intelligence, Aug. 1995, pp. 1137-1143.
Kong et al., Improve Tree Kernel-Based Event Pronoun Resolution with Competitive Information, Proceedings of the Twenty-Second International Joint Conference on Artificial Intelligence, vol. 3, Jul. 16-22, 2011, pp. 1814-1819.
Kontos et al., Question Answering and Rhetoric Analysis of Biomedical Texts in the Aroma System, National and 42 Kapodistrian University of Athens, Unpublished Manuscript, 2006, 6 pages.
Levinson, Presumptive Meanings: The Theory of Generalized Conversational Implicature, Cambridge, MA: The MIT Press, 2000, 10 pages.
Li et al., Recursive Deep Models for Discourse Parsing, Computer Science Department, Jan. 2014, 10 pages.
Lin et al., Recognizing Implicit Discourse Relations in the Penn Discourse Treebank, Proceedings of the Conference on Empirical Methods in Natural Language Processing, vol. 1, Aug. 6-7, 2009, pp. 343-351.
Litman et al., A Plan Recognition Model for Subdialogues in Conversations, Cognitive Science, vol. 11, No. 2, Apr. 1987, pp. 163-200.
Lowe et al., On the Evaluation of Dialogue Systems with Next Utterance Classification, Proceedings of the 17th Annual Meeting of the Special Interest Group on Discourse and Dialogue, Available online at: https://arxiv.org/pdf/1605.05414.pdf, Jul. 23, 2016, 6 pages.
Makhalova et al., Pattern Structures for News Clustering, Proceedings of the 4th International Conference on What can FCA do for Artificial Intelligence, vol. 1430, Jan. 2015, pp. 35-42.
Mann et al., Discourse Structures for Text Generation, Proceedings of the 10th International Conference on Computational Linguistics and 22nd annual meeting on Association for Computational Linguistics, Jul. 2-6, 1984, pp. 367-375.
Mann et al., Rhetorical Structure Theory and Text Analysis, University of Southern California, Nov. 1989, 66 pages.
Mann et al., Rhetorical Structure Theory: Towards a Functional Theory of Text Organization, Text-Interdisciplinary Journal for the Study of Discourse, vol. 8, No. 3, Jan. 1988, pp. 243-281.
Mercier et al., Why Do Humans Reason? Arguments for an Argumentative Theory, Behavioral and Brain Sciences, vol. 34, No. 2, Apr. 2011, pp. 57-111.
Mikolov et al., Distributed Representations of Words Phrases and their Compositionality, Advances on Neural Information Processing Systems, Oct. 2013, pp. 1-9.
Mitchell et al., Composition in Distributional Models of Semantics, Cognitive Science, vol. 34, No. 8, Mar. 25, 2010, pp. 1388-1429.
Mitocariu et al., Comparing Discourse Tree Structures, Computational Linguistics and Intelligent Text Processing: 14th International Conference, vol. 7816, Mar. 24-30, 2013, 11 pages.
Mochales et al., Argumentation Mining, Artificial Intelligence and Law, vol. 19, No. 1, Mar. 2011, pp. 1-22.
Mukherjee et al., Fake Review Detection: Classification and Analysis of Real and Pseudo Reviews, Technical Report, Department of Computer Science, 2013, 11 pages.
Mukherjee et al., What Yelp Fake Review Filter Might Be Doing?, Proceedings of the Seventh International AAAI Conference on Weblogs and Social Media, Jan. 2013, pp. 409-418.
Ott et al., Finding Deceptive Opinion Spam by Any Stretch of the Imagination, Proceedings of the 49th Annual Meeting of the Association for Computational Linguistics, vol. 1, Jun. 19-24, 2011, pp. 309-319.
Ott et al., Negative Deceptive Opinion Spam, Proceedings of the Conference of the North American Chapter of the Association for Computational Linguistics, Jun. 9-14, 2013, pp. 497-501.
International Application No. PCT/US2018/031890, International Search Report and Written Opinion dated Aug. 17, 2018, 12 pages.
International Application No. PCT/US2018/053392, International Search Report and Written Opinion dated Dec. 17, 2018, 11 pages.
International Application No. PCT/US2019/015696, International Search Report and Written Opinion dated Apr. 23, 2019, 12 pages.
International Application No. PCT/US2019/031580, International Search Report and Written Opinion dated Jul. 5, 2019, 12 pages.
Peldszus et al., From Argument Diagrams to Argumentation Mining in Texts: A Survey, International Journal of Cognitive Informatics and Natural Intelligence, vol. 7, No. 1, Jan. 2013, pp. 1-31.
Pendyala et al., Towards a Truthful World Wide Web from a Humanitarian Perspective, IEEE 2015 Global Humanitarian Technology Conference, Oct. 8-11, 2015, 7 pages.
Ponti, Machine Learning Techniques Applied To Dependency Parsing, University of Pavia, Available Online at: https://vision.unipv.it/AI/AIRG/MachineLearningTechniquesAppliedToDependencyParsingRevised.pdf, Oct. 2015, 45 pages.
Popescu et al., Logic-Based Rhetorical Structuring for Natural Language Generation in Human-Computer Dialogue, Proceedings of the 10th International Conference on Text, Speech and Dialogue, Sep. 3-7, 2007, pp. 309-317.
Popescu-Belis, Dialogue Acts: One or More Dimensions?, ISSCO Working Paper No. 62, University of Geneva, Nov. 2005, 46 pages.
Radev, A Common Theory of Information Fusion from Multiple Text Sources Step One: Cross-document Structure, Proceedings of the 1st SIGDial Workshop on Discourse and Dialogue, vol. 10, Oct. 7-8, 2000, pp. 74-83.
Radev et al., Centroid-Based Summarization of Multiple Documents: Sentence Extraction, Utility-Based Evaluation, 60 and User Studies, Proceedings of the NAACL-ANLP Workshop on Automatic Summarization, vol. 4, 2000, 10 pages.
Rayana et al., Collective Opinion Spam Detection: Bridging Review Networks and Metadata, Proceedings of the 21st ACM SIGKDD International Conference on Knowledge Discovery and Data Mining, Aug. 11-14, 2015, 10 pages.
Recasens et al., The Life and Death of Discourse Entities: Identifying Singleton Mentions, Proceedings of NAACL-HLT, Jun. 9-14, 2013, pp. 627-633.
Reed et al., Language Resources for Studying Argument, Proceedings of the 6th Conference on Language Resources and Evaluation, LREC2008, ELRA, 2010, pp. 2613-2618.
Reichman, Getting Computers to Talk Like You and Me, Discourse Context, Focus and Semantics (An ATN Model), MIT Press, Jul. 1985, pp. 35-49.
Salton et al., On the Specification of Term Values in Automatic Indexing, Journal of Documentation, vol. 29, No. 4, Apr. 1973, pp. 351-372.
Salton et al., Term Weighting Approaches in Automatic Text Retrieval, Information Processing & Management, vol. 24, No. 5, Nov. 1987, 22 pages.

(56) References Cited

OTHER PUBLICATIONS

Santhosh et al., Discourse Based Advancement on Question Answering System, International Journal on Soft Computing, Artificial Intelligence and Applications (IJSCAI), vol. 1, No. 2, Oct. 2012, 12 pages.
Scholman et al., A Step-Wise Approach to Discourse Annotation: Towards a Reliable Categorization of Coherence 64 Relations, Categories of Coherence Relations in Discourse Annotation. Dialogue & Discourse, vol. 7, No. 2, Feb. 2016, 28 pages.
Searle, Speech Acts: An Essay in the Philosophy of Language, Cambridge University Press, Jan. 1969, pp. 22-53.
Serban et al., A Survey of Available Corpora for Building Data-Driven Dialogue Systems, Available online at: https://arxiv.org/pdf/1512.05742.pdf, Mar. 21, 2017, 56 pages.
Sjoera, The Linguistics Behind Chat Bots, iCapps, Available online at: http://www.icapps.com/the-linguistics-behind-chatbots/, Feb. 22, 2017, 9 pages.
Socher et al., Learning Continuous Phrase Representations and Syntactic Parsing With Recursive Neural Networks, Proceedings of the NIPS Deep Learning and Unsupervised Feature Learning Workshop, Jan. 2010, 9 pages.
Sperber et al., Relevance: Communication and Cognition, Blackwell, Oxford and Harvard University Press, Cambridge, MA, 1986, 331 pages.
Sun et al., Exploiting Product Related Review Features for Fake Review Detection, Mathematical Problems in Engineering, vol. 2016, Article ID 4935792, Jul. 4, 2016, 7 pages.
Sun et al., Exploring Syntactic Structural Features for Sub-Tree Alignment Using Bilingual Tree Kernels, Proceedings of the 48th Annual Meeting of the Association for Computational Linguistics, Jul. 2010, pp. 306-315.
Surdeanu et al., Two Practical Rhetorical Structure Theory Parsers, Proceedings of the Conference of the North American Chapter of the Association for Computational Linguistics-Human Language Technologies, Jun. 5, 2015, pp. 1-5.
Traum et al., Conversation Acts in Task-Oriented Spoken Dialogue, University of Rochester Computer Science, Computational Intelligence, vol. 8, No. 3, Aug. 1992, 31 pages.
Traum et al., Discourse Obligations in Dialogue Processing, Proceedings ofthe 32nd Annual Meeting on Association for Computational Linguistics, Jun. 27-30, 1994, pp. 1-8.
Traum, Rhetorical Relations, Action and Intentionality in Conversation, Proceedings ACL SIG Workshop on Intentionality and Structure in Discourse Relations, Jun. 1993, pp. 132-135.
Trstenjak et al., KNN with TF-IDF Based Framework for Text Categorization, Procedia Engineering, vol. 69, 24th DAAAM International Symposium on Intelligent Manufacturing and Automation, 2014, pp. 1356-1364.
Tsui, English Conversation. Describing English Language, Oxford University Press, 1994, 37 pages.
Uliyara, Primer: Oracle Intelligent Bots, Powered by Artificial Intelligence, White Paper, Sep. 2017, 28 pages.
Van Der Wees et al., Five Shades of Noise: Analyzing Machine Translation Errors in User-Generated Text, Proceedings of the ACL 2015 Workshop on Noisy User-generated Text, Jul. 31, 2015, pp. 28-37.
Vapnik, The Nature of Statistical Learning Theory, Springer Science, 1995, 201 pages.
Walker et al., Quantitative and Qualitative Evaluation of Darpa Communicator Spoken Dialogue Systems, Proceedings of the 39th Annual Meeting of the Association for Computational Linguistics, Jul. 6-11, 2001, pp. 515-522.
Wang et al., Kernel Based Discourse Relation Recognition with Temporal Ordering Information, Proceedings of the 48th Annual Meeting of the Association for Computational Linguistics, Jul. 11-16, 2010, pp. 710-719.
Wang et al., Using Learning Analytics to Understand the Design of an Intelligent Language Tutor-Chatbot Lucy, International Journal of Advanced Computer Science and Applications, vol. 4, No. 11, Nov. 2013, pp. 124-131.
Wilks, "Machine Conversations", The Springer International Series in Engineering and Computer Science, vol. 511, 1999, 38 pages.
Wu et al., Enhancing Text Representation for Classification Tasks with Semantic Graph Structures, International Journal of Innovative Computing, Information and Control, vol. 7, No. 5 (B), May 2011, pp. 2689-2698.
Wuchner et al., Data Loss Prevention Based on Data-Driven Usage Control, Proceedings of the IEEE 23rd International Symposium on Software Reliability Engineering, Nov. 27-30, 2012, pp. 151-160.
Yao et al., Online Deception Detection Refueled by Real World Data Collection, Proceedings of Recent Advances in Natural Language Processing, Jul. 28, 2017, 10 pages.
Yessenalina et al., Compositional Matrix-Space Models for Sentiment Analysis, Proceedings of the 2011 Conference on Empirical Methods in Natural Language Processing, Jul. 27-31, 2011, pp. 172-182.
Zanzotto et al., Estimating Linear Models for Compositional Distributional Semantics, Proceedings of the 23rd International Conference on Computational Linguistics (Coling 2010), Aug. 23-27, 2010, pp. 1263-1271.
Zeilenga, Lightweight Directory Access Protocol (LDAP) Read Entry Controls, Standards Track, Network Working Group, IETF, RFC 4527, Jun. 2006, 8 pages.
Zhao et al., Facilitating Discourse Analysis with Interactive Visualization, IEEE Transactions on Visualization and Computer Graphics, vol. 18, No. 12, Dec. 2012, pp. 2639-2648.
U.S. Appl. No. 16/010,123 , Non-Final Office Action, dated Feb. 8, 2021, 30 pages.
Mathkour , "A Novel Rhetorical Structure Approach for Classifying Arabic Security Documents", International Journal of Computer Theory and Engineering, vol. 1, No. 3, Aug. 2009, pp. 195-200.
U.S. Appl. No. 16/010,123, Notice of Allowance, dated May 19, 2021, 16 pages.
Indian Serial No. IN202047007447, "First Examination Report", dated Sep. 9, 2021, 6 pages.
Japanese Application No. JP2019-561757, Office Action, dated Sep. 21, 2021, 3 pages.
BBC Inside Science, Automatic Facebook, Available Online at http://www.bbc.co.uk/programmes/b040lnlf, Apr. 17, 2014, 2 pages.
Difference in the Way Children with Autism Learn New Behaviors Described, Kennedy Krieger Institute, ScienceDaily, Available online at: www.sciencedaily.com/releases/2009/07/090706113647.htm, Jul. 10, 2009, 2 pages.
One Per Cent, New Scientist, Available Online at http://www.newscientist.com/article/mg22229634.400-one-per-cent.html., Apr. 5, 2014, 4 pages.
Abney, Parsing by Chunks, Kluwer BBC Inside Science, Available Online at: http://www.bbc.co.uk/programmes/b040lnlf, Nov. 1994, 19 pages.
Axelrod, The Evolution of Cooperation, Basic Books, 1984, 9 pages.
Baron-Cohen et al., Does the Autistic Child Have a "Theory of Mind"?, Cognition, vol. 21, No. 1, Oct. 1985, pp. 37-46.
Bello et al., Developmental Accounts of Theory-of-mind Acquisition: Achieving Clarity via Computational Cognitive Modeling, In Proceedings of the 28th Annual Conference of the Cognitive Science Society, 2006, pp. 1014-1019.
Borgida et al., Asking Queries About Frames, Proceedings of the 5th Int. Conf. on the Principles of Knowledge Representation and Reasoning, 1996, pp. 340-349.
Bousquet et al., Introduction to Statistical Learning Theory, Lecture Notes in Artificial Intelligence, vol. 3176, 2004, pp. 175-213.
Breazeal, A Motivational System for Regulating Human-Robot Interactions, Fifteenth National/tenth Conference on Artificial Intelligence, 1998, 12 pages.
Buchegger et al., A Case for P2P Infrastructure for Social Networks—Opportunities & Challenges, Proceedings of 6th International Conference on Wireless On-Demand Network Systems and Services, Utah, 2009, 8 pages.
Burke et al., The Intersection of Robust Intelligence and Trust in Autonomous Systems, AAAI Spring Symposium, 2014, 102 pages.
Buzing et al., Emerging Communication and Cooperation in Evolving Agent Societies, Journal of Artificial Societies and Social

(56) References Cited

OTHER PUBLICATIONS

Simulation, vol. 8, No. 1, Available Online at http://jasss.soc.surrey.ac.uk/8/1/2.html, Jan. 31, 2005, 22 pages.
Cassell et al., Human Conversation as a System Framework: Designing Embodied Conversational Agents, Embodied Conversational Agents, 2001, pp. 29-63.
Cassell et al., Negotiated Collusion: Modeling Social Language and Its A. Relationship Effects in Intelligent Agents, User Modeling and Adaptive Interfaces, vol. 13, No. 1-2, Feb.-May 2003, 34 pages.
Cassimatis , Integrating Cognitive Models Based on Different Computational Methods, Twenty-Seventh Annual Conference of the Cognitive Science Society, vol. 27, 2005, 6 pages.
Chambers et al., Learning Alignments and Leveraging Natural Logic, In Proceedings of the ACL-07 Workshop on Textual Entailment and Paraphrasing, 2007, 6 pages.
Chesnevar et al., Logical Models of Argument, ACM Computing Surveys, vol. 32, No. 4, Dec. 2000, pp. 337-383.
De Lara et al., Some Strategies for the Simulation of Vocabulary Agreement in Multi-agent Communities, Journal of Artificial Societies and Social Simulation, vol. 3, No. 4, Available online at: http://www.soc.surrey.ac.uk/JASSS/3/4/2.html, 2000, 11 pages.
De Rosis et al., From Greta's Mind to Her Face: Modelling the Dynamics of Affective States in a Conversational Embodied Agent, International Journal of Human-Computer Studies, vol. 59, Nos. 1-2, Jul. 2003, pp. 81-118.
Denero et al., The Complexity of Phrase Alignment Problems, In Proceedings of ACL/HLT-08, Jun. 2008, pp. 25-28.
Dias et al., Feeling and Reasoning: A Computational Model for Emotional Characters, EPIA Affective Computing Workshop, Progress in Artificial Intelligence, vol. 3808, Dec. 5-8, 2005, pp. 127-140.
D'Inverno et al., A Formal Specification of dMARS. Intelligent Agents IV: Proceedings of the Fourth International Workshop on Agent Theories, Architectures and Languages, 1998, 22 pages.
Donlon , Robust Intelligence (RI), National Science Foundation, Available Online at: www.nsf.gov/funding/pgm_summ.jsp?pims_id=503305&org=IIS, 2013, 3 pages.
Ehrlich et al., Maximum Common Subgraph Isomorphism Algorithms and their Applications in Molecular Science: Review, Wiley Interdisciplinary Reviews: Computational Molecular Science, vol. 1, No. 1, Jan.-Feb. 2011, pp. 68-79.
Gabbay , Action, Time and Default, Logical Foundations for Cognitive Agents, 1999, pp. 151-152.
Galitsky , A Computational Simulation Tool for Training Autistic Reasoning About Mental Attitudes, Knowledge-Based Systems, vol. 50, Sep. 2013, 34 pages.
Galitsky et al., Building Integrated Opinion Delivery Environment, Proceedings of the Twenty-Fourth International Florida Artificial Intelligence Research Society Conference, Jan. 2011, 6 pages.
Galitsky , Content Inversion for User Searches and Product Recommendation Systems and Methods, US Patent Application, eBay No. 47088.80, May 9, 2016.
Galitsky , Exhaustive Simulation of Consecutive Mental States of Human Agents, Knowledge-Based Systems, vol. 43, May 2013, 41 pages.
Galitsky , Extending the BDI Model to Accelerate the Mental Development of Autistic Patients, Second Intl. Conf. on Development & Learning, 2002, 7 pages.
Galitsky et al., From Generalization of Syntactic Parse Trees to Conceptual Graphs, Proceedings of the 18th international conference on Conceptual structures: from information to intelligence, Jul. 2010, pp. 185-190.
Galitsky et al., How Children with Autism and Machines Learn to Interact, Autonomy and Artificial Intelligence: A Threat or Savior?, 2017, pp. 195-226.
Galitsky et al., Justification of Customer Complaints Using Emotional States and Mental Actions, FLAIRS Conference, 2004, 6 pages.
Galitsky , Reasoning About Attitudes of Complaining Customers, Knowledge-Based Systems, vol. 19, No. 7, Nov. 2006, pp. 592-615.
Grosz , Collaborative Plans for Complex Group Action, Artificial Intelligence, vol. 86, No. 2, 1996, pp. 269-357.
Hayes et al., The Future of Social Media Entertainment, Available Online at: http://www.personalizemedia.com/the-future-of-social-media-entertainment-slides/., Oct. 26, 2008, 6 pages.
Izquierdo et al., Appearances Can Be Deceiving: Lessons Learned Re-Implementing Axelrod's 'Evolutionary Approach to Norms, Journal of Artificial Societies and Social Simulation, vol. 8, No. 3, Available Online at http://jasss.soc.surrey.ac.uk/8/3/2.html, Jun. 30, 2005, 25 pages.
Jiang et al., Semantic Similarity Based on Corpus Statistics and Lexical Taxonomy, In Proceedings of International Conference Research on Computational Linguistics, 1997, 15 pages.
Kaiser et al., The Visual Perception of Motion by Observers with Autism Spectrum Disorders: A Review and Synthesis, Psychonomic Bulletin and Review, vol. 16, No. 15, 2009, pp. 761-777.
Kaminka et al., Flexible Teamwork in Behavior-based Robots, AAAI-05, 2005, pp. 108-113.
Kaminka et al., Robust Multi Agent Teams via Socially Attentive Monitoring, Journal of Artificial Intelligence Research, vol. 12, 2000, pp. 105-147.
Kapoor et al., Algorithms for Generating All Spanning Trees of Undirected and Weighted Graphs, SIAM J. Computer, vol. 24, 1995, pp. 461-472.
Kennedy et al., Like-me Simulation as an Effective and Cognitively Plausible Basis for Social Robotics, International Journal of Social Robotics, vol. 1, No. 2, Feb. 24, 2009, pp. 181-194.
Kushman et al., Learning to Automatically Solve Algebra Word Problems, Proceedings of the 52nd Annual Meeting of the Association for Computational Linguistics, Jun. 23-25, 2014, pp. 271-281.
Lawless et al., Robust Intelligence (RI) Under Uncertainty: Mathematical Foundations of Autonomous Hybrid (Human-Machine-Robot) Teams, Organizations and Systems, Structure and Dynamics, vol. 6, No. 2, 2013, 35 pages.
Levesque et al., GOLOG: A Logic Programming Language for Dynamic Domains, Journal of Logic Programming, vol. 31, 1997, pp. 59-83.
Li et al., Shifting Matrix Management: A Model for Multi-agent Cooperation, Engineering Applications of Artificial Intelligence, vol. 16, No. 3, 2003, pp. 191-201.
Lisetti, Embodied Conversational Agents for Psychotherapy, CHI 2008 Workshop on Technology in Mental Health, 2008, 12 pages.
MacCartney et al., A Phrase-Based Alignment Model for Natural Language Inference, Conference on Empirical Methods in Natural Language Processing, Oct. 2008, pp. 802-811.
Mansilla et al., Asknext: An Agent Protocol for Social Search, Information Sciences, vol. 190, May 2012, pp. 144-161.
Mansilla et al., Automation of Social Networks with QA Agents, Proceedings of 9th International Conference on Autonomous Agents and Multi-Agent Systems, AAMAS, Jan. 2010, pp. 1437-1438.
McCarthy, Making Robots Conscious of Their Mental States, Proceedings of Machine Intelligence Conf. 15,, 1995, 8 pages.
Montaner et al., A Taxonomy of Recommender Agents on the Internet, Artificial Intelligence Review, vol. 19, No. 4, 2003, pp. 285-330.
Olivia et al., Case-based Bdi Agents: An Effective Approach for Intelligent Search on the World Wide Web, Intelligent Agents in Cyberspace, 1999, pp. 20-27.
Ourioupina et al., Application of Default Reasoning to Semantic Processing Under Question-Answering, DIMACS Tech Report 16, May 2001, pp. 1-22.
Parameswaran, Emotions in Intelligent Agents, FLAIRS-01, 2001, pp. 82-86.
Reiter, Proving Properties of States in the Situational Calculus, Journal Artificial Intelligence, vol. 64, No. 2, Dec. 1993, 17 pages.
Rich et al., Collagen: A Collaboration Manager for Software Interface Agents, User Modeling and User-Adapted Interaction, vol. 8, No. 3-4, Mar. 1998, 36 pages.
Scheutz, Agents With or Without Emotions, FLAIRS-01, 2001, pp. 89-93.
Shoham, Agent-Oriented Programming, Artificial Intelligence, vol. 60, No. 1, 1993, pp. 51-92.

(56) References Cited

OTHER PUBLICATIONS

Sloman, Architecture-Based Conceptions of Mind, In Proceedings of 11th International Congress of Logic, Methodology and Philosophy of Science, 2000, 18 pages.
Stein et al., Towards More Flexible and Common-sensical Reasoning About Beliefs, 1995 AAAI Spring Symposium on Representing Mental States and Mechanisms, Mar. 1995, 9 pages.
Stone et al., Multiagent Systems: A Survey from a Machine Learning Perspective, Autonomous Robots, vol. 8, No. 3, Jun. 2000, 57 pages.
Tamma et al., Ontologies for Supporting Negotiation in E-commerce, Engineering Applications of Artificial Intelligence, vol. 18, No. 2, Mar. 2005, pp. 223-236.
Trafton et al., ACT-R/E: An Embodied Cognitive Architecture for Human-Robot Interaction, Journal of Human-Robot Interaction, vol. 2, No. 1, Feb. 2013, 26 pages.
Weigand et al., Argumentation Semantics of Communicative Action, Proceedings of the 9th International Working Conference on the Language-Action Perspective on Communication Modelling, 2004, pp. 159-178.
Wooldridge, Reasoning about Rational Agents, MIT Press, 2000, 2 pages.
Wu et al., Adaptive Peer to Peer Social Networks for Distributed Content Based Web Search, Social Information Retrieval Systems: Emergent Technologies and Applications for Searching the Web Effectively, IGI Global, 2007, 31 pages.
Yu et al., A Multi-Agents Based E-Maintenance System with Case-based Reasoning Decision Support, Engineering Applications of Artificial Intelligence, vol. 16, No. 4, 2003, 12 pages.
U.S. Appl. No. 16/408,224, "Notice of Allowance", dated Jan. 7, 2022, 9 pages.
U.S. Appl. No. 16/408,224, "Supplemental Notice of Allowability", dated Apr. 7, 2022, 4 pages.
U.S. Appl. No. 16/408,224, "Supplemental Notice of Allowability", dated Feb. 15, 2022, 4 pages.
U.S. Appl. No. 16/426,878, "Corrected Notice of Allowability", dated Aug. 12, 2022, 2 pages.
U.S. Appl. No. 16/426,878, "Notice of Allowance", dated May 13, 2022, 10 pages.
U.S. Appl. No. 16/460,503, "First Action Interview Pilot Program Pre-Interview Communication", dated Jun. 24, 2022, 5 pages.
U.S. Appl. No. 16/654,258, "Final Office Action", dated May 27, 2022, 29 pages.
U.S. Appl. No. 16/654,258, "Non-Final Office Action", dated Feb. 17, 2022, 33 pages.
U.S. Appl. No. 16/736,517, "Non-Final Office Action", dated Dec. 8, 2021, 17 pages.
U.S. Appl. No. 16/736,517, "Notice of Allowance", dated Feb. 10, 2022, 11 pages.
U.S. Appl. No. 16/789,849, "Non-Final Office Action", dated Feb. 17, 2022, 23 pages.
U.S. Appl. No. 16/822,563, "Notice of Allowance", dated Mar. 2, 2022, 16 pages.
U.S. Appl. No. 16/841,200, "Notice of Allowance", dated Apr. 14, 2022, 13 pages.
EP18727946.8, "Office Action", dated Dec. 15, 2021, 7 pages.
EP19705043.8, "Office Action", dated Jun. 28, 2022, 6 pages.
IN201947044096, "First Examination Report", dated Jan. 13, 2022, 5 pages.
IN202047028577, "First Examination Report", dated May 17, 2022, 7 pages.

\* cited by examiner

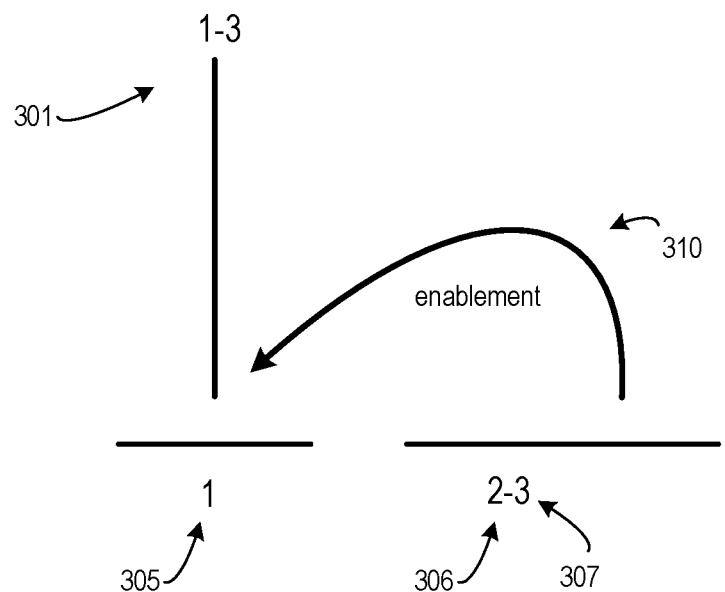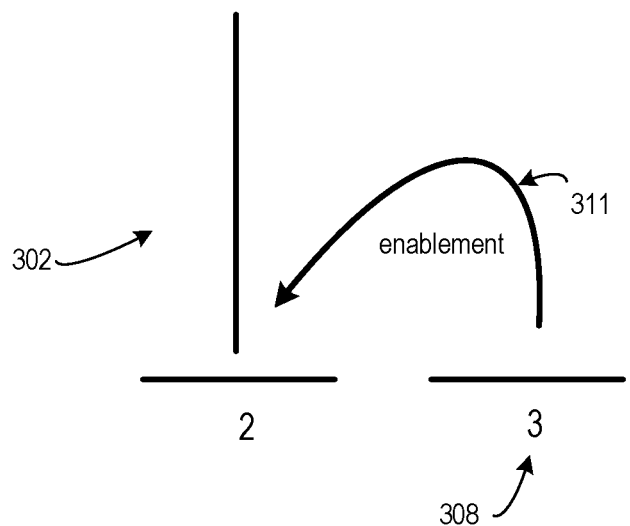
FIG. 3

{Elaboration}[N][S]
  {Elaboration}[N][S]
    {Attribution}[S][N]
      Teixon Corp. said
    {Joint}[N][M]
      its vice president for manufacturing resigned
      and its Houston work force has been trimmed by 40 people, or about 15%.'))
    {Attribution}[S][N]
      {Enablement}[N][S]
        The maker of hand-held computers and computer systems said
        the personnel changes were needed
        to improve the efficiency of its manufacturing operation.'))
  {Attribution}[S][N]
    {Elaboration}[N][S]
      The company said
      "it hasn't named a successor to Ronald Button, the vice president"
    {Attribution}[S][N]
      "who resigned,"
      its Houston work force now totals 230.'))

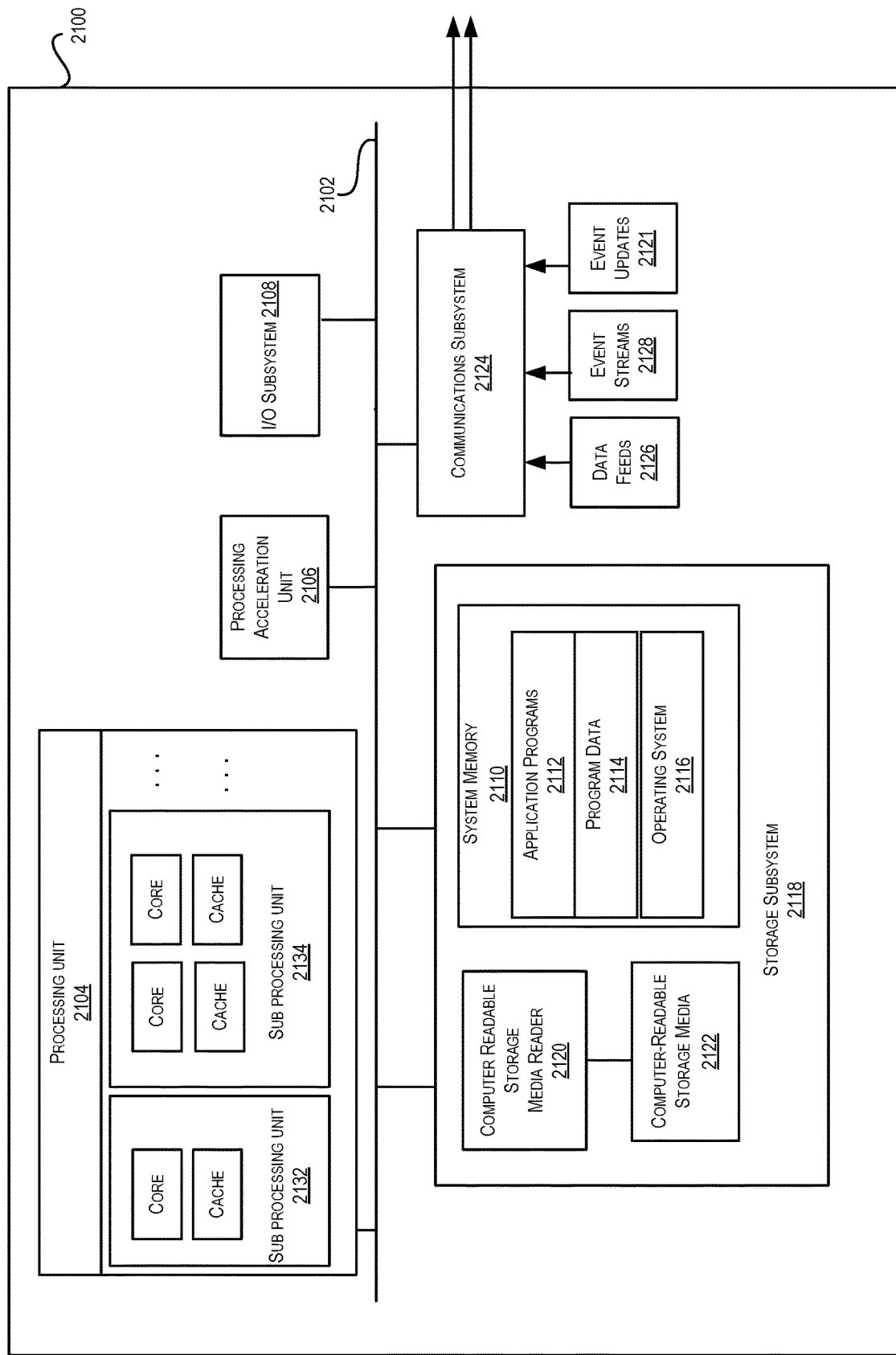

BUILDING DIALOGUE STRUCTURE BY USING COMMUNICATIVE DISCOURSE TREES

CROSS-REFERENCES TO RELATED APPLICATIONS

This application claims priority to U.S. Provisional 62/623,996, filed Jan. 30, 2018, which is incorporated by reference in its entirety, to U.S. Provisional 62/646,759, filed Mar. 22, 2018, which is incorporated by reference in its entirety, to U.S. Provisional 62/746,261, filed Oct. 16, 2018, which is incorporated by reference in its entirety, and to U.S. Provisional 62/729,335, filed Sep. 10, 2018, which is incorporated by reference in its entirety.

TECHNICAL FIELD

This disclosure is generally concerned with linguistics. More specifically, this disclosure relates to using communicative discourse trees to manage the dialogue of an interactive session between an autonomous agent and a user device.

STATEMENT AS TO RIGHTS TO INVENTIONS MADE UNDER FEDERALLY SPONSORED RESEARCH AND DEVELOPMENT

NOT APPLICABLE

BACKGROUND

Linguistics is the scientific study of language. One aspect of linguistics is the application of computer science to human natural languages such as English. Due to the greatly increased speed of processors and capacity of memory, computer applications of linguistics are on the rise. For example, computer-enabled analysis of language discourse facilitates numerous applications such as automated agents that can answer questions from users. To address this need, a broad range of technologies including compositional semantics has been developed. Such technologies can support automated agents in the case of simple, short queries and replies.

In order to provide realistic answers to user questions and more broadly, to create a cohesive roadmap for an interactive session, an autonomous agent should determine an answer that is not only topically relevant but is also appropriate in style. For example, an answer to the question "what did you do today?" can be topically relevant, e.g., discuss what the responder did that day, but can still fail to match the style of the question, e.g., by including extraneous information such as what the responder's children did that day.

But existing keyword-based solutions cannot address both topic and rhetorical agreement. Consequently, such solutions often determine answers that are disjointed in style from a user's expectations, resulting in the user finding the answer inappropriate even though the answer is on-topic.

Hence, new solutions are needed that can accurately determine both topical relevancy and rhetorical agreement.

BRIEF SUMMARY

Generally, systems, devices, and methods of the present invention are related to using communicative discourse trees to manage dialogue flow between an autonomous agent and a user device. Communicative discourse trees are generated for a question and for one or more candidate answers in order to determine a level of complementarity, or rhetorical agreement, between the question and each candidate answer. The best match candidate answer is provided to the user device.

In an example, a rhetoric agreement application receives a multi-part question from a user device. The application creates a question communicative discourse tree for the question and identifies sub-trees within the question communicative discourse tree. Each sub tree corresponds to a part of the multi-part question. For each question part, the application determines a set of candidate answers that are responsive to the particular question part. For each candidate answer, the application builds a communicative discourse tree and pairs the communicative discourse tree with the question communicative discourse tree. Each pair is provided to a machine learning model that determines a level of complementarity between the question part and the candidate answer. The application selects the candidate answer with a highest level of complementarity with the question part.

In an aspect, a method accesses a question sentence including fragments. At least one fragment includes a verb and words. Each fragment is an elementary discourse unit. The method generates a question communicative discourse tree that represents rhetorical relationships between the fragments. The question communicative discourse tree includes a root node. The method identifies a question sub-discourse tree from the question communicative discourse tree. The sub-discourse tree includes at least one of the fragments and represents a sub-question. The method accesses candidate answers. Each candidate answer includes fragments. The method generates for each candidate answer, a candidate answer communicative discourse tree that represents rhetorical relationships between the fragments of the respective candidate answer and includes a root node. The method computes, for each candidate answer, a level of complementarity between the question sub-discourse tree and the candidate answer discourse tree by applying a classification model to the question sub-discourse tree and to the candidate answer discourse tree. The method selects an answer from the candidate answers based on the computed level of complementarity. The method provides the selected answer to a user device.

In an aspect, identifying the question sub-discourse tree includes identifying a rhetorical relation that is not joint and not elaboration.

In an aspect, accessing candidate answers includes searching for keyword matches derived from the elementary discourse units of the question communicative discourse tree against a database of a discourse corpus, a database of a keyword corpus, or past utterances received.

In an aspect, the application selects an additional answer from the candidate answers based on an additional computed complementarity. The application provides the additional answer to the user device. The application receives, from the user device, an indication of a preferred answer of the selected answer and the additional answer. The application performs an additional search for keyword matches.

In an aspect, the application requests clarification from a user of the question sentence based on a keyword search. The application generates a new sub-discourse tree from the clarification. The application provides the new sub-discourse tree and an additional candidate answer discourse tree to the classification model.

In an aspect, the rhetorical relations include a contrast, a solution, a motivation, a background information, an evidence, an antithesis, an emphasis of an attitude or a belief, a purpose, a temporal circumstance, a spatial circumstance, or a situational circumstance.

In an aspect, the classification model is a nearest neighbor model or a tree-kernel learning model.

In an aspect, applying the classification model includes pairing the question sub-discourse tree and the candidate answer discourse tree.

In an aspect, selecting the answer from the plurality of candidate answers includes ranking the candidate answer discourse trees and selecting a candidate answer associated with a highest ranked complement pair discourse tree.

In an aspect, the ranking is determined by an answer popularity of past searches, a searching rank learned by a search engine on a basis of a number of searches for a same user or a same type of query.

In an aspect, generating a communicative discourse tree includes accessing a sentence including fragments. At least one fragment includes a verb and words, each word including a role of the words within the fragment. Each fragment is an elementary discourse unit. The discourse tree represents rhetorical relationships between the fragments. The discourse tree includes nodes, each nonterminal node representing a rhetorical relationship between two of the fragments, each terminal node of the nodes of the discourse tree is associated with one of the fragments. The generating further includes matching each fragment that has a verb to a verb signature.

In an aspect, the matching includes accessing verb signatures. Each verb signature includes the verb of the respective fragment and a sequence of thematic roles. The thematic roles describe the relationship between the verb and related words. The matching includes determining, for each verb signature of the verb signatures, thematic roles of the respective signature that match a role of a word in the respective fragment. The matching includes selecting a particular verb signature from the verb signatures based on the particular verb signature including a highest number of matches. The matching includes associating the particular verb signature with the fragment.

In an aspect, a method trains a classification model to predict a complementarity of a pair of two sentences. The method accesses a positive dataset and a negative dataset. Each dataset includes training pairs. Each training pair includes a question communicative discourse tree that represents a question and an answer communicative discourse tree that represents an answer. The positive dataset includes training pairs that are above a threshold expected level of complementarity. The negative dataset includes training pairs that are below a threshold expected level of complementarity. The method trains a classification model by iteratively: providing one of the training pairs to a classification model, receiving, from the classification model, a determined level of complementarity; calculating a loss function by calculating a difference between the determined level of complementarity and the expected level of complementarity; and adjusting internal parameters of the classification model to minimize the loss function.

In an aspect, the method forms a training dataset by generating complement pair discourse trees and assigning each complement pair discourse tree of complement pair discourse trees to a positive dataset or a negative dataset.

In an aspect, the set of training data includes a negative dataset that includes a question answer pair that includes a question and an answer that are relevant but is rhetorically incorrect when compared to the question.

The above methods can be implemented as tangible computer-readable media and/or operating within a computer processor and attached memory.

BRIEF DESCRIPTION OF THE DRAWINGS

FIG. 3 depicts a further example of a discourse tree in accordance with an aspect.

FIG. 6 depicts an exemplary indented text encoding of the representation in FIG. 5 in accordance with an aspect.

FIG. 21 illustrates an exemplary computer system, in which various aspects of the present invention may be implemented.

DETAILED DESCRIPTION

Figure 1:
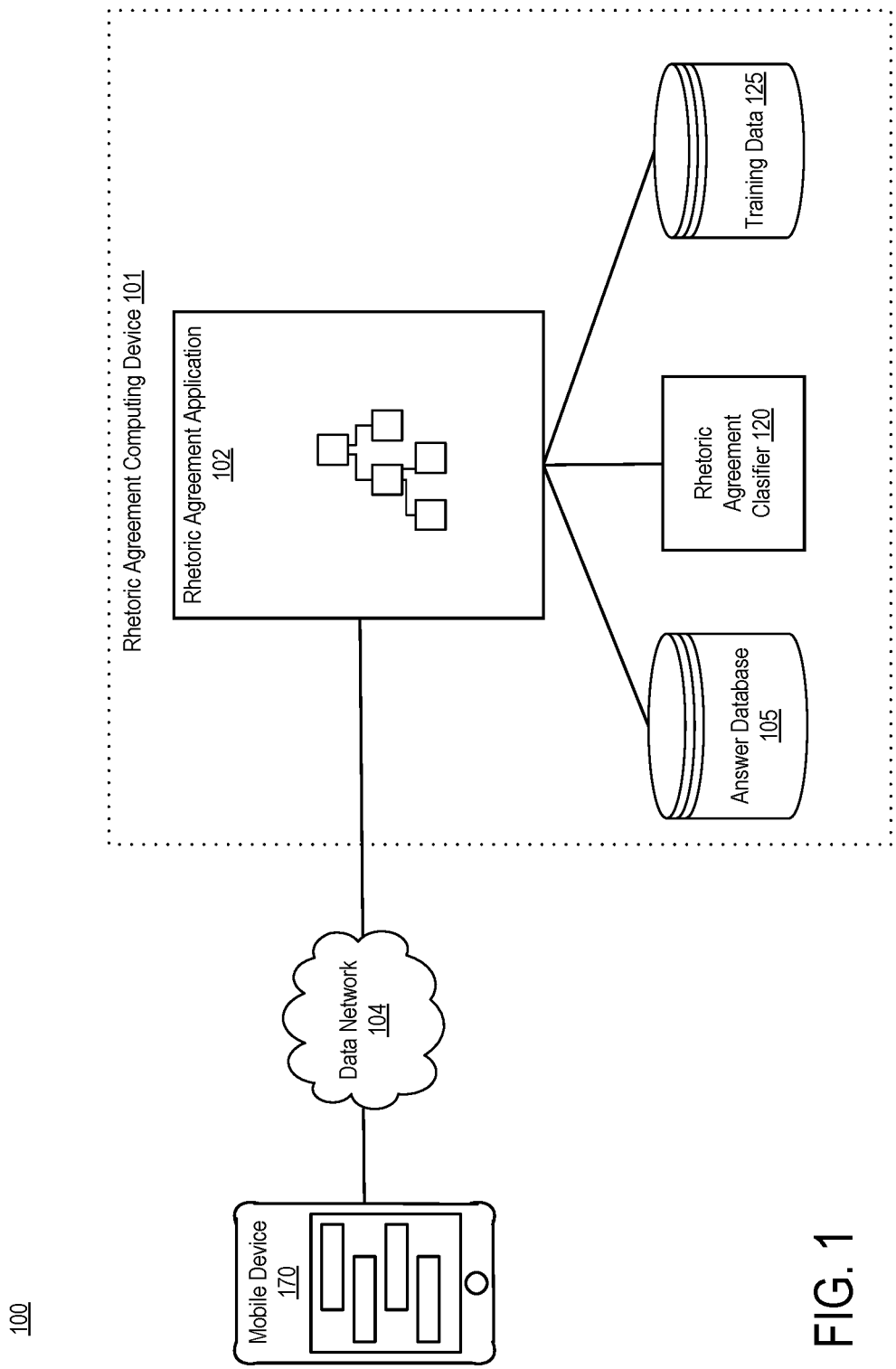
FIG. 1 shows an exemplary rhetoric classification environment in accordance with an aspect.

Disclosed systems enable improved dialogue management between an autonomous agent and a user device. In so doing, certain aspects generate responses to user questions that match both the style and the topic of the question.

Users interacting with autonomous agents expect that the style of an answer match expectations especially when a question is detailed and includes multiple sentences. Therefore, an autonomous agent that delivers on these expectations is able to maintain a more cohesive answer flow. In contrast, when an answer is in a style disagreement with a question, a user can find this answer inappropriate even when a topical relevance is high. Such an answer can result in miscommunication and a lack of understanding and may require clarification, argumentation, or other means to achieve the desired communication.

Certain aspects use communicative discourse trees to provide technical improvements in the area of computer-implemented linguistics. "Communicative discourse trees" or "CDTs" include discourse trees that are supplemented with communicative actions. A communicative action is a cooperative action undertaken by individuals based on mutual deliberation and argumentation. By using communicative discourse trees, certain aspects analyze a multi-sentence question such as an initial query received from a user device and develop a roadmap for from which the autonomous agent can answer subsequent user questions. The generated responses are both topically relevant and in rhetorical agreement with the questions.

By using communicative discourse trees, disclosed systems overcome the limitations of existing keyword-based systems. As discussed, existing systems for autonomous agents suffer from deficiencies because these solutions rely on a particular ontology and are domain-specific. For example, existing systems either (i) fail to address the topic of a question or (ii) fail to address the rhetorical agreement between the question and the answer. As such, existing solutions are capable of only scripted, or limited responses to user questions.

In contrast, by using communicative discourse trees, disclosed systems to determine rhetoric agreement and disagreement by matching rhetoric structures of questions with rhetoric relations of answers. Rhetoric disagreement is associated with a broken dialogue and is usually evident via the means an answer is communicated, explained, or supported. By incorporating labels that identify communicative actions, learning of communicative discourse trees can occur over a richer features set than possible with simple rhetoric relations and syntax of elementary discourse units (EDUs).

In an example, a rhetoric agreement application executing on a computing device receives a question from a user. The rhetoric agreement application generates a communicative discourse tree for the question. The rhetoric agreement application identifies one or more question sub-trees from the communicative discourse tree, each sub tree representing a component of the user's question. For example, a communicative discourse tree representing a two-part question can have two sub-trees. The rhetoric agreement application accesses a database (e.g., a corpus of text) of potential answers to the question. From the database, the rhetoric agreement application determines candidate answers that are responsive to each part of the question. Different methods can be used, such as keyword-matching. The rhetorical agreement application determines a communicative discourse tree for each candidate answer. Using a classification model, the rhetoric agreement application determines a level of complementarity between the question and each candidate answer. The rhetoric agreement classifier provides the best answer to the user, for example, via a display device. This process continues as necessary to answer the user's question and can be refined based on additional clarifications received from the user device.

Certain Definitions

As used herein, "rhetorical structure theory" is an area of research and study that provided a theoretical basis upon which the coherence of a discourse could be analyzed.

As used herein, "discourse tree" or "DT" refers to a structure that represents the rhetorical relations for a sentence of part of a sentence.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "signature" or "frame" refers to a property of a verb in a fragment. Each signature can include one or more thematic roles. For example, for the fragment "Dutch accident investigators say that evidence points to pro-Russian rebels," the verb is "say" and the signature of this particular use of the verb "say" could be "agent verb topic" where "investigators" is the agent and "evidence" is the topic.

As used herein, "thematic role" refers to components of a signature used to describe a role of one or more words. Continuing the previous example, "agent" and "topic" are thematic roles.

As used herein, "nuclearity" refers to which text segment, fragment, or span, is more central to a writer's purpose. The nucleus is the more central span, and the satellite is the less central one.

As used herein, "coherency" refers to the linking together of two rhetorical relations.

As used herein, "communicative verb" is a verb that indicates communication. For example, the verb "deny" is a communicative verb.

As used herein, "communicative action" describes an action performed by one or more agents and the subjects of the agents.

FIG. 1 shows an exemplary rhetoric classification environment in accordance with an aspect. FIG. 1 depicts rhetoric agreement environment 100, which includes rhetoric agreement computing device 101 connected to mobile device 170 via data network 104. Data network 104 can be any public or private network. Examples of networks include wired or wireless networks, Wide Area Networks, Local Area Networks, or the Internet. Rhetoric agreement computing device 101 includes one or more of rhetoric agreement application 102, answer database 105, rhetoric agreement classifier 120, and training data 125. Rhetoric agreement application 102 generates one or more communicative discourse trees.

Mobile device 170 can be any mobile device such as a mobile phone, smart phone, tablet, laptop, smart watch, and the like. Mobile device 170 communicates via data network 104 to server 160 or rhetoric agreement computing device 101. In this manner, mobile device 170 can provide questions, e.g., from a user, to rhetoric agreement computing device 101. In turn, rhetoric agreement computing device 101 determines a suitable answer and the answer to mobile device 170 over data network 104.

In an example, rhetoric agreement application 102 facilitates and manages dialogue with mobile device 170. Rhetoric agreement application 102 receives an initial query multi-part question. Rhetoric agreement application 102 creates a question communicative discourse tree from the query. The question communicative discourse tree contains multiple sub-trees, each of which corresponds to a part of the initial query. By using communicative discourse trees, the rhetorical agreement and communicative actions between the question and answer can be completely modeled.

In an example, the text of the initial query is "How can I fix my television? I have tried turning it off and on again. I have also reset the settings." The resulting communicative discourse tree includes three sub trees, one sub tree for each sentence. The sub-trees need not be one sentence each; sub-trees can be of arbitrary length.

Rhetoric agreement application 102 determines a set of candidate answers that are responsive to the question part identified in first-sub tree. The answers can be obtained from an existing database such as the answer database 105 or from an external database connected via data network 104. Examples of databases include Frequently-asked questions (FAQ) databases, previously answered questions, and previous interactions with other user devices.

After determining a communicative discourse tree for each candidate answer, rhetoric agreement application 102 determines the most suitable answer. As further explained herein, different methods can be used including machine learning. Rhetoric agreement application 102 creates pairs of communicative discourse trees that each include the question communicative discourse tree and the particular candidate communicative discourse trees. Using rhetoric agreement classifier 120, rhetoric agreement application 102 determines whether the question-answer pair is above a threshold level of complementarity. In turn, rhetoric agreement application 102 provides each pair to rhetoric agreement classifier 120. If the pair is not sufficiently complementary, rhetoric agreement application 102 continues to analyze additional pairs until a suitable answer is found. Rhetoric agreement application 102 provides the best answer to mobile device 170.

This process can continue for subsequent question-parts. Additionally, a user can provide additional questions to mobile device 170, which transmits the questions to rhetoric agreement application 102, which in turn generates responses to questions and can optionally update the question communicative discourse tree based on subsequent user clarifications.

Rhetoric Structure Theory and Discourse Trees

Linguistics is the scientific study of language. For example, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearity and rhetorical relations, and a second level of structures or schemas. Discourse parsers or other computer software can parse text into a discourse tree.

Rhetoric Structure Theory models logical organization of text, a structure employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences. This logical relation between clauses is called the coherence structure of the text. RST is one of the most popular theories of discourse, being based on a tree-like discourse structure, discourse trees (DTs). The leaves of a DT correspond to EDUs, the contiguous atomic text spans. Adjacent EDUs are connected by coherence relations (e.g., Attribution, Sequence), forming higher-level discourse units. These units are then also subject to this relation linking. EDUs linked by a relation are then differentiated based on their relative importance: nuclei are the core parts of the relation, while satellites are peripheral ones. As discussed, in order to determine accurate request-response pairs, both topic and rhetorical agreement are analyzed. When a speaker answers a question, such as a phrase or a sentence, the speaker's answer should address the topic of this question. In the case of an implicit formulation of a question, via a seed text of a message, an appropriate answer is expected not only maintain a topic, but also match the generalized epistemic state of this seed.

Rhetoric Relations

As discussed, aspects described herein use communicative discourse trees. Rhetorical relations can be described in different ways. For example, Mann and Thompson describe twenty-three possible relations. C. Mann, William & Thompson, Sandra. (1987) ("Mann and Thompson"). Rhetorical Structure Theory: A Theory of Text Organization. Other numbers of relations are possible.

| Relation Name | Nucleus | Satellite |
| --- | --- | --- |
| Antithesis | ideas favored by the author | ideas disfavored by the author |
| Background | text whose understanding is being facilitated | text for facilitating understanding |
| Circumstance | text expressing the events or ideas occurring in the interpretive context | an interpretive context of situation or time |
| Concession | situation affirmed by author | situation which is apparently inconsistent but also affirmed by author |
| Condition | action or situation whose occurrence results from the occurrence of the conditioning situation | conditioning situation |

| Relation Name | Nucleus | Satellite |
| --- | --- | --- |
| Elaboration | basic information | additional information |
| Enablement | an action | information intended to aid the reader in performing an action |
| Evaluation | a situation | an evaluative comment about the situation |
| Evidence | a claim | information intended to increase the reader's belief in the claim |
| Interpretation | a situation | an interpretation of the situation |
| Justify | text | information supporting the writer's right to express the text |
| Motivation | an action | information intended to increase the reader's desire to perform the action |
| Non-volitional Cause | a situation | another situation which causes that one, but not by anyone's deliberate action |
| Non-volitional Result | a situation | another situation which is caused by that one, but not by anyone's deliberate action |
| Otherwise (anti conditional) | action or situation whose occurrence results from the lack of occurrence of the conditioning situation | conditioning situation |
| Purpose | an intended situation | the intent behind the situation |
| Restatement | a situation | a reexpression of the situation |
| Solutionhood | a situation or method supporting full or partial satisfaction of the need | a question, request, problem, or other expressed need |
| Summary | text | a short summary of that text |
| Volitional Cause | a situation | another situation which causes that one, by someone's deliberate action |
| Volitional Result | a situation | another situation which is caused by that one, by someone's deliberate action |

Some empirical studies postulate that the majority of text is structured using nucleus-satellite relations. See Mann and Thompson. But other relations do not carry a definite selection of a nucleus. Examples of such relations are shown below.

| Relation Name | Span | Other Span |
| --- | --- | --- |
| Contrast | One alternate (unconstrained) | The other alternate (unconstrained) |
| Joint | | |
| List | An item | A next item |
| Sequence | An item | A next item |

Figure 2:
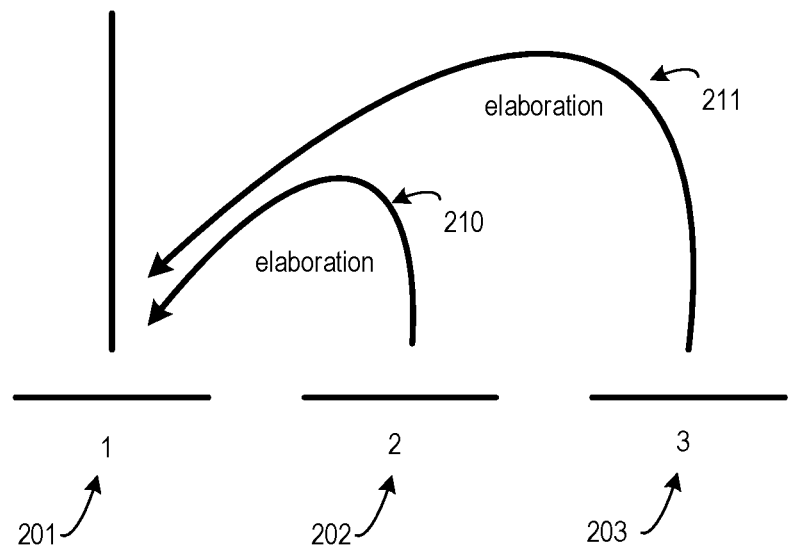
FIG. 2 depicts an example of a discourse tree in accordance with an aspect.

FIG. 2 depicts an example of a discourse tree in accordance with an aspect. FIG. 2 includes discourse tree 200. Discourse tree includes text span 201, text span 202, text span 203, relation 210 and relation 211. The numbers in FIG. 2 correspond to the three text spans. FIG. 3 corresponds to the following example text with three text spans numbered 1, 2, 3:

1. Honolulu, Hi. will be site of the 2017 Conference on Hawaiian History

2. It is expected that 200 historians from the U.S. and Asia will attend

3. The conference will be concerned with how the Polynesians sailed to Hawaii

For example, relation 210, or elaboration, describes the relationship between text span 201 and text span 202. Relation 211 depicts the relationship, elaboration, between text span 203 and 204. As depicted, text spans 202 and 203 elaborate further on text span 201. In the above example, given a goal of notifying readers of a conference, text span 1 is the nucleus. Text spans 2 and 3 provide more detail about the conference. In FIG. 2, a horizontal number, e.g., 1-3, 1, 2, 3 covers a span of text (possibly made up of further spans); a vertical line signals the nucleus or nuclei; and a curve represents a rhetoric relation (elaboration) and the direction of the arrow points from the satellite to the nucleus. If the text span only functions as a satellite and not as a nuclei, then deleting the satellite would still leave a coherent text. If from FIG. 2 one deletes the nucleus, then text spans 2 and 3 are difficult to understand.

FIG. 3 depicts a further example of a discourse tree in accordance with an aspect. FIG. 3 includes components 301 and 302, text spans 305-307, relation 310 and relation 328. Relation 310 depicts the relation 310, enablement, between components 306 and 305, and 307, and 305. FIG. 3 refers to the following text spans:

1. The new Tech Report abstracts are now in the journal area of the library near the abridged dictionary.

2. Please sign your name by any means that you would be interested in seeing.

3. Last day for sign-ups is 31 May.

As can be seen, relation 328 depicts the relationship between entity 307 and 306, which is enablement. FIG. 3 illustrates that while nuclei can be nested, there exists only one most nuclear text span.

Constructing a Discourse Tree

Discourse trees can be generated using different methods. A simple example of a method to construct a DT bottom up is:

(1) Divide the discourse text into units by:
  (a) Unit size may vary, depending on the goals of the analysis
  (b) Typically, units are clauses (2) Examine each unit, and its neighbors. Is there a relation holding between them?

(3) If yes, then mark that relation.

(4) If not, the unit might be at the boundary of a higher-level relation. Look at relations holding between larger units (spans).

(5) Continue until all the units in the text are accounted for.

Figure 4:
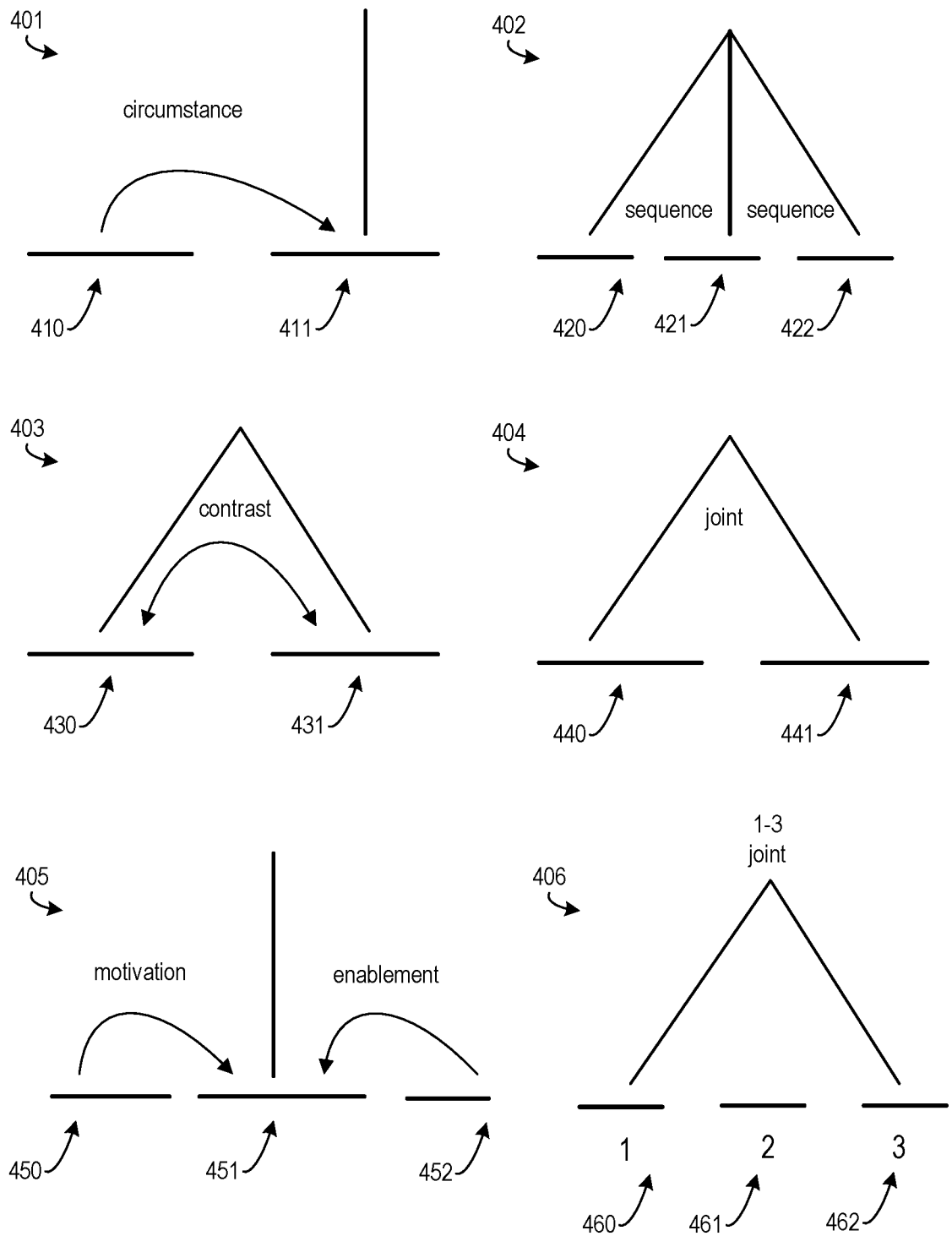
FIG. 4 depicts illustrative schemas in accordance with an aspect.

Mann and Thompson also describe the second level of building block structures called schemas applications. In RST, rhetoric relations are not mapped directly onto texts; they are fitted onto structures called schema applications, and these in turn are fitted to text. Schema applications are derived from simpler structures called schemas (as shown by FIG. 4). Each schema indicates how a particular unit of text is decomposed into other smaller text units. A rhetorical structure tree or DT is a hierarchical system of schema applications. A schema application links a number of consecutive text spans, and creates a complex text span, which can in turn be linked by a higher-level schema application. RST asserts that the structure of every coherent discourse can be described by a single rhetorical structure tree, whose top schema creates a span encompassing the whole discourse.

FIG. 4 depicts illustrative schemas in accordance with an aspect. FIG. 4 shows a joint schema is a list of items consisting of nuclei with no satellites. FIG. 4 depicts schemas 401-406. Schema 401 depicts a circumstance relation between text spans 410 and 428. Scheme 402 depicts a sequence relation between text spans 420 and 421 and a sequence relation between text spans 421 and 422. Schema 403 depicts a contrast relation between text spans 430 and 431. Schema 404 depicts a joint relationship between text spans 440 and 441. Schema 405 depicts a motivation relationship between 450 and 451, and an enablement relationship between 452 and 451. Schema 406 depicts joint relationship between text spans 460 and 462. An example of a joint scheme is shown in FIG. 4 for the three text spans below:

1. Skies will be partly sunny in the New York metropolitan area today.
2. It will be more humid, with temperatures in the middle 80's.
3. Tonight will be mostly cloudy, with the low temperature between 65 and 70.

While FIGS. 2-4 depict some graphical representations of a discourse tree, other representations are possible.

Figure 5:
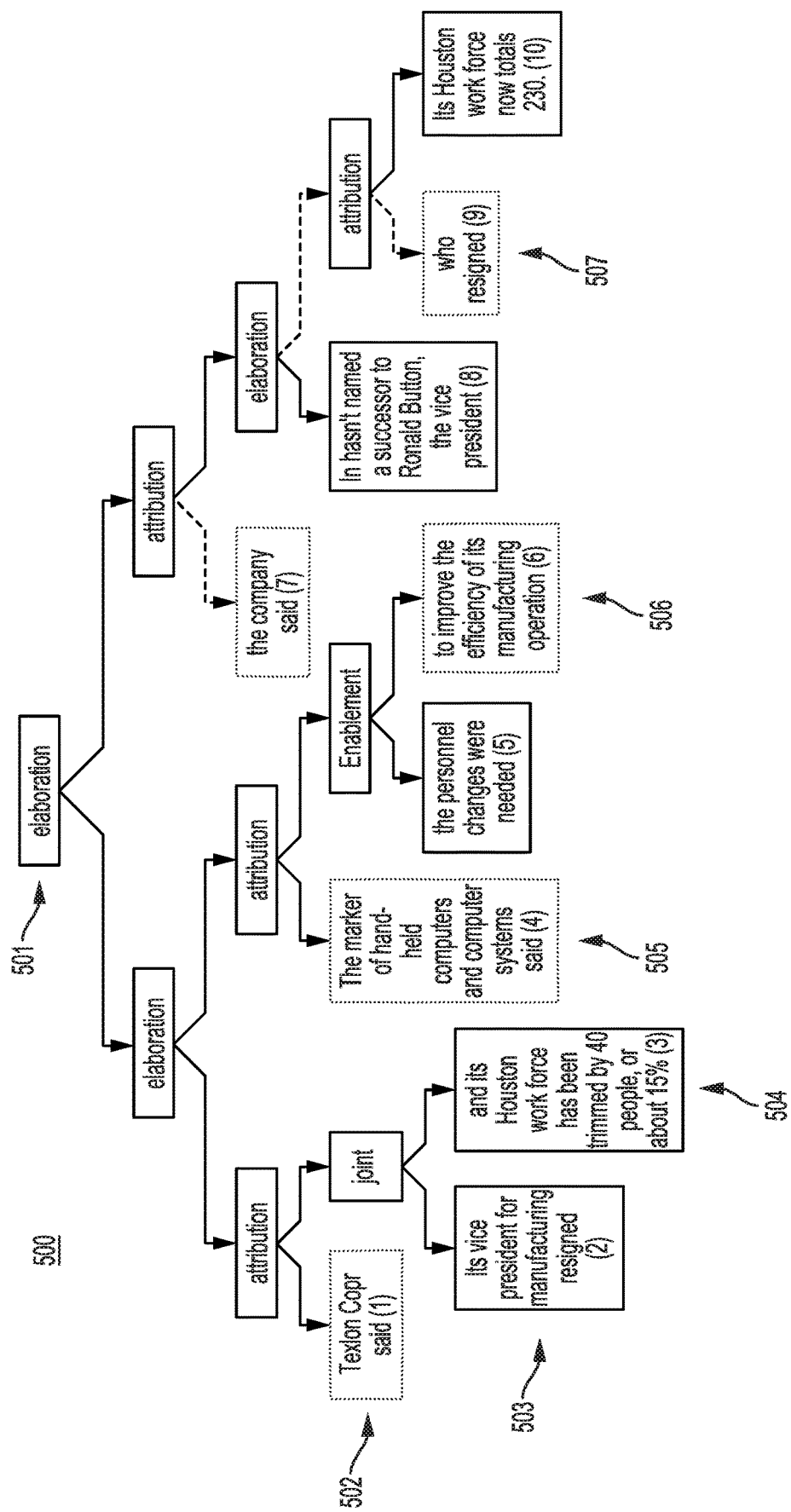
FIG. 5 depicts a node-link representation of the hierarchical binary tree in accordance with an aspect.

FIG. 5 depicts a node-link representation of the hierarchical binary tree in accordance with an aspect. As can be seen from FIG. 5, the leaves of a DT correspond to contiguous non-overlapping text spans called Elementary Discourse Units (EDUs). Adjacent EDUs are connected by relations (e.g., elaboration, attribution . . . ) and form larger discourse units, which are also connected by relations. "Discourse analysis in RST involves two sub-tasks: discourse segmentation is the task of identifying the EDUs, and discourse parsing is the task of linking the discourse units into a labeled tree." See Joty, Shafiq R and Giuseppe Carenini, Raymond T Ng, and Yashar Mehdad. 2013. Combining intra- and multi-sentential rhetorical parsing for document-level discourse analysis. In ACL (1), pages 486-496.

FIG. 5 depicts text spans that are leaves, or terminal nodes, on the tree, each numbered in the order they appear in the full text, shown in FIG. 6. FIG. 5 includes tree 500. Tree 500 includes, for example, nodes 501-507. The nodes indicate relationships. Nodes are non-terminal, such as node 501, or terminal, such as nodes 502-507. As can be seen, nodes 503 and 504 are related by a joint relationship. Nodes 502, 505, 506, and 508 are nuclei. The dotted lines indicate that the branch or text span is a satellite. The relations are nodes in gray boxes.

FIG. 6 depicts an exemplary indented text encoding of the representation in FIG. 5 in accordance with an aspect. FIG. 6 includes text 600 and text sequences 602-604. Text 600 is presented in a manner more amenable to computer programming. Text sequence 602 corresponds to node 502, sequence 603 corresponds to node 503, and sequence 604 corresponds to node 504. In FIG. 6, "N" indicates a nucleus and "S" indicates a satellite.

Examples of Discourse Parsers

Automatic discourse segmentation can be performed with different methods. For example, given a sentence, a segmentation model identifies the boundaries of the composite elementary discourse units by predicting whether a boundary should be inserted before each particular token in the sentence. For example, one framework considers each token in the sentence sequentially and independently. In this framework, the segmentation model scans the sentence token by token, and uses a binary classifier, such as a support vector machine or logistic regression, to predict whether it is appropriate to insert a boundary before the token being examined. In another example, the task is a sequential labeling problem. Once text is segmented into elementary discourse units, sentence-level discourse parsing can be performed to construct the discourse tree. Machine learning techniques can be used.

In one aspect of the present invention, two Rhetorical Structure Theory (RST) discourse parsers are used: CoreNLPProcessor which relies on constituent syntax, and FastNLPProcessor which uses dependency syntax. See Surdeanu, Mihai & Hicks, Thomas & Antonio Valenzuela-Escarcega, Marco. Two Practical Rhetorical Structure Theory Parsers. (2015).

In addition, the above two discourse parsers, i.e., CoreNLPProcessor and FastNLPProcessor use Natural Language Processing (NLP) for syntactic parsing. For example, the Stanford CoreNLP gives the base forms of words, their parts of speech, whether they are names of companies, people, etc., normalize dates, times, and numeric quantities, mark up the structure of sentences in terms of phrases and syntactic dependencies, indicate which noun phrases refer to the same entities. Practically, RST is a still theory that may work in many cases of discourse, but in some cases, it may not work. There are many variables including, but not limited to, what EDU's are in a coherent text, i.e., what discourse segmenters are used, what relations inventory is used and what relations are selected for the EDUs, the corpus of documents used for training and testing, and even what parsers are used. So for example, in Surdeanu, et al., "Two Practical Rhetorical Structure Theory Parsers," paper cited above, tests must be run on a particular corpus using specialized metrics to determine which parser gives better performance. Thus unlike computer language parsers which give predictable results, discourse parsers (and segmenters) can give unpredictable results depending on the training and/or test text corpus. Thus, discourse trees are a mixture of the predicable arts (e.g., compilers) and the unpredictable arts (e.g., like chemistry were experimentation is needed to determine what combinations will give you the desired results).

In order to objectively determine how good a Discourse analysis is, a series of metrics are being used, e.g., Precision/Recall/F1 metrics from Daniel Marcu, "The Theory and Practice of Discourse Parsing and Summarization," MIT Press, (2000). Precision, or positive predictive value is the fraction of relevant instances among the retrieved instances, while recall (also known as sensitivity) is the fraction of relevant instances that have been retrieved over the total amount of relevant instances. Both precision and recall are therefore based on an understanding and measure of relevance. Suppose a computer program for recognizing dogs in photographs identifies eight dogs in a picture containing 12 dogs and some cats. Of the eight dogs identified, five actually are dogs (true positives), while the rest are cats (false positives). The program's precision is 5/8 while its recall is 5/12. When a search engine returns 30 pages only 20 of which were relevant while failing to return 40 additional relevant pages, its precision is 20/30=2/3 while its recall is 20/60=1/3. Therefore, in this case, precision is 'how useful the search results are', and recall is 'how complete the results are.'" The F1 score (also F-score or F-measure) is a measure of a test's accuracy. It considers both the precision and the recall of the test to compute the score: F1=2× ((precision×recall)/(precision+recall)) and is the harmonic mean of precision and recall. The F1 score reaches its best value at 1 (perfect precision and recall) and worst at 0.

Autonomous Agents or Chatbots

A conversation between Human A and Human B is a form of discourse. For example, applications exist such as FaceBook® Messenger, WhatsApp®, Slack,® SMS, etc., a conversation between A and B may typically be via messages in addition to more traditional email and voice conversations. A chatbot (which may also be called intelligent bots or virtual assistant, etc.) is an "intelligent" machine that, for example, replaces human B and to various degrees mimics the conversation between two humans. An example ultimate goal is that human A cannot tell whether B is a human or a machine (the Turning test, developed by Alan Turing in 1950). Discourse analysis, artificial intelligence, including machine learning, and natural language processing, have made great strides toward the long-term goal of passing the Turing test. Of course, with computers being more and more capable of searching and processing vast repositories of data and performing complex analysis on the data to include predictive analysis, the long-term goal is the chatbot being human-like and a computer combined.

For example, users can interact with the Intelligent Bots Platform through a conversational interaction. This interaction, also called the conversational user interface (UI), is a dialogue between the end user and the chatbot, just as between two human beings. It could be as simple as the end user saying "Hello" to the chatbot and the chatbot responding with a "Hi" and asking the user how it can help, or it could be a transactional interaction in a banking chatbot, such as transferring money from one account to the other, or an informational interaction in a HR chatbot, such as checking for vacation balance, or asking an FAQ in a retail chatbot, such as how to handle returns. Natural language processing (NLP) and machine learning (ML) algorithms combined with other approaches can be used to classify end user intent. An intent at a high level is what the end user would like to accomplish (e.g., get account balance, make a purchase). An intent is essentially, a mapping of customer input to a unit of work that the backend should perform. Therefore, based on the phrases uttered by the user in the chatbot, these are mapped that to a specific and discrete use case or unit of work, for e.g. check balance, transfer money and track spending are all "use cases" that the chatbot should support and be able to work out which unit of work should be triggered from the free text entry that the end user types in a natural language.

The underlying rational for having an AI chatbot respond like a human is that the human brain can formulate and understand the request and then give a good response to the human request much better than a machine. Thus, there should be significant improvement in the request/response of a chatbot, if human B is mimicked. So an initial part of the problem is how does the human brain formulate and understand the request? To mimic, a model is used. RST and DT allow a formal and repeatable way of doing this.

At a high level, there are typically two types of requests: (1) A request to perform some action; and (2) a request for information, e.g., a question. The first type has a response in which a unit of work is created. The second type has a response that is, e.g., a good answer, to the question. The answer could take the form of, for example, in some aspects, the AI constructing an answer from its extensive knowledge base(s) or from matching the best existing answer from searching the internet or intranet or other publically/privately available data sources.

Communicative Discourse Trees and The Rhetoric Classifier

Aspects of the present disclosure build communicative discourse trees and use communicative discourse trees to analyze whether the rhetorical structure of a request or question agrees with an answer. More specifically, aspects described herein create representations of a request-response pair, learns the representations, and relates the pairs into classes of valid or invalid pairs. In this manner, an autonomous agent can receive a question from a user, process the question, for example, by searching for multiple answers, determine the best answer from the answers, and provide the answer to the user.

More specifically, to represent linguistic features of text, aspects described herein use rhetoric relations and speech acts (or communicative actions). Rhetoric relations are relationships between the parts of the sentences, typically obtained from a discourse tree. Speech acts are obtained as verbs from a verb resource such as VerbNet. By using both rhetoric relations and communicative actions, aspects described herein can correctly recognize valid request-response pairs. To do so, aspects correlate the syntactic structure of a question with that of an answer. By using the structure, a better answer can be determined.

For example, when an autonomous agent receives an indication from a person that the person desires to sell an item with certain features, the autonomous agent should provide a search result that not only contains the features but also indicates an intent to buy. In this manner, the autonomous agent has determined the user's intent. Similarly, when an autonomous agent receives a request from a person to share knowledge about a particular item, the search result should contain an intent to receive a recommendation. When a person asks an autonomous agent for an opinion about a subject, the autonomous agent shares an opinion about the subject, rather than soliciting another opinion.

Analyzing Request and Response Pairs

Figure 7:
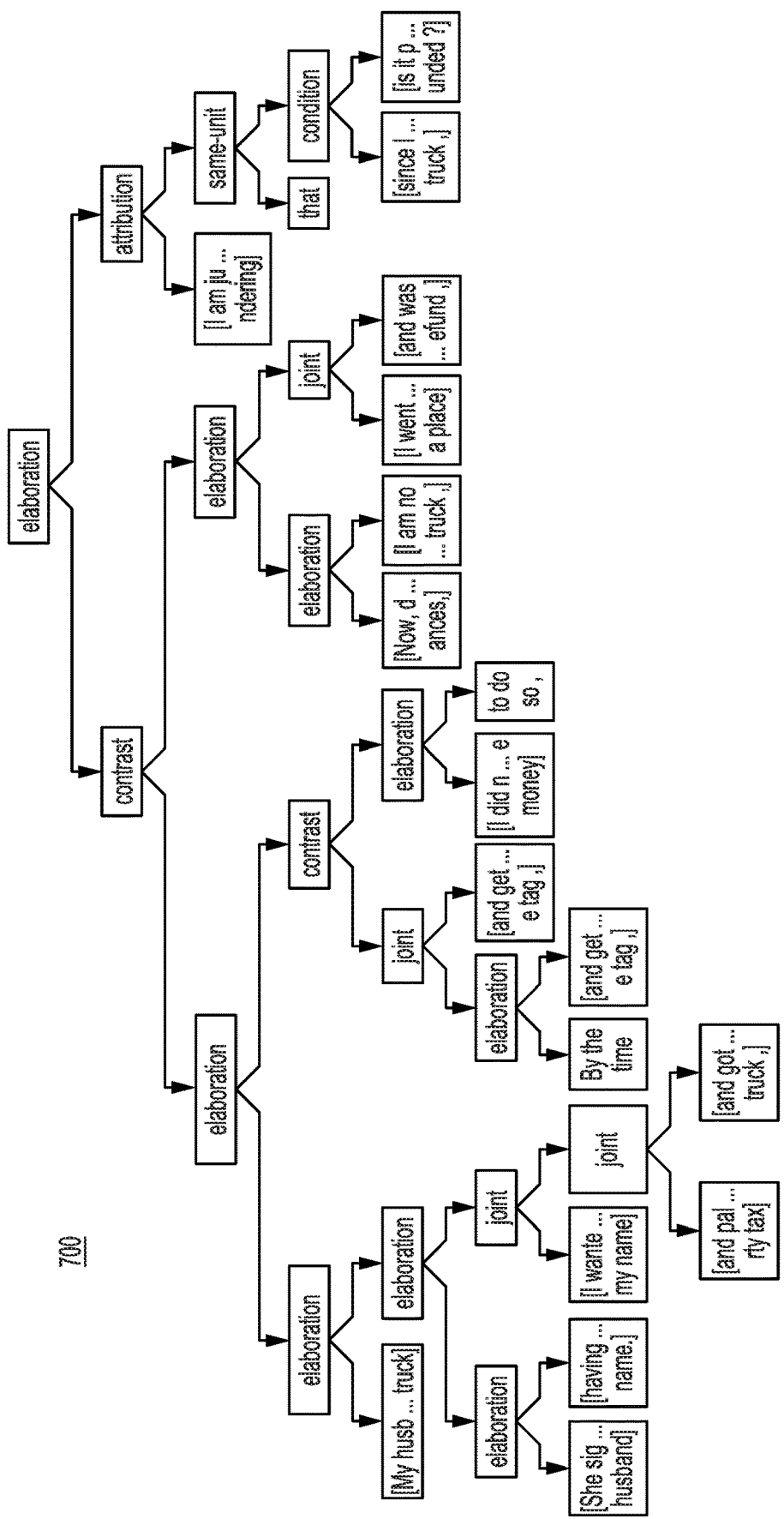
FIG. 7 depicts an exemplary discourse tree for an example request about property tax in accordance with an aspect.

FIG. 7 depicts an exemplary discourse tree for an example request about property tax in accordance with an aspect. The node labels are the relations and the arrowed line points to the satellite. The nucleus is a solid line. FIG. 7 depicts the following text.

Request: "My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund. I am just wondering that since I am not going to have a tag on this truck, is it possible to get the property tax refunded?"

Response: "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax. If you apply late, there will be penalties on top of the normal taxes and fees. You don't need to register it at the same time, but you absolutely need to title it within the period of time stipulated in state law."

As can be seen in FIG. 7, analyzing the above text results in the following. "My husbands' grandmother gave him his grandfather's truck" is elaborated by "She signed the title over but due to my husband" elaborated by "having unpaid fines on his license, he was not able to get the truck put in his name." which is elaborated by "I wanted to put in my name," "and paid the property tax", and "and got insurance for the truck."

"My husbands' grandmother gave him his grandfather's truck. She signed the title over but due to my husband having unpaid fines on his license, he was not able to get the truck put in his name. I wanted to put in my name and paid the property tax and got insurance for the truck." is elaborated by;

"I didn't have the money" elaborated by "to do so" contrasted with "By the time" elaborated by "it came to sending off the title" "and getting the tag"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so" is contrasted with "Now, due to circumstances," elaborated with "I am not going to be able to afford the truck." which is elaborated with "I went to the insurance place" "and was refused a refund"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund." is elaborated with "I am just wondering that since I am not going to have a tag on this truck, is it possible to get the property tax refunded?"

"I am just wondering" has attribution to the sub tree that includes "since I am not going to have a tag on this truck, is it possible to get the property tax refunded?"

Examining the tree "since I am not going to have a tag on this truck, is it possible to get the property tax refunded?" more closely reveals that "that" is the same unit as "is it possible to get the property tax refunded?" which has condition "since I am not going to have a tag on this truck"

As can be seen, the main subject of the topic is "Property tax on a car". The question includes the contradiction: on one hand, all properties are taxable, and on the other hand, the ownership is somewhat incomplete. A good response has to address both topic of the question and clarify the inconsistency. To do that, the responder is making even stronger claim concerning the necessity to pay tax on whatever is owned irrespectively of the registration status. This example is a member of positive training set from our Yahoo! Answers evaluation domain. The main subject of the topic is "Property tax on a car". The question includes the contradiction: on one hand, all properties are taxable, and on the other hand, the ownership is somewhat incomplete. A good answer/response has to address both topic of the question and clarify the inconsistency. The reader can observe that since the question includes rhetoric relation of contrast, the answer has to match it with a similar relation to be convincing. Otherwise, this answer would look incomplete even to those who are not domain experts.

Figure 8:
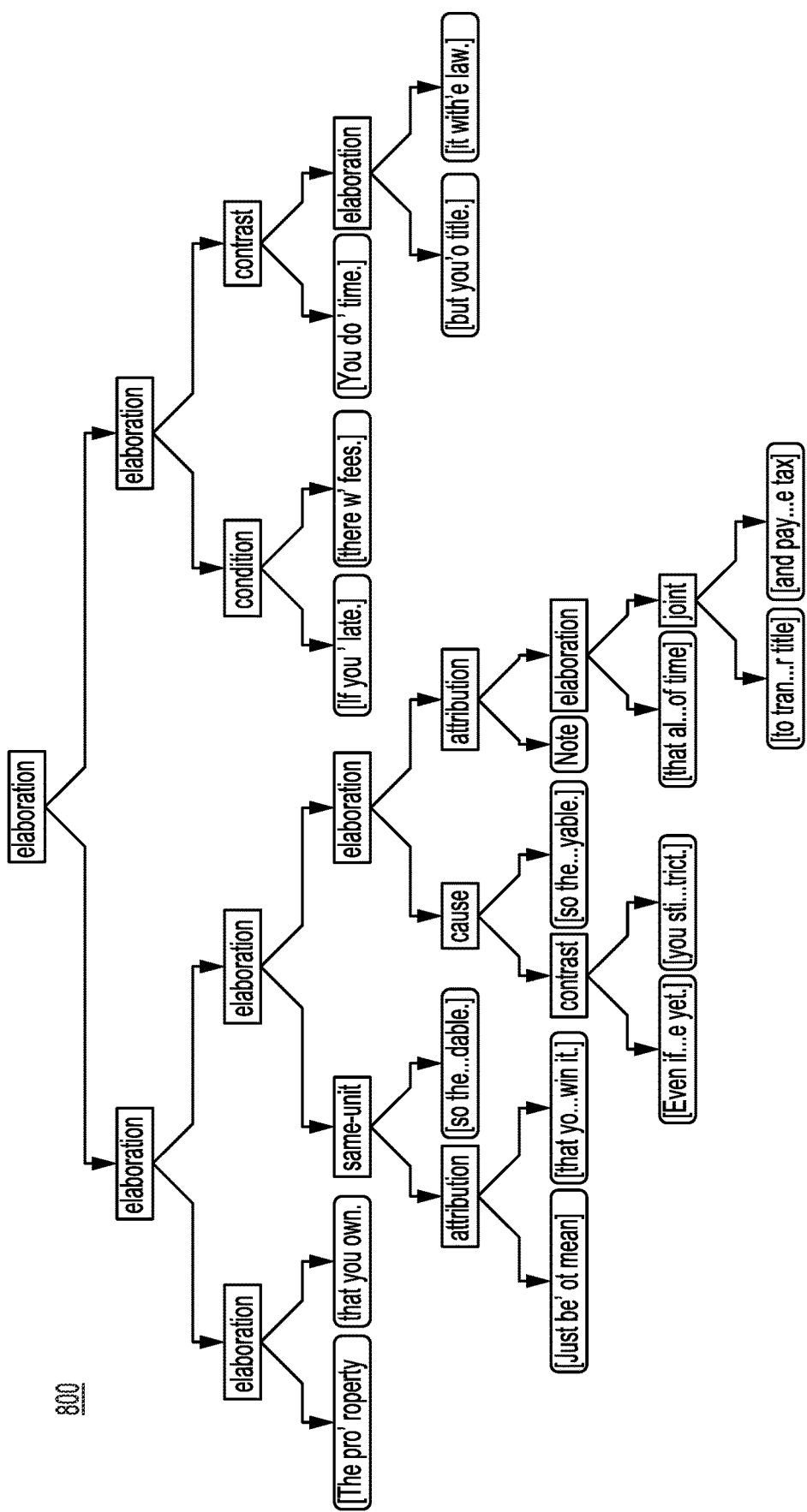
FIG. 8 depicts an exemplary response for the question represented in FIG. 7.

FIG. 8 depicts an exemplary response for the question represented in FIG. 7, according to certain aspects of the present invention. The central nucleus is "the property tax is assessed on property" elaborated by "that you own". "The property tax is assessed on property that you own" is also a nucleus elaborated by "Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax."

The nucleus "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax." is elaborated by "there will be penalties on top of the normal taxes and fees" with condition "If you apply late," which in turn is elaborated by the contrast of "but you absolutely need to title it within the period of time stipulated in state law." and "You don't need to register it at the same time.".

Comparing the DT of FIG. 7 and DT of FIG. 8, enables a determination of how well matched the response (FIG. 8) is to the request (FIG. 7). In some aspects of the present invention, the above framework is used, at least in part, to determine the DTs for the request/response and the rhetoric agreement between the DTs.

In another example, the question "What does The Investigative Committee of the Russian Federation do" has at least two answers, for example, an official answer or an actual answer.

Figure 9:
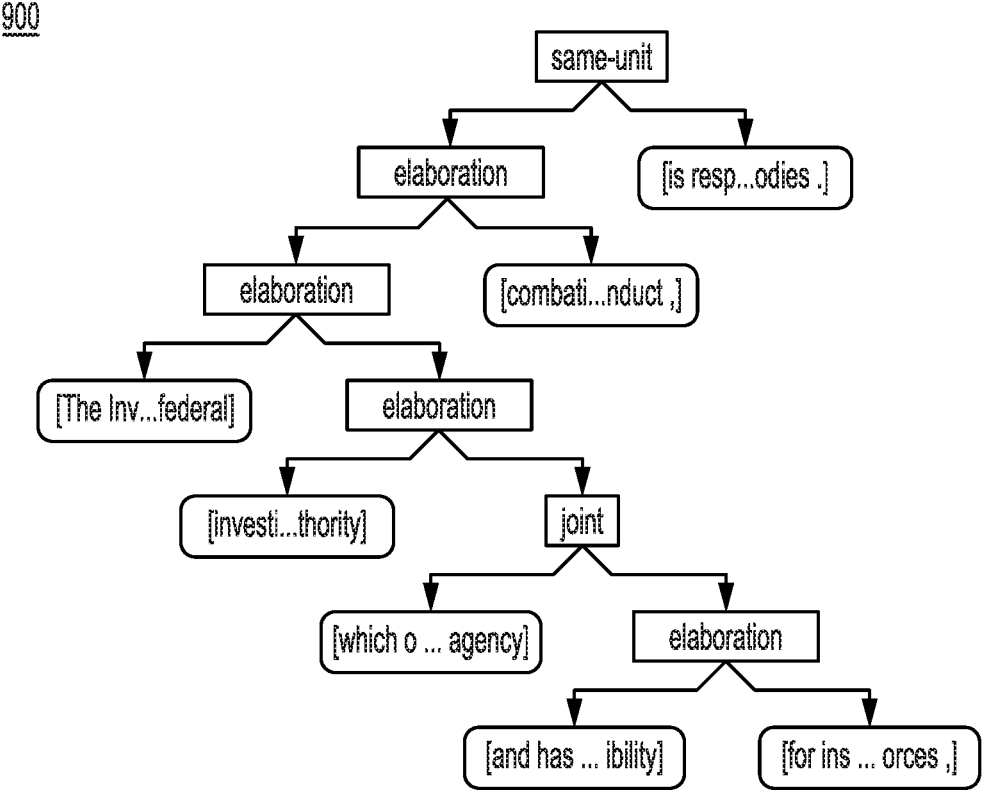
FIG. 9 illustrates a discourse tree for an official answer in accordance with an aspect.

FIG. 9 illustrates a discourse tree for an official answer in accordance with an aspect. As depicted in FIG. 9, an official answer, or mission statement states that "The Investigative Committee of the Russian Federation is the main federal investigating authority which operates as Russia's Anti-corruption agency and has statutory responsibility for inspecting the police forces, combating police corruption and police misconduct, is responsible for conducting investigations into local authorities and federal governmental bodies."

Figure 10:
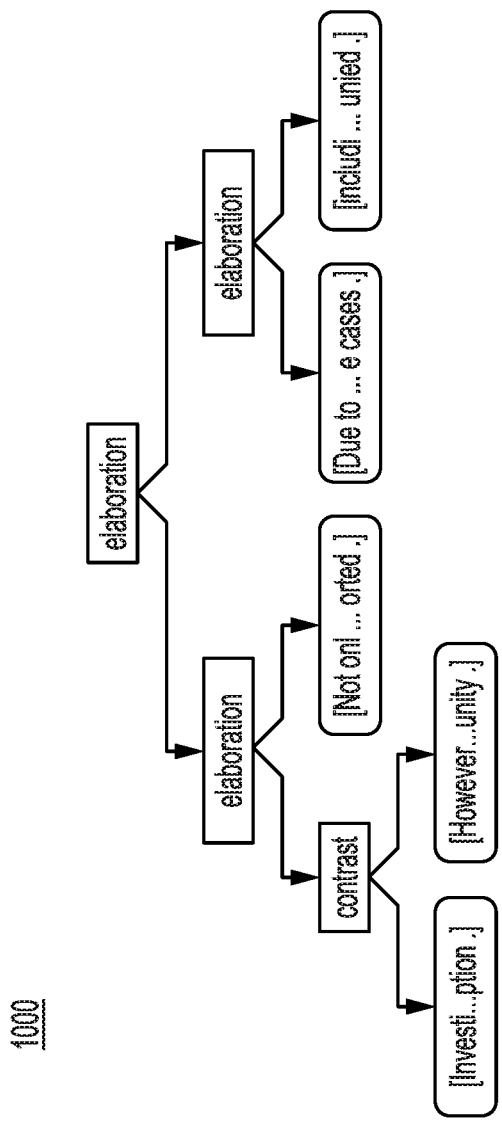
FIG. 10 illustrates a discourse tree for a raw answer in accordance with an aspect.

FIG. 10 illustrates a discourse tree for a raw answer in accordance with an aspect. As depicted in FIG. 10, another, perhaps more honest, answer states that "Investigative Committee of the Russian Federation is supposed to fight corruption. However, top-rank officers of the Investigative Committee of the Russian Federation are charged with creation of a criminal community. Not only that, but their involvement in large bribes, money laundering, obstruction of justice, abuse of power, extortion, and racketeering has been reported. Due to the activities of these officers, dozens of high-profile cases including the ones against criminal lords had been ultimately ruined."

The choice of answers depends on context. Rhetoric structure allows differentiating between "official", "politically correct", template-based answers and "actual", "raw", "reports from the field", or "controversial" answers, see FIGS. 9 and 10). Sometimes, the question itself can give a hint about which category of answers is expected. If a question is formulated as a factoid or definitional one, without a second meaning, then the first category of answers is suitable. Otherwise, if a question has the meaning "tell me what it really is", then the second category is appropriate. In general, after extracting a rhetoric structure from a question, selecting a suitable answer that would have a similar, matching, or complementary rhetoric structure is easier.

The official answer is based on elaboration and joints, which are neutral in terms of controversy a text might contain (See FIG. 9). At the same time, the row answer includes the contrast relation. This relation is extracted between the phrase for what an agent is expected to do and what this agent was discovered to have done.

Classification of Request-Response Pairs

Rhetoric agreement application 102 can determine whether a given answer or response, such as an answer obtained from answer database 105 or a public database, is responsive to a given question, or request. More specifically, rhetoric agreement application 102 analyzes whether a request and response pair is correct or incorrect by determining one or both of (i) relevance or (ii) rhetoric agreement between the request and the response. Rhetoric agreement can be analyzed without taking into account relevance, which can be treated orthogonally.

Rhetoric agreement application 102 can determine similarity between question-answer pairs using different methods. For example, rhetoric agreement application 102 can determine level of similarity between an individual question and an individual answer. Alternatively, rhetoric agreement application 102 can determine a measure of similarity between a first pair including a question and an answer, and a second pair including a question and answer.

For example, rhetoric agreement application 102 uses rhetoric agreement classifier 120 trained to predict matching or non-matching answers. Rhetoric agreement application 102 can process two pairs at a time, for example <q1, a1> and <q2, a2>. Rhetoric agreement application 102 compares q1 with q2 and a1 with a1, producing a combined similarity score. Such a comparison allows a determination of whether an unknown question/answer pair contains a correct answer or not by assessing a distance from another question/answer pair with a known label. In particular, an unlabeled pair <q2, a2> can be processed so that rather than "guessing" correctness based on words or structures shared by q2 and a2, both q2 and a2 can be compared with their corresponding components q1 and a2 of the labeled pair <q2, a2> on the grounds of such words or structures. Because this approach targets a domain-independent classification of an answer, only the structural cohesiveness between a question and answer can be leveraged, not 'meanings' of answers.

In an aspect, rhetoric agreement application 102 uses training data 125 to train rhetoric agreement classifier 120. In this manner, rhetoric agreement classifier 120 is trained to determine a similarity between pairs of questions and answers. This is a classification problem. Training data 125 can include a positive training set and a negative training set. Training data 125 includes matching request-response pairs in a positive dataset and arbitrary or lower relevance or appropriateness request-response pairs in a negative dataset. For the positive dataset, various domains with distinct acceptance criteria are selected that indicate whether an answer or response is suitable for the question.

Each training dataset includes a set of training pairs. Each training set includes a question communicative discourse tree that represents a question and an answer communicative discourse tree that represents an answer and an expected level of complementarity between the question and answer. By using an iterative process, rhetoric agreement application 102 provides a training pair to rhetoric agreement classifier 120 and receives, from the model, a level of complementarity. Rhetoric agreement application 102 calculates a loss function by determining a difference between the determined level of complementarity and an expected level of complementarity for the particular training pair. Based on the loss function, rhetoric agreement application 102 adjusts internal parameters of the classification model to minimize the loss function.

Acceptance criteria can vary by application. For example, acceptance criteria may be low for community question answering, automated question answering, automated and manual customer support systems, social network communications and writing by individuals such as consumers about their experience with products, such as reviews and complaints. RR acceptance criteria may be high in scientific texts, professional journalism, health and legal documents in the form of FAQ, professional social networks such as "stackoverflow."

Communicative Discourse Trees (CDTs)

Rhetoric agreement application 102 can create, analyze, and compare communicative discourse trees. Communicative discourse trees are designed to combine rhetoric information with speech act structures. CDTs include with arcs labeled with expressions for communicative actions. By combining communicative actions, CDTs enable the modeling of RST relations and communicative actions. A CDT is a reduction of a parse thicket. See Galitsky, B, Ilvovsky, D. and Kuznetsov S O. Rhetoric Map of an Answer to Compound Queries Knowledge Trail Inc. ACL 2015, 681-686. ("Galitsky 2015"). A parse thicket is a combination of parse trees for sentences with discourse-level relationships between words and parts of the sentence in one graph. By incorporating labels that identify speech actions, learning of communicative discourse trees can occur over a richer features set than just rhetoric relations and syntax of elementary discourse units (EDUs).

In an example, a dispute between three parties concerning the causes of a downing of a commercial airliner, Malaysia Airlines Flight 17 is analyzed. An RST representation of the arguments being communicated is built. In the example, three conflicting agents, Dutch investigators, The Investigative Committee of the Russian Federation, and the self-proclaimed Donetsk People's Republic exchange their opinions on the matter. The example illustrates a controversial conflict where each party does all it can to blame its opponent. To sound more convincing, each party does not just produce its claim but formulates a response in a way to rebuff the claims of an opponent. To achieve this goal, each party attempts to match the style and discourse of the opponents' claims.

Figure 11:
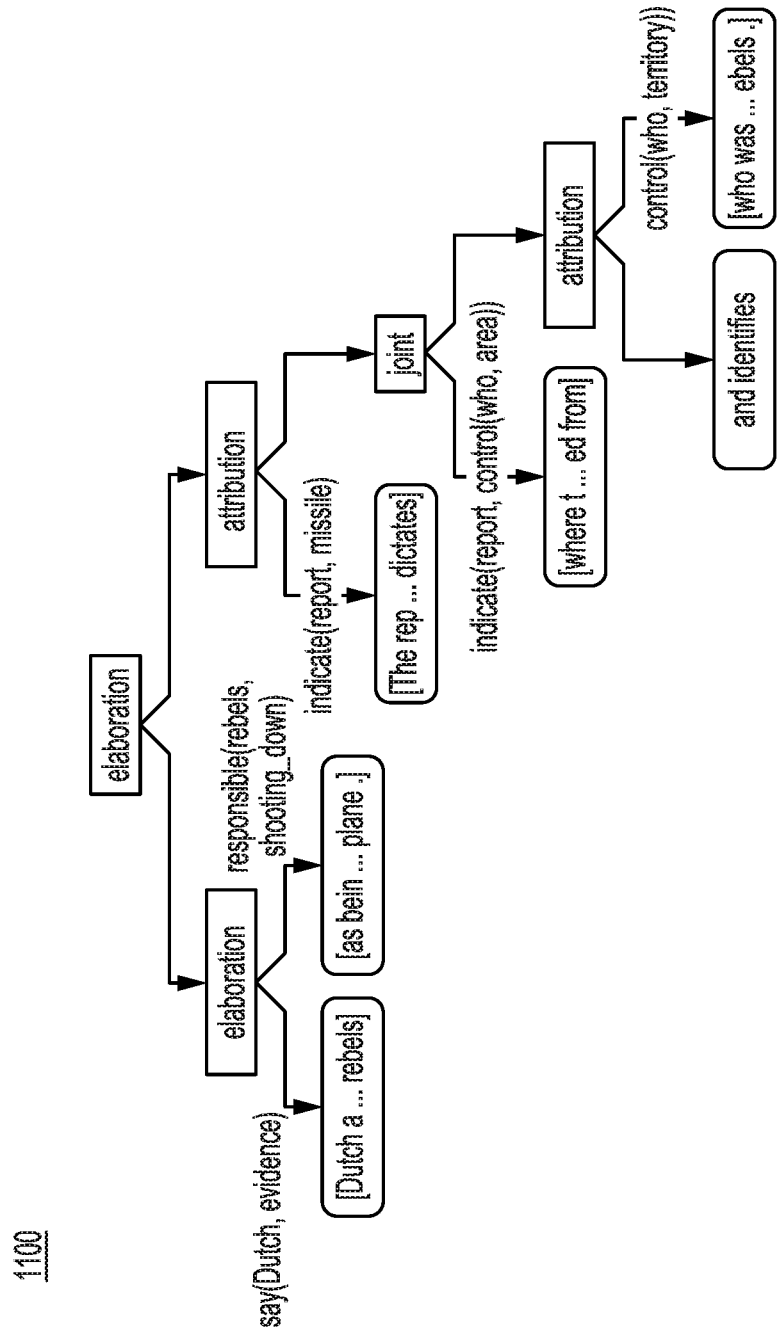
FIG. 11 illustrates a communicative discourse tree for a claim of a first agent in accordance with an aspect.

FIG. 11 illustrates a communicative discourse tree for a claim of a first agent in accordance with an aspect. FIG. 11 depicts communicative discourse tree 100, which represents the following text: "Dutch accident investigators say that evidence points to pro-Russian rebels as being responsible for shooting down plane. The report indicates where the missile was fired from and identifies who was in control of the territory and pins the downing of MH17 on the pro-Russian rebels."

As can be seen from FIG. 11, non-terminal nodes of CDTs are rhetoric relations, and terminal nodes are elementary discourse units (phrases, sentence fragments) which are the subjects of these relations. Certain arcs of CDTs are labeled with the expressions for communicative actions, including the actor agent and the subject of these actions (what is being communicated). For example, the nucleus node for elaboration relation (on the left) are labeled with say (Dutch, evidence), and the satellite with responsible(rebels, shooting down). These labels are not intended to express that the subjects of EDUs are evidence and shooting down but instead for matching this CDT with others for the purpose of finding similarity between them. In this case just linking these communicative actions by a rhetoric relation and not providing information of communicative discourse would be too limited way to represent a structure of what and how is being communicated. A requirement for an RR pair to have the same or coordinated rhetoric relation is too weak, so an agreement of CDT labels for arcs on top of matching nodes is required.

The straight edges of this graph are syntactic relations, and curvy arcs are discourse relations, such as anaphora, same entity, sub-entity, rhetoric relation and communicative actions. This graph includes much richer information than just a combination of parse trees for individual sentences. In addition to CDTs, parse thickets can be generalized at the level of words, relations, phrases and sentences. The speech actions are logic predicates expressing the agents involved in the respective speech acts and their subjects. The arguments of logical predicates are formed in accordance to respective semantic roles, as proposed by a framework such as VerbNet. See Karin Kipper, Anna Korhonen, Neville Ryant, Martha Palmer, "A Large-scale Classification of English Verbs," Language Resources and Evaluation Journal, 42(1), pp. 21-40, Springer Netherland, 2008. and/or Karin Kipper Schuler, Anna Korhonen, Susan W. Brown, VerbNet overview, extensions, mappings and apps, Tutorial, NAACL-HLT 2009, Boulder, Colo.

Figure 12:
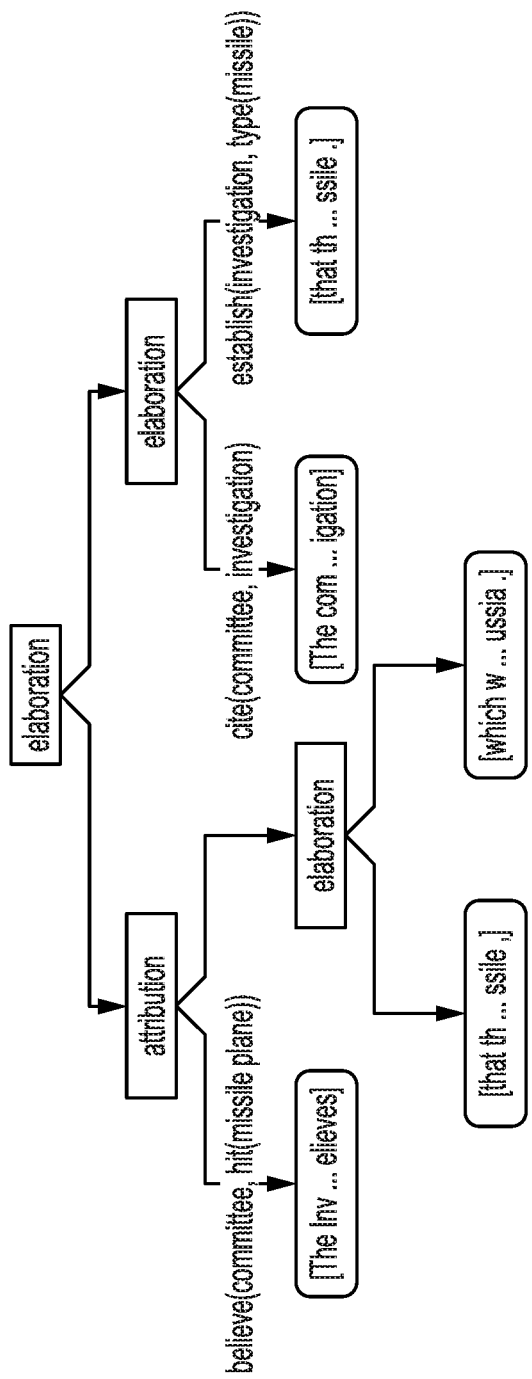
FIG. 12 illustrates a communicative discourse tree for a claim of a second agent in accordance with an aspect.

FIG. 12 illustrates a communicative discourse tree for a claim of a second agent in accordance with an aspect. FIG. 12 depicts communicative discourse tree 1200, which represents the following text: "The Investigative Committee of the Russian Federation believes that the plane was hit by a missile, which was not produced in Russia. The committee cites an investigation that established the type of the missile."

Figure 13:
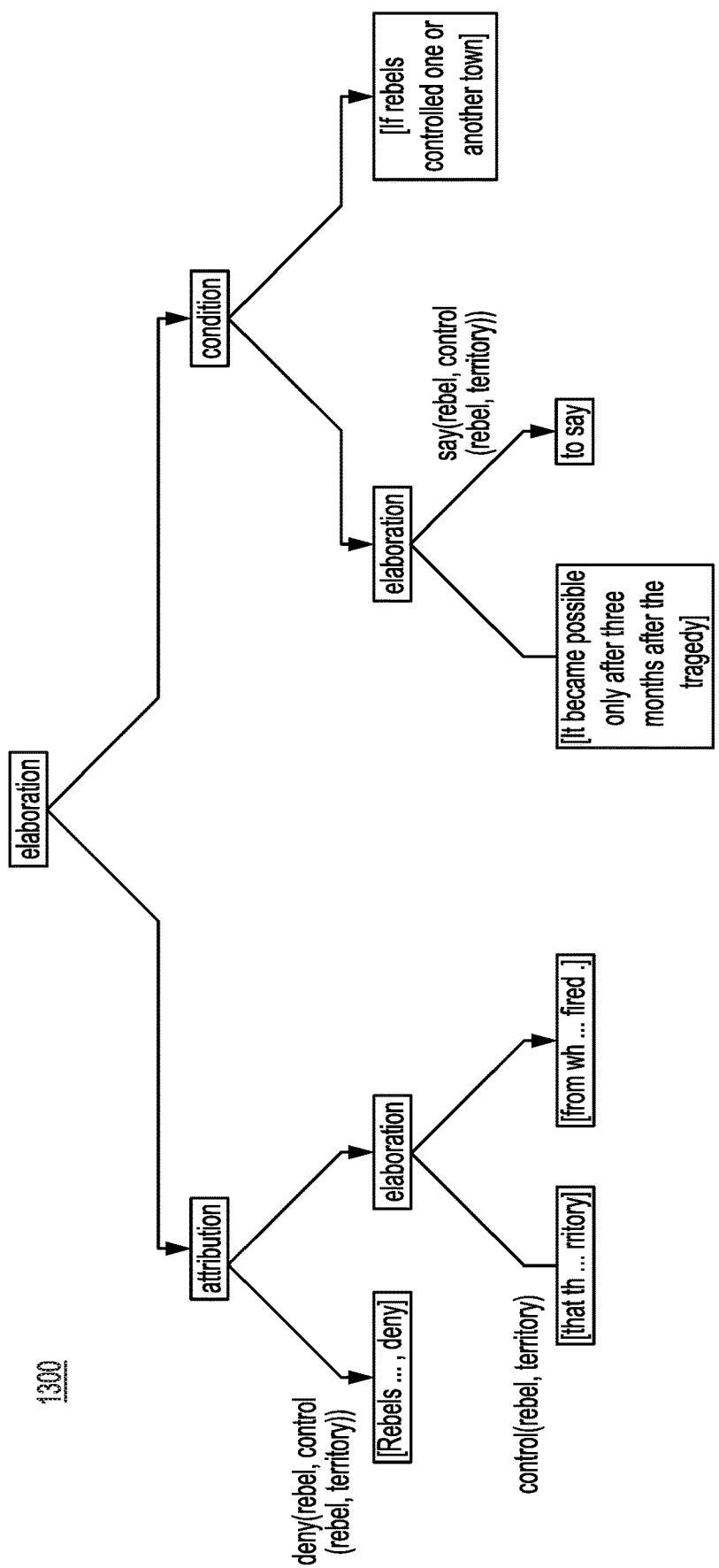
FIG. 13 illustrates a communicative discourse tree for a claim of a third agent in accordance with an aspect.

FIG. 13 illustrates a communicative discourse tree for a claim of a third agent in accordance with an aspect. FIG. 13 depicts communicative discourse tree 1300, which represents the following text: "Rebels, the self-proclaimed Donetsk People's Republic, deny that they controlled the territory from which the missile was allegedly fired. It became possible only after three months after the tragedy to say if rebels controlled one or another town."

As can be seen from communicative discourse trees 1100-1300, a response is not arbitrary. A response talks about the same entities as the original text. For example, communicative discourse trees 1200 and 1300 are related to communicative discourse tree 1100. A response backs up a disagreement with estimates and sentiments about these entities, and about actions of these entities.

More specifically, replies of involved agent need to reflect the communicative discourse of the first, seed message. As a simple observation, because the first agent uses Attribution to communicate his claims, the other agents have to follow the suite and either provide their own attributions or attack the validity of attribution of the proponent, or both. To capture a broad variety of features for how communicative structure of the seed message needs to be retained in consecutive messages, pairs of respective CDTs can be learned.

To verify the agreement of a request-response, discourse relations or speech acts (communicative actions) alone are often insufficient. As can be seen from the example depicted in FIGS. 11-13, the discourse structure of interactions between agents and the kind of interactions are useful. However, the domain of interaction (e.g., military conflicts or politics) or the subjects of these interactions, i.e., the entities, do not need to be analyzed.

Representing Rhetoric Relations and Communicative Actions

In order to compute similarity between abstract structures, two approaches are frequently used: (1) representing these structures in a numerical space, and express similarity as a number, which is a statistical learning approach, or (2) using a structural representation, without numerical space, such as trees and graphs, and expressing similarity as a maximal common sub-structure. Expressing similarity as a maximal common sub-structure is referred to as generalization.

Learning communicative actions helps express and understand arguments. Computational verb lexicons help support acquisition of entities for actions and provide a rule-based form to express their meanings. Verbs express the semantics of an event being described as well as the relational information among participants in that event, and project the syntactic structures that encode that information. Verbs, and in particular communicative action verbs, can be highly variable and can display a rich range of semantic behaviors. In response, verb classification helps a learning systems to deal with this complexity by organizing verbs into groups that share core semantic properties.

VerbNet is one such lexicon, which identifies semantic roles and syntactic patterns characteristic of the verbs in each class and makes explicit the connections between the syntactic patterns and the underlying semantic relations that can be inferred for all members of the class. See Karin Kipper, Anna Korhonen, Neville Ryant and Martha Palmer, *Language Resources and Evaluation*, Vol. 42, No. 1 (March 2008), at 21. Each syntactic frame, or verb signature, for a class has a corresponding semantic representation that details the semantic relations between event participants across the course of the event.

For example, the verb amuse is part of a cluster of similar verbs that have a similar structure of arguments (semantic roles) such as amaze, anger, arouse, disturb, and irritate. The roles of the arguments of these communicative actions are as follows: Experiencer (usually, an animate entity), Stimulus, and Result. Each verb can have classes of meanings differentiated by syntactic features for how this verb occurs in a sentence, or frames. For example, the frames for amuse are as follows, using the following key noun phrase (NP), noun (N), communicative action (V), verb phrase (VP), adverb (ADV):

NP V NP. Example: "The teacher amused the children." Syntax: Stimulus V Experiencer. Clause: amuse(Stimulus, E, Emotion, Experiencer), cause(Stimulus, E), emotional_state(result(E), Emotion, Experiencer).

NP V ADV-Middle. Example: "Small children amuse quickly." Syntax: Experiencer V ADV. Clause: amuse(Experiencer, Prop):-, property(Experiencer, Prop), adv(Prop).

NP V NP-PRO-ARB. Example "The teacher amused." Syntax Stimulus V. amuse(Stimulus, E, Emotion, Experiencer): cause(Stimulus, E), emotional_state(result(E), Emotion, Experiencer).

NP.cause V NP. Example "The teacher's dolls amused the children." syntax Stimulus <+genitive>('s) V Experiencer. amuse(Stimulus, E, Emotion, Experiencer): cause(Stimulus, E), emotional_state(during(E), Emotion, Experiencer).

NP V NP ADJ. Example "This performance bored me totally." syntax Stimulus V Experiencer Result. amuse(Stimulus, E, Emotion, Experiencer). cause(Stimulus, E), emotional_state(result(E), Emotion, Experiencer), Pred(result(E), Experiencer).

Communicative actions can be characterized into clusters, for example:

Verbs with Predicative Complements (Appoint, characterize, dub, declare, conjecture, masquerade, orphan, captain, consider, classify), Verbs of Perception (See, sight, peer).

Verbs of Psychological State (Amuse, admire, marvel, appeal), Verbs of Desire (Want, long).

Judgment Verbs (Judgment), Verbs of Assessment (Assess, estimate), Verbs of Searching (Hunt, search, stalk, investigate, rummage, ferret), Verbs of Social Interaction (Correspond, marry, meet, battle), Verbs of Communication (Transfer(message), inquire, interrogate, tell, manner (speaking), talk, chat, say, complain, advise, confess, lecture, overstate, promise). Avoid Verbs (Avoid), Measure Verbs, (Register, cost, fit, price, bill), Aspectual Verbs (Begin, complete, continue, stop, establish, sustain.

Aspects described herein provide advantages over statistical learning models. In contrast to statistical solutions, aspects use a classification system can provide a verb or a verb-like structure which is determined to cause the target feature (such as rhetoric agreement). For example, statistical machine learning models express similarity as a number, which can make interpretation difficult.

Representing Request-Response Pairs

Representing request-response pairs facilitates classification based operations based on a pair. In an example, request-response pairs can be represented as parse thickets. A parse thicket is a representation of parse trees for two or more sentences with discourse-level relationships between words and parts of the sentence in one graph. See Galitsky 2015. Topical similarity between question and answer can expressed as common sub-graphs of parse thickets. The higher the number of common graph nodes, the higher the similarity.

Figure 14:
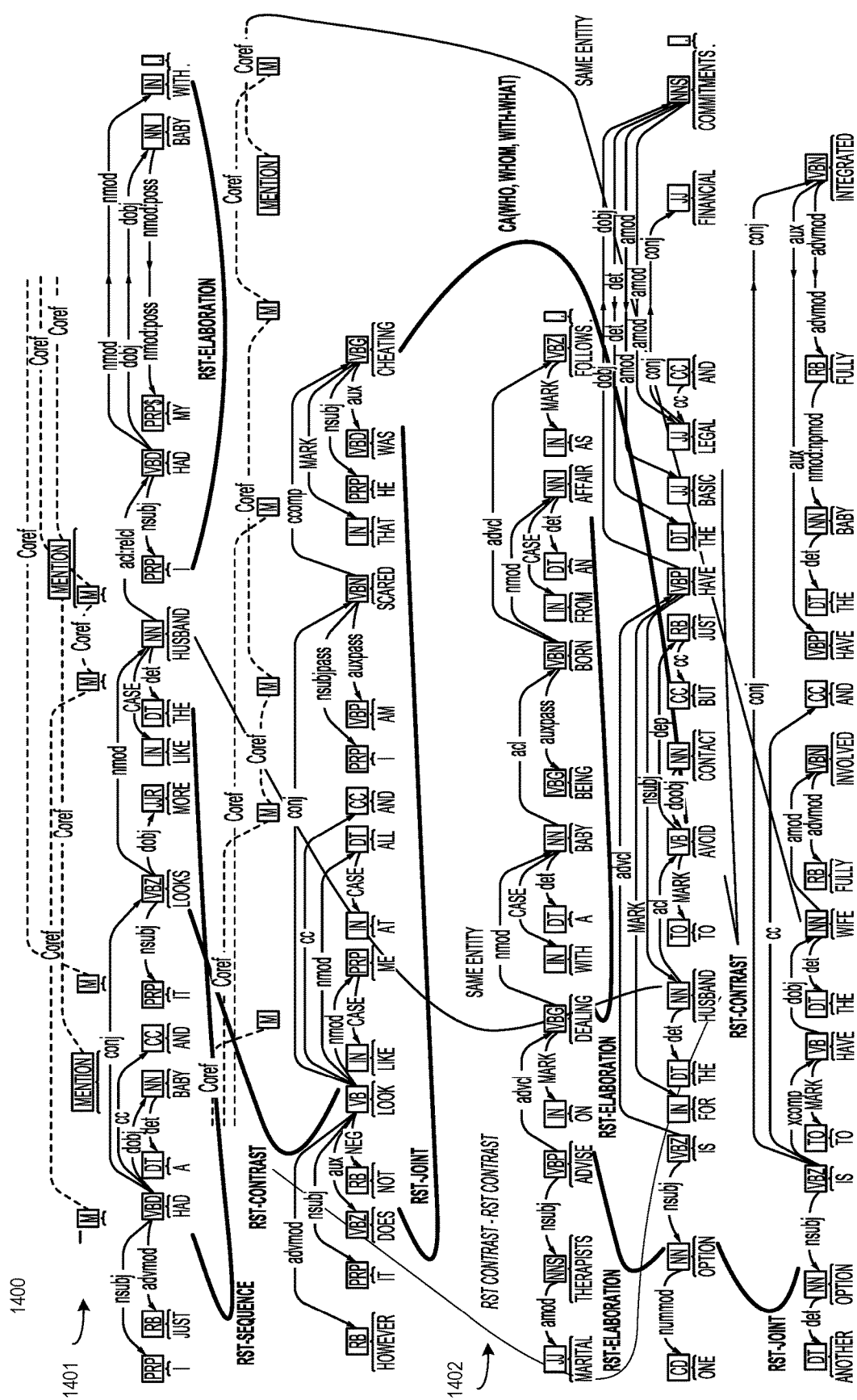
FIG. 14 illustrates parse thickets in accordance with an aspect.

FIG. 14 illustrates parse thickets in accordance with an aspect. FIG. 14 depicts parse thicket 1400 including a parse tree 1401 for a request, and a parse tree for a corresponding response 1402.

Parse tree 1401 represents the question "I just had a baby and it looks more like the husband I had my baby with. However it does not look like me at all and I am scared that he was cheating on me with another lady and I had her kid. This child is the best thing that has ever happened to me and I cannot imagine giving my baby to the real mom."

Response 1402 represents the response "Marital therapists advise on dealing with a child being born from an affair as follows. One option is for the husband to avoid contact but just have the basic legal and financial commitments. Another option is to have the wife fully involved and have the baby fully integrated into the family just like a child from a previous marriage."

FIG. 14 represents a greedy approach to representing linguistic information about a paragraph of text. The straight edges of this graph are syntactic relations, and curvy arcs are discourse relations, such as anaphora, same entity, sub-entity, rhetoric relation and communicative actions. The solid arcs are for same entity/sub-entity/anaphora relations, and the dotted arcs are for rhetoric relations and communicative actions. Oval labels in straight edges denote the syntactic relations. Lemmas are written in the boxes for the nodes, and lemma forms are written on the right side of the nodes.

Parse thicket 1400 includes much richer information than just a combination of parse trees for individual sentences. Navigation through this graph along the edges for syntactic relations as well as arcs for discourse relations allows to transform a given parse thicket into semantically equivalent forms for matching with other parse thickets, performing a text similarity assessment task. To form a complete formal representation of a paragraph, as many links as possible are expressed. Each of the discourse arcs produces a pair of thicket phrases that can be a potential match.

Topical similarity between the seed (request) and response is expressed as common sub-graphs of parse thickets. They are visualized as connected clouds. The higher the number of common graph nodes, the higher the similarity. For rhetoric agreement, common sub-graph does not have to be large as it is in the given text. However, rhetoric relations and communicative actions of the seed and response are correlated and a correspondence is required.

Generalization for Communicative Actions

A similarity between two communicative actions $A_1$ and $A_2$ is defined as a an abstract verb which possesses the features which are common between $A_1$ and $A_2$. Defining a similarity of two verbs as an abstract verb-like structure supports inductive learning tasks, such as a rhetoric agreement assessment. In an example, a similarity between the following two common verbs, agree and disagree, can be generalized as follows: agree ˆ disagree=verb(Interlocutor, Proposed_action, Speaker),where Interlocution is the person who proposed the Proposed_action to the Speaker and to whom the Speaker communicates their response. Proposed_action is an action that the Speaker would perform if they were to accept or refuse the request or offer, and The Speaker is the person to whom a particular action has been proposed and who responds to the request or offer made.

In a further example, a similarity between verbs agree and explain is represented as follows: agree ˆ explain=verb (Interlocutor, *, Speaker). The subjects of communicative actions are generalized in the context of communicative actions and are not be generalized with other "physical" actions. Hence, aspects generalize individual occurrences of communicative actions together with corresponding subjects.

Additionally, sequences of communicative actions representing dialogs can be compared against other such sequences of similar dialogs. In this manner, the meaning of an individual communicative action as well as the dynamic discourse structure of a dialogue is (in contrast to its static structure reflected via rhetoric relations) is represented. A generalization is a compound structural representation that happens at each level. Lemma of a communicative action is generalized with lemma, and its semantic role are generalized with respective semantic role.

Communicative actions are used by text authors to indicate a structure of a dialogue or a conflict. See Searle, J. R. 1969, Speech acts: an essay in the philosophy of language. London: Cambridge University Press. Subjects are generalized in the context of these actions and are not generalized with other "physical" actions. Hence, the individual occurrences of communicative actions together are generalized with their subjects, as well as their pairs, as discourse "steps."

Generalization of communicative actions can also be thought of from the standpoint of matching the verb frames, such as VerbNet. The communicative links reflect the discourse structure associated with participation (or mentioning) of more than a single agent in the text. The links form a sequence connecting the words for communicative actions (either verbs or multi-words implicitly indicating a communicative intent of a person).

Communicative actions include an actor, one or more agents being acted upon, and the phrase describing the features of this action. A communicative action can be described as a function of the form: verb (agent, subject, cause), where verb characterizes some type of interaction between involved agents (e.g., explain, confirm, remind, disagree, deny, etc.), subject refers to the information transmitted or object described, and cause refers to the motivation or explanation for the subject.

A scenario (labeled directed graph) is a sub-graph of a parse thicket $G=(V, A)$, where $V=\{action_1, action_2 \ action_n\}$ is a finite set of vertices corresponding to communicative actions, and A is a finite set of labeled arcs (ordered pairs of vertices), classified as follows:

Each arc $action_i$, $action_j \in A_{sequence}$ corresponds to a temporal precedence of two actions $v_i$, $ag_i$, $s_i$, $c_j$ and $v_j$, $ag_j$, $s_j$, $c_j$ that refer to the same subject, e.g., $s_j=s_i$ or different subjects. Each arc $action_i$, $action_j \in A_{cause}$ corresponds to an attack relationship between $action_i$ and $action_j$ indicating that the cause of $action_i$ in conflict with the subject or cause of $action_j$.

Subgraphs of parse thickets associated with scenarios of interaction between agents have some distinguishing features. For example, (1) all vertices are ordered in time, so that there is one incoming arc and one outgoing arc for all vertices (except the initial and terminal vertices), (2) for $A_{sequence}$ arcs, at most one incoming and only one outgoing arc are admissible, and (3) for $A_{cause}$ arcs, there can be many outgoing arcs from a given vertex, as well as many incoming arcs. The vertices involved may be associated with different agents or with the same agent (i.e., when he contradicts himself). To compute similarities between parse thickets and their communicative action, induced subgraphs, the subgraphs of the same configuration with similar labels of arcs and strict correspondence of vertices are analyzed.

The following similarities exist by analyzing the arcs of the communicative actions of a parse thicket: (1) one communicative action from with its subject from T1 against another communicative action with its subject from T2 (communicative action arc is not used), and (2) a pair of communicative actions with their subjects from T1 compared to another pair of communicative actions from T2 (communicative action arcs are used).

Generalizing two different communicative actions is based on their attributes. See (Galitsky et al 2013). As can be seen in the example discussed with respect to FIG. 14, one communicative action from T1, cheating(husband, wife, another lady) can be compared with a second from T2, avoid(husband, contact(husband, another lady)). A generalization results in communicative_action(husband, *) which introduces a constraint on A in the form that if a given agent (=husband) is mentioned as a subject of CA in Q, he(she) should also be a subject of (possibly, another) CA in A. Two communicative actions can always be generalized, which is not the case for their subjects: if their generalization result is empty, the generalization result of communicative actions with these subjects is also empty.

Generalization of RST Relations

Some relations between discourse trees can be generalized, such as arcs that represent the same type of relation (presentation relation, such as antithesis, subject matter relation, such as condition, and multinuclear relation, such as list) can be generalized. A nucleus or a situation presented by a nucleus is indicated by "N." Satellite or situations presented by a satellite, are indicated by "S." "W" indicates a writer. "R" indicates a reader (hearer). Situations are propositions, completed actions or actions in progress, and communicative actions and states (including beliefs, desires, approve, explain, reconcile and others). Generalization of two RST relations with the above parameters is expressed as:

rst1(N1, S1, W1, R1) ˆ rst2(N2, S2, W2, R2)=(rst1 ˆ rst2)(N1ˆ N2, S1ˆ S2, W1ˆ W2, R1ˆR2).

The texts in N1, S1, W1, R1 are subject to generalization as phrases. For example, rst1 ˆrst2 can be generalized as follows: (1) if relation_type(rst1)!=relation_type(rst2) then a generalization is empty. (2) Otherwise, the signatures of rhetoric relations are generalized as sentences: sentence(N1, S1, W1, R1) sentence(N2, S2, W2, R2). See Iruskieta, Mikel, Iria da Cunha and Maite Taboada. A qualitative comparison method for rhetorical structures: identifying different discourse structures in multilingual corpora. Lang Resources & Evaluation. June 2015, Volume 49, Issue 2.

For example, the meaning of rst−backgroundˆrst−enablement=(S increases the ability of R to comprehend an element in N) ˆ (R comprehending S increases the ability of R to perform the action in N)=increase-VB the-DT ability-NN of-IN R-NN to-IN.

Because the relations rst−backgroundˆrst−enablement differ, the RST relation part is empty. The expressions that are the verbal definitions of respective RST relations are then generalized. For example, for each word or a placeholder for a word such as an agent, this word (with its POS) is retained if the word the same in each input phrase or remove the word if the word is different between these phrases. The resultant expression can be interpreted as a common meaning between the definitions of two different RST relations, obtained formally.

Two arcs between the question and the answer depicted in FIG. 14 show the generalization instance based on the RST relation "RST-contrast". For example, "I just had a baby" is a RST-contrast with "it does not look like me," and related to "husband to avoid contact" which is a RST-contrast with "have the basic legal and financial commitments." As can be seen, the answer need not have to be similar to the verb phrase of the question but the rhetoric structure of the question and answer are similar. Not all phrases in the answer must match phrases in question. For example, the phrases that do not match have certain rhetoric relations with the phrases in the answer which are relevant to phrases in question.

Determining Rhetorical Agreement

Certain aspects use communicative discourse trees to determine rhetorical agreement, or complementarity, between a question and an answer. By using communicative discourse trees, rhetoric agreement application 102 can manage the dialog between autonomous agent and user.

Figure 15:
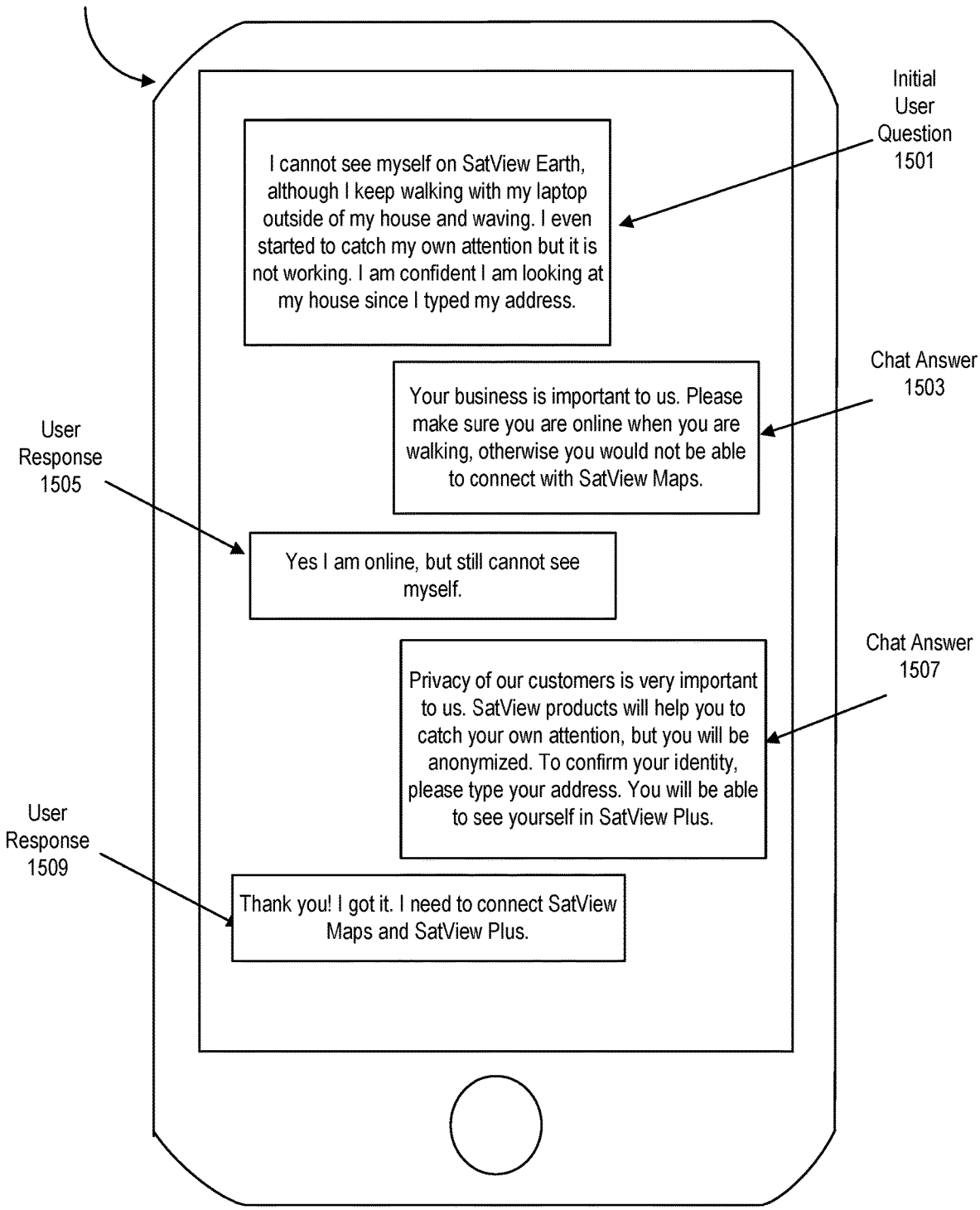
FIG. 15 illustrates an example of a conversation with multiple dialogue sequences between a user on a mobile device and a chat bot management server in accordance with an aspect.

FIG. 15 illustrates an example of a conversation with multiple dialogue sequences between a user on a mobile device and a chat bot management server in accordance with an aspect. In particular, FIG. 15 illustrates a customer support text conversation between a user and an autonomous agent. The autonomous agent diagnoses a problem the user has with using a fictional product called SatView Earth. FIG. 15 includes mobile device 1570, which is displaying question 1501, chat answer 1503, user response 1505, chat answer 1507, and user response 1509.

As depicted, a user starts with a question (1501). The text of the question is "I cannot see myself on SatView Earth, although I keep walking with my laptop outside of my house and waving. I even started to catch my own attention but it is not working. I am confident I am looking at myself since I typed my address." The autonomous agent responds with a first answer $A_1$ (1503). The text of the answer is "Your business is important for us. Please make sure you are online when you are walking, otherwise you would not be able to connect to SatView maps." Then, the user responds with a first follow up response or request $C_1$ (1505). The user responds "Yes, I am online, but I still cannot see myself." The agent responds with a second answer $A_2$ (1507), the text of which is "Privacy of our customers is very important to us. SatView products will help you catch your own attention, but you will be anonymized. To confirm your identity, please type your address. You will then be able to see yourself in SatView plus." In turn, the user responds with a second follow up response or request $C_2$ (1509).

This process can continue. It should be recognized that the above example can be one of many dialogue sequences or lengths. The queries and responses can be single sentence, multiple sentence blocks, or fragments of a sentence between the user and rhetoric agreement application 102.

Figure 16:
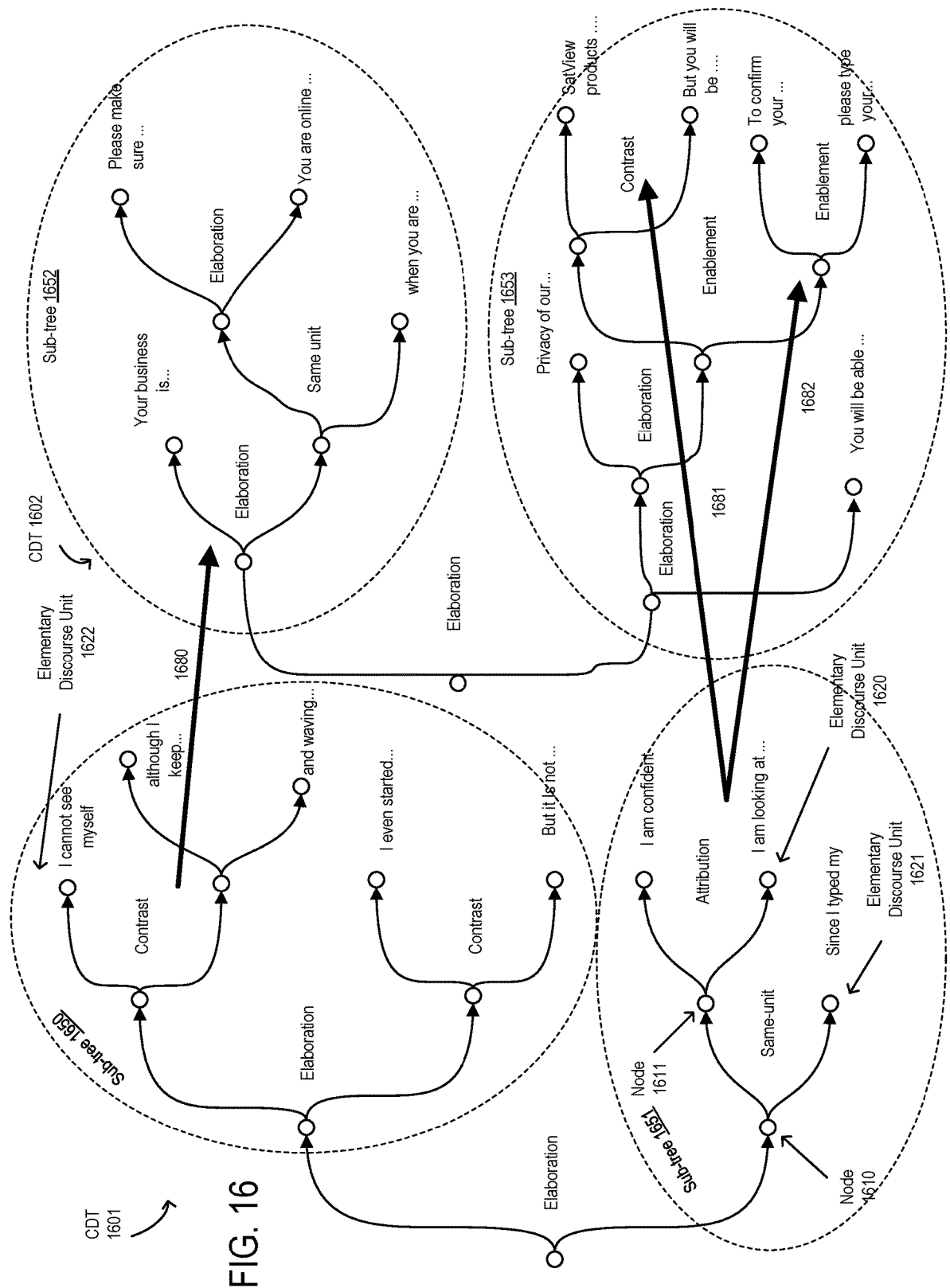
FIG. 16 illustrates an example of a communicative discourse tree of a question and a communicative discourse tree of two answers in accordance with an aspect.

To implement the discussion flow and the answers depicted in FIG. 15, rhetoric agreement application 102 represents the dialog shown in FIG. 15 as one or more communicative discourse trees. In an example, rhetoric agreement application 102 represents the initial user question 1501 as a communicative discourse tree. Rhetoric agreement application 102 also represents each of one or more possible answers as other communicative discourse trees. FIG. 16 depicts such communicative discourse trees and illustrates the complementarity between them. As further described, rhetoric agreement application 102 may iterate between different candidate answers to determine a best match between the question and the answer ultimately selected and provided to mobile device 1570.

FIG. 16 illustrates an example of a communicative discourse tree of a question and a communicative discourse tree of two answers in accordance with an aspect. FIG. 16 includes communicative discourse trees 1601 and 1602. Communicative discourse tree 1601 represents the question Q and communicative discourse tree 1602 represents the answers $A_1$ and $A_2$. Communicative discourse tree 1601 includes sub tree 1650 and sub tree 1651. Sub tree 1650 represents question $Q_1$ and sub tree 1651 represents $Q_2$. Sub tree 1652 represents answer $A_1$ and sub tree 1653 represents $A_2$. Each communicative discourse tree includes nodes. For example, communicative discourse tree 1601 includes nodes 1610 and nodes 1611. Some nodes, such as node 1610, branch off into more nodes. Other nodes, e.g., nodes 1620, 1621, and 1622, are terminal nodes and represent elementary discourse units.

As depicted by external relations 1680-82, communicative discourse tree 1601 and communicative discourse tree 1602 are related. More specifically, external relation 1680 relates part of sub tree 1650 to sub tree 1652, because answer $A_1$ is responsive to question $Q_1$. External relations 1681 and 1682 relate sub tree 1651 to different parts of sub-trees 1652 and 1653 respectively.

Each elementary discourse unit contains spans of text or phrases of text. The text or phrases of text of a discourse tree form the full text query. The elementary discourse units are organized in the discourse tree such that the discourse tree shows rhetoric structure among the elementary discourse units. In one example, the rhetoric structure shows an organization of the text or phrases of the text based on text hierarchy, text order, text logic, text coherence, syntactic relations, semantic relations, or a combination thereof. In one example, the rhetoric structure illustrates a relationship between two text spans. As discussed, relationships include elaborations, contrast, solutions, motivations, background information, evidence, or antithesis, creating or emphasizing an attitude or belief, giving purpose, words that are circumstantial such as temporal, spatial, or situational relationships of the subject matter that the reader of the query is intended to interpret.

In one example, the relationships are represented by a node of the discourse tree such as node 1610. The relationships map to a pair of two nodes, and each node is either an elementary discourse unit, or another relationship that maps to two more nodes. The discourse tree is complete when the nodes at the end of the tree are elementary discourse units only containing text or text phrases and not a rhetorical relation. For example, node 1610 maps to node 1611 and node 1621. Node 1621 is an elementary discourse unit. Node 1611 maps to two more nodes which are both elementary discourse units. Thus, a chain of relationships are formed until an elementary discourse unit is reached, forming the discourse tree. The elementary discourse units represent the text such as the text query, and the relations will associate all of the elementary discourse units to each other as rhetoric relations. The discourse tree reveals an organization of text by indicating the scope and type of relationships among text spans.

The chain of rhetorical structure theory (RST) relations as depicted in FIG. 16 can be represented textually by RST-relation [phrase] for each node, where phrase is an OR query including all linguistic phrases of a given EDU. As can be seen, the entities are Elaboration [see myself SatView Earth]-Contrast [walk laptop house]-Temporal [waiving] on the top of DT-Q is addressed by the chain Elaboration [online]-Same Unit [walking]-Elaboration [not able connect] in the first answer A1. The second answer A2 attempts to addresses in a complete way the issues raised in the second part of the Q (expressed by sequence Elaboration [confident]-Same Unit [looking at my house]-Attribution [typed address]) by two sequences Elaboration [privacy]-Elaboration [anonymized]-Contrast[catch attention] and Elaboration [privacy]-Elaboration [confirm identity]-Enablement [type address].

Figure 17:
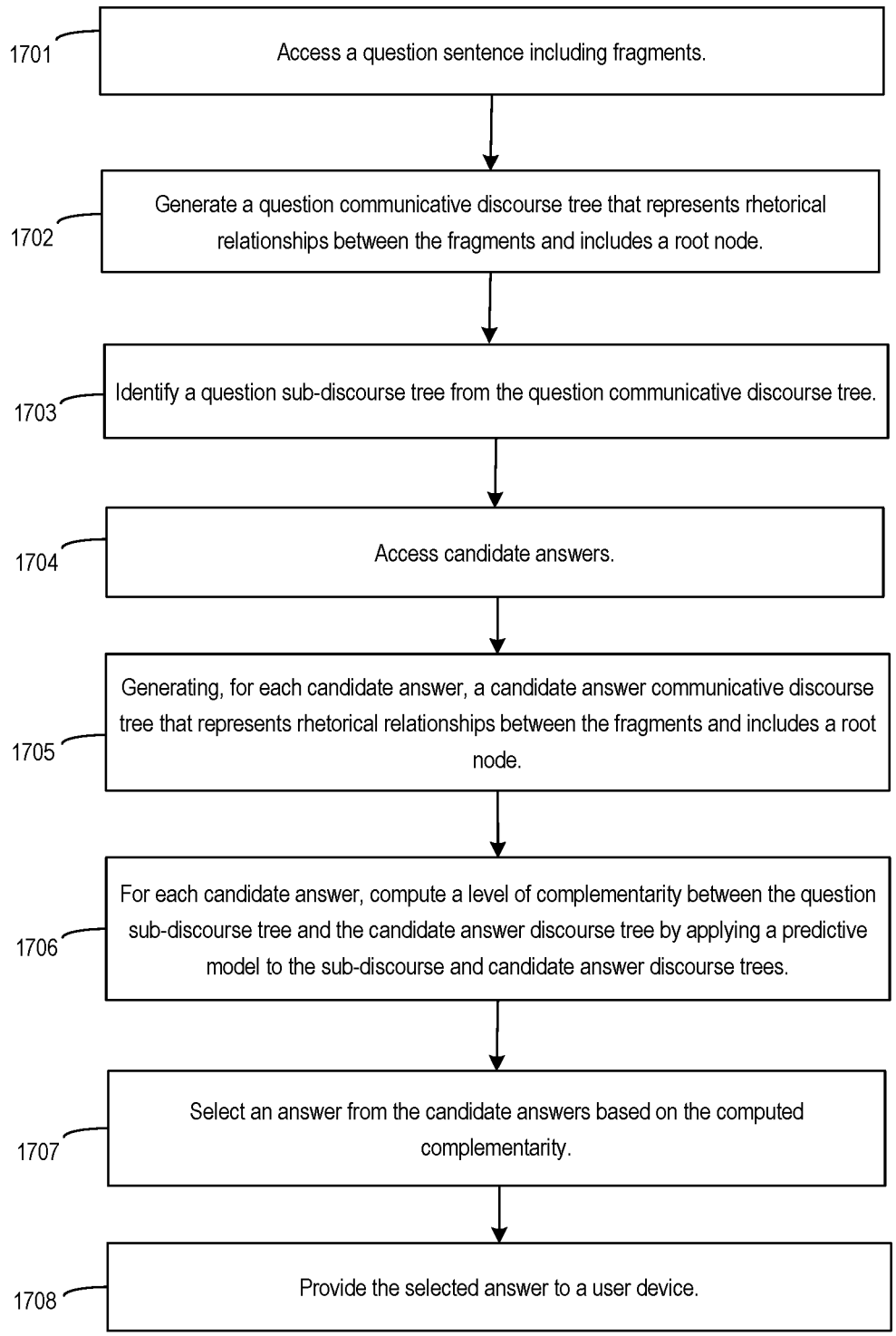
FIG. 17 depicts a flowchart of an example of a process for using communicative discourse trees to determine a level of complementarity between questions and answers in accordance with an aspect.

FIG. 17 depicts a flowchart of an example of a method 1700 for using communicative discourse trees to determine a level of complementarity between questions and answers in accordance with an aspect. By using communicative discourse trees, rhetoric agreement application 102 determines a level of complementarity between discourse trees of the question and one or more candidate answer. Method 1700 can be implemented by rhetoric agreement application 102, which can use rhetoric agreement classifier 120. Rhetoric agreement classifier 120 can implement different models including nearest neighbor and/or a tree-kernel learning model.

At block 1701, method 1700 involves accessing a question sentence including fragments. A least one fragment includes a verb and a plurality of words. Each fragment is an elementary discourse unit. Examples of question sentences include customer-service queries such as illustrated in FIGS. 15 and 16. Another example if a customer service query is a formulation of a problem (e.g., my television does not turn on) and associated issues such as how the television broke, why it broke, what steps have been taken so far, and why those steps were not successful in fixing the television.

In some cases, as described, a user can ask a well-thought out question that provides a roadmap that can be used by rhetoric agreement application 102. In other cases, a user can ask a broad question. Rhetoric agreement application 102 in turn provides a list of topics. Once such a topic is selected, the full answer can be provided.

At block 1702, method 1700 involves generating a question communicative discourse tree that represents rhetorical relationships between the fragments and includes a root node. Rhetoric agreement application 102 generates a discourse tree for the question, and from the discourse tree, generates a communicative discourse tree. A discourse tree represents rhetorical relationships between sentence fragments. The discourse tree includes nodes. Each nonterminal node representing a rhetorical relationship between two of the sentence fragments and each terminal node of the nodes of the discourse tree is associated with one of the sentence fragments.

Rhetoric agreement application 102 accesses a list of verb signatures, e.g., from VerbNet. Each verb matches or is related to the verb of the fragment. For example, for the elementary discourse unit 1612 (clause "I cannot see myself . . . "), the verb is "see." Accordingly, rhetoric agreement application 102 accesses a list of verb signatures that relate to the verb "see." An example of a corresponding entry is see (Who, What), in which "Who" ranges over personas and "What" ranges over arbitrary subjects.

As discussed, each verb signature includes the verb of the fragment and one or more of thematic roles. For example, a signature includes one or more of noun phrase (NP), noun (N), communicative action (V), verb phrase (VP), or adverb (ADV). A thematic role refers to the role of the verb in the sentence fragment. Rhetoric agreement application 102 determines the thematic roles in each verb signature. Example thematic roles include actor, agent, asset, attribute, beneficiary, cause, location destination source, destination, source, location, experiencer, extent, instrument, material and product, material, product, patient, predicate, recipient, stimulus, theme, time, or topic. Rhetoric agreement application 102 determines, for each verb signature of the verb signatures, a number of thematic roles of the respective signature that match a role of a word in the fragment.

Continuing with the example, rhetoric agreement application 102 selects a particular verb signature from the verb signatures based on the particular verb signature having a highest number of matches. For example, here, "see" in the sentence "I cannot see myself . . . ," is matched to verb signature see "NP V S."

At block 1703, method 1700 involves identifying a question sub-discourse tree from the question communicative discourse tree. As can be seen in FIG. 16, by creating a communicative discourse tree, rhetoric agreement application 102 divides the question into multiple parts, each part representing different issues. Sub-trees 1650 and 1651 are formed naturally and are related by an "elaboration" relationship. Each sub tree includes a fragment and represents a sub-question.

In some cases, to avoid identifying trivial sub-trees (which can be too small), rhetoric agreement application 102 can limit sub-trees to non-trivial sub-trees by excluding sub-trees that include only default relations such as "joint" and "elaboration." Examples of non-default rhetorical relations include contrast, solution, motivation, background information, evidence, antithesis, emphasis of an attitude or a belief, purpose, temporal circumstance, spatial circumstance, or situational circumstance.

At block 1704, method 1700 involves accessing candidate answers. Candidate answers can be obtained from answer database 105, which can be derived from different sources such as FAQ databases, previous answers, etc. Rhetorical agreement application 102 can generate candidate answers by searching for keyword matches derived from the elementary discourse units of the question communicative discourse tree against a database of a discourse corpus, a database of a keyword corpus, or past utterances received.

Continuing the example, rhetoric agreement application 102 generates a search query for candidate answers $A_1$ from $Q_1$. The query can be in the form RSTrelation [phrase]. In some cases, rhetoric agreement application 102 can further filter the results or present the results to the user. An example $A_1$ proposes a first solution to $Q_1$ for example, by addressing any issues relating to Q. In some cases, $A_1$ can include further requests for clarification from the user. Examples include "have you tried unplugging the television and leaving it off for some time?"

At block 1705, method 1700 involves generating, for each candidate answer, a candidate answer communicative discourse tree that represents rhetorical relationships between the fragments and includes a root node. At block 1705, rhetoric agreement application 102 performs substantially similar steps as with block 1702.

At block 1706, method 1700 involves for each candidate answer, computing a level of complementarity between the question sub-discourse tree and the candidate answer discourse tree by applying a classification model to the question sub-discourse and candidate answer discourse trees. At block 1706, various methods can be used such as nearest neighbor or Tree Kernel Learning, as described herein. For example, rhetoric agreement application 102 can generate a pair that includes the question sub-discourse tree and the candidate answer discourse tree to rhetoric agreement classifier 120, which in turn, provides a level of complementarity.

At block 1707, method 1700 involves selecting an answer from the candidate answers based on the computed complementarity. In an aspect, using a numerical score for complementarity, the candidate answers can be ranked and the best answer selected. Example rankings include determining an answer popularity of past searches or a searching rank learned by a search engine on a basis of a number of searches for a same user (e.g., personalization) or a same type of query. In some cases, the ranking can be selected based on other factors such as an answer popularity of past searches, a searching rank learned by a search engine on a basis of a number of searches for a same user or a same type of query.

In other cases, two answers may have levels of complementarity that are within a threshold of each other. In this case, rhetoric agreement application 102 can provide both answers to a user device to enable a user to select a suitable answer.

At block 1708, method 1700 involves providing the selected answer to a user device. The user can then provide additional feedback to the user device, which passes the feedback to rhetoric agreement application 102. The iterative process can continue in some cases.

For example, rhetoric agreement application 102 can provide a list of possible clarifications (e.g., possibilities of what the user intended). For example, rhetorical agreement application 102 can output "did you mean X, Y, or Z?" where X, Y, and Z are different options. Rhetorical agreement application 102 receives clarification $C_1$ that the solution from $A_1$ has been attempted. Clarification $C_1$ can include sharing the results of the solution, presenting related issues, or providing further clarification.

Rhetorical agreement application 102 can generate a new sub-discourse tree from the clarification $C_1$ and provides the new sub-discourse tree and one or more additional candidate answer discourse trees to the classification model. Rhetoric agreement application 102 then determines additional answer $A_2$ that is based on the clarification. When rhetoric agreement application 102 has satisfactorily answered the user's questions, then rhetoric agreement application 102 can conclude the session, optionally summarizing the outcome.

Training

To form a training set, a search engine that has a different criteria on which parts of answer is good and which are not good is needed. For example, the search engine can use answer popularity, or search rank, which are learned by search engine on the basis of the high number of searches for the same query and user selection. In some cases, positive and negative training sets are used. For example, positive training sets include training pairs (question-answer pairs) that indicate a level of complementarity that is above a threshold level of complementarity. Conversely, negative training sets include training pairs (question-answer pairs) that indicate a level of complementarity that is below a threshold of complementarity.

To accumulate question-answer pairs tagged as positive or negative, a high number of arbitrary queries against short texts can be executed. Because longer queries are needed to assure the match is nontrivial, Yahoo! Answers dataset (Webscope 2017) can be used to form the web search queries from the first sentences of the questions for the question-answer pairs. The searches can be run on Microsoft Cognitive Services (the Bing Search engine API). Those search results that are short texts (4-6 sentences) suitable for parsing and discourse analysis are selected. From the text, the question and answer communicative discourse tree pairs are used as elements of the training set.

The answers from the top 10+ pages of search results can form an example positive dataset. The positive dataset includes the fragments of text considered by the search engine to be of high relevance. For the negative dataset, the fragments with matched keywords from the set of lower ranked (100-1000+) search results pages is used. The classifier differentiates between positive communicative discourse tree question and answer pairs (from the top search results) and negative communicative discourse tree question and answer pairs (from the lower ranked search results).

Rhetoric agreement application 102 scores a number of candidate pairs by the complement relation in real time and are assigned a high or low score. In an aspect, similar to search engineering approaches, learning can be performed offline and a lookup of classes of communicative discourse trees for questions and respective answers can be stored for later retrieval.

A search engine dealing with complex questions such as Yahoo! Answers, for example, needs a systematic approach to assess the complement relation and select the most suitable answers among the relevant ones. The features of communicative discourse trees can be represented in a numerical space where a classification into valid or invalid question-answer pairs is conducted. But in this fashion, structural information on discourse trees would not be leveraged.

In an aspect, the complement relation can be assessed in terms of maximal common sub-DTs. But this approach is computationally intensive and too sensitive to errors in discourse tree construction. Therefore, a discourse tree-kernel learning approach can be used. This approach applies support vector machine (SVM) learning to a set of all sub-discourse trees of the discourse trees for a given question-answer pair. The tree kernel family of approaches are not very sensitive to errors in parsing (syntactic and rhetoric) because erroneous sub-trees are mostly random and will unlikely be common among different elements of the training set.

Given a positive dataset for the complement relation and a negative dataset, aspects attempt to recognize if a given question-answer pair is covered by complement relation. Notice that a discourse tree for a question and a discourse tree for an answer can be arbitrary, but only discourse trees for a pair can be linked by the complement relation. This approach is applied to perform passage re-ranking of answers to achieve the highest possible complement relation maintaining relevance.

Tree Kernel (TK) learning for strings, parse trees and parse thickets is a well-established research area nowadays. The parse tree kernel counts the number of common subtrees as the discourse similarity measure between two DTs. TK relies on the operation of generalization '^' which is applied at the level of parse and discourse trees, phrases, and words (Galitsky et al 2012). A version of TK has been defined for DT by (Joty and Moschitti 2014). (Wang et al 2013) used the special form of TK for discourse relation recognition. In this study we extend the TK definition for the CDT, augmenting DT kernel by the information on CAs.

Nearest Neighbor graph-based Classification

Given a multi-sentence question, rhetoric agreement application 102 learns to classify pairs of communicative discourse trees (CDTs) as complementary or non-complementary. A complementary relation holds between a given question and a good answer but does not hold between the question and a bad answer. Hence we can machine-learn complement relation for a set of question-answer pairs.

Once a CDT is built, in order to identify an argument in text, rhetoric agreement application 102 computes the similarity compared to CDTs for the positive class and verify that it is lower to the set of CDTs for its negative class. Similarity between CDT is defined by means of maximal common sub-CDTs.

In an example, an ordered set G of CDTs(V,E) with vertex- and edge-labels from the sets $(\Lambda_\varsigma, \preceq)$ and $(\Lambda_E, \preceq)$ is constructed. A labeled CDT $\Gamma$ from G is a pair of pairs of the form ((V,1),(E,b)), where V is a set of vertices, E is a set of edges, $1: V \rightarrow \varsigma_\varsigma$ is a function assigning labels to vertices, and $b: E \rightarrow \Lambda_E$ is a function assigning labels to edges. Isomorphic trees with identical labeling are not distinguished.

The order is defined as follows: For two CDTs $\Gamma_1:=((V_1, l_1),(E_1,b_1))$ and $\Gamma_2:=((V_2,l_2),(E_2,b_2))$ from G, then that $\Gamma_1$ dominates $\Gamma_2$ or $\Gamma_2 \leq \Gamma_1$ (or $\Gamma_2$ is a sub-CDT of $\Gamma_1$) if there exists a one-to-one mapping $\varphi: V_2 \rightarrow V_1$ such that it (1) respects edges: $(v,w) \in E_2 \Rightarrow (\varphi(v), \varphi(w)) \in E_1$, and (2) fits under labels: $l_2(v) \leq l_1(\varphi(v))$, $(v,w) \in E_2 \Rightarrow b_2(v,w) \leq b_1(\varphi(v), \varphi(w))$.

This definition takes into account the calculation of similarity ("weakening") of labels of matched vertices when passing from the "larger" CDT $G_1$ to "smaller" CDT $G_2$.

Now, similarity CDT Z of a pair of CDTs X and Y, denoted by X ˆ Y=Z, is the set of all inclusion-maximal common sub-CDTs of X and Y, each of them satisfying the following additional conditions (1) to be matched, two vertices from CDTs X and Y must denote the same RST relation; and (2) each common sub-CDT from Z contains at least one communicative action with the same VerbNet signature as in X and Y.

This definition is easily extended to finding generalizations of several graphs. The subsumption order μ on pairs of graph sets X and Y is naturally defined as X μ Y:=X*Y=X.

Figure 18:
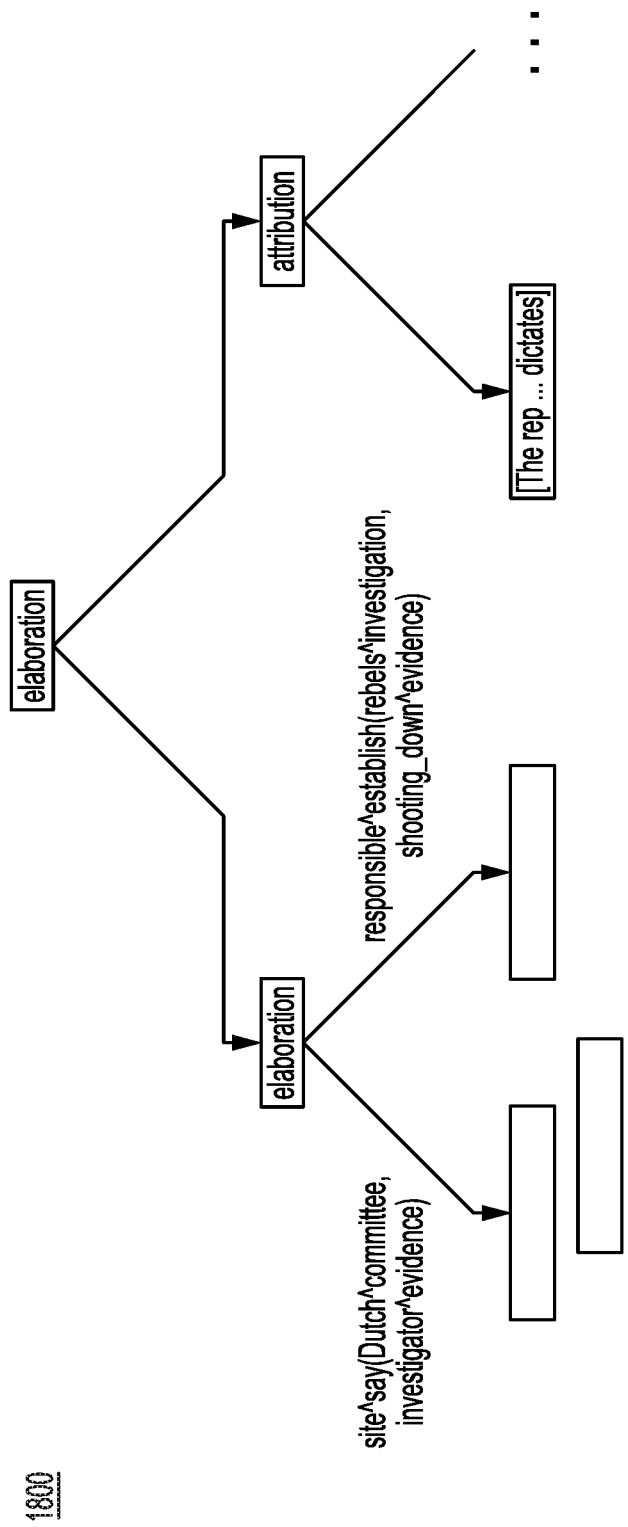
FIG. 18 illustrates a maximal common sub-communicative discourse tree in accordance with an aspect.

FIG. 18 illustrates a maximal common sub-communicative discourse tree in accordance with an aspect. FIG. 18 includes sub-discourse tree 1800. Notice that the tree is inverted and the labels of arcs are generalized: Communicative action site( ) is generalized with communicative action say( ). The first (agent) argument of the former CA committee is generalized with the first argument of the latter CA Dutch. The same operation is applied to the second arguments for this pair of CAs: investigator ˆ evidence.

CDT U belongs to a positive class such that (1) U is similar to (has a nonempty common sub-CDT) with a positive example R$^+$ and (2) for any negative example R$^-$, if U is similar to R$^-$ (i.e., U*R$^-$≠∅) then U*R$^-$μ U*R$^+$.

This condition introduces the measure of similarity and says that to be assigned to a class, the similarity between the unknown CDT U and the closest CDT from the positive class should be higher than the similarity between U and each negative example. Condition 2 implies that there is a positive example R$^+$ such that for no R$^-$ one has U*R$^-$ μ R$^-$, i.e., there is no counterexample to this generalization of positive examples.

Tree Kernel Learning for CDT

Tree Kernel learning for strings, parse trees and parse thickets is a well-established research area these days. The parse tree kernel counts the number of common sub-trees as the discourse similarity measure between two instances. Tree kernel has been defined for DT by Joty, Shafiq and A. Moschitti. Discriminative Reranking of Discourse Parses Using Tree Kernels. Proceedings of EMNLP. (2014). See also Wang, W., Su, J., & Tan, C. L. (2010). Kernel Based Discourse Relation Recognition with Temporal Ordering Information. In Proceedings of the 48th Annual Meeting of the Association for Computational Linguistics. (using the special form of tree kernels for discourse relation recognition). A thicket kernel is defined for a CDT by augmenting a DT kernel by the information on communicative actions.

A CDT can be represented by a vector V of integer counts of each sub tree type (without taking into account its ancestors):

V (T)=(# of subtrees of type 1, . . . , # of subtrees of type 1, . . . , # of subtrees of type n). This results in a very high dimensionality since the number of different subtrees is exponential in its size. Thus, it is computational infeasible to directly use the feature vector ∅(T). To solve the computational issue, a tree kernel function is introduced to calculate the dot product between the above high dimensional vectors efficiently. Given two tree segments CDT1 and CDT2, the tree kernel function is defined:

$$K(CDT1,CDT2)=\langle V(CDT1),V(CDT2)\rangle=\Sigma i\ V(CDT1)[i],V(CDT2)[i]=\Sigma n1\Sigma n2\Sigma i\ Ii(n1)*Ii(n2)$$

where n1∈N1, n2∈N2 where N1 and N2 are the sets of all nodes in CDT1 and CDT2, respectively;
Ii (n) is the indicator function.
Ii (n)={1 iff a subtree of type i occurs with root at node; 0 otherwise}. K (CDT1, CDT2) is an instance of convolution kernels over tree structures (Collins and Duffy, 2002) and can be computed by recursive definitions:

$$\Delta(n1,n2)=\Sigma I\ Ii(n1)*Ii(n2)$$

Δ(n1, n2)=0 if n1 and n2 are assigned the same POS tag or their children are different subtrees.

Otherwise, if both n1 and n2 are POS tags (are pre-terminal nodes) then Δ(n1, n2)=1×λ;

Otherwise, $\Delta(n1, n2)=\lambda\Lambda_{j=1}^{nc(n1)}(1+\Delta(ch(n1, j), ch(n2, j)))$ where ch(n,j) is the jth child of node n, nc(ni) is the number of the children of $n_1$, and $\lambda(0<\lambda<1)$ is the decay factor in order to make the kernel value less variable with respect to the sub tree sizes. In addition, the recursive rule (3) holds because given two nodes with the same children, one can construct common sub-trees using these children and common sub-trees of further offspring. The parse tree kernel counts the number of common sub-trees as the syntactic similarity measure between two instances.

As an alternative to TK family of approaches, a direct discourse tree similarity comparison by maximal common sub-discourse tree can be used (Galitsky et al 2013). The higher the cardinality of this sub-tree, the higher is the similarity score. If a discourse tree of a current question-answer pair has a large common sub tree with a question-answer pair from the positive training set and a significantly smaller one of the negative training set, then this question-answer pair is covered by the complement relation (and vice versa). Only RST arcs of the same type of relation (presentation relation, such as Antithesis, subject matter relation, such as Condition, and multinuclear relation, such as List) can be matched when computing common sub-trees. The letter N indicates a nucleus or situations presented by this nucleus, and S indicates a satellite or situations presented by this satellite. Situations are propositions, completed actions or actions in progress, and communicative actions and states (including beliefs, desires, approve, explain, reconcile and others). Hence we have the following expression for RST-based generalization:

'ˆ' for two texts text$_1$ and text$_2$:

text$_1$ ˆ text$_2$=∪$_{i,j}$ (rstRelation$_{1i}$, ( . . . , . . . ) ˆ rstRelation$_{2j}$ ( . . . , . . . )), where i ∈ (RST relations in text$_1$), j ∈ (RST relations in text$_2$).

Further, for a pair of RST relations their generalization looks as follows: rstRelation1(N$_1$, S$_1$) ˆ rstRelation$_2$ (N$_2$, S$_2$)=(rstRelation$_1$ˆ rstRelation$_2$) (N$_1$ˆN$_2$, S$_1$ˆS$_2$). The texts in N$_1$, S$_1$ are subject to generalization as phrases. The rules for rst$_1$ˆrst$_2$ are as follows. If relation_type(rst$_1$)!=relation_type (rst$_2$) then similarity is empty. Otherwise, we generalize the signatures of rhetoric relations as sentences: sentence(N$_1$, S$_1$) ˆ sentence (N$_2$, S$_2$).

Evaluation

A dataset of question-answer pairs related to car repair recommendations is created. The question-answer pairs were extracted from dialogues as first and second utterance, so that the question is seven-fifteen keywords and answer is three to six sentences. This resource was obtained to train a dialog support system but it also proved to be useful to evaluate search. This dataset is scraped from (CarPros 2017) and is available at (Github Car Repair Dataset 2017). Although a number of dialogue-related datasets is available, for the purpose of customer support—specific dialogue we had to collect our own. The focus was to collect a dataset when a user interacts with an expert solving certain car-related problems.

An example of a sample dialogue follows:

$Q_1$: I have checked the spark plugs, replaced the battery, also replaced ignition coils and the solenoid, but I still could not start my car.

$A_1$: Is the engine getting spark and fuel? Will it start for a couple seconds using starting fluid?

$Q_2$: It did at first but not anymore. What should I do?

$A_2$: Check fuel pressure. But If no pressure check the fuel pump for possible fault. If you have fuel pressure, then using a noid light make sure you have injector pulse. The light should blink when cranking. If light is not blinking does the check engine light come on with key on engine off? If no light then look for a bad main relay or no power to the engine control module.

In this example, because $Q_1$ includes rhetoric relation of Contrast (something is done correctly but still not working), detailed should include Condition: it is either done correctly or incorrectly, so both cases need to be addressed (FIGS. 6 and 7). Correlation between DT-$Q_1$ and DT-$A_2$ would be trivial if $Q_1$ does not include a contradiction but instead just formulate a question of the form 'X is not working—how to fix it?'

To automate the relevance assessment, the dialogue built correctly if an actual dialogue from the dataset is formed was considered given the first Q as a seed. Otherwise, if the sequence of utterances does not occur in the dataset, the dialog is considered to be incorrect. There are some deficiencies of this approach since some actual dialogs are illogical and some synthetic dialogues built from distinct ones can be plausible, but it allows avoiding a manual assessment. The number of formed answers is limit to three: once initial Q is given, the system forms $A_1$, a set of $A_{2i}$ and $A_{3j}$. A1 is followed by the actual $C_1$ from the dialogue Q, so the proper $A_2$ needs to be selected. Analogously, once actual $C_2$ (if applicable) is provided, proper $A_3$ needs to be selected. As a first baseline approach, we select dialogue construction based on keyword similarity only, without taking into account a dialogue flow by considering a DT-Q. As a second baseline approach, we augment keyword similarity with linguistic relevance by computing maximal common sub-parse trees between the Q and $A_i$.

TABLE 1

| | Dialogue type | | | |
|---|---|---|---|---|
| | Q-A | Q-$A_1$-C | Q-$A_1$-C-$A_2$ | Q-$A_1$-$C_1$-$A_2$-$C_3$-$A_3$ |
| Baseline 1 | 62.3 ± 4.5 | 60.2 ± 5.6 | 58.2 ± 5.0 | 52.5 ± 5.7 |
| Baseline 2 | 67.0 ± 4.8 | 63.8 ± 4.8 | 57.3 ± 5.3 | 55.6 ± 5.9 |
| DT-Q dialogue formulation | 72.3 ± 5.6 | 70.3 ± 4.9 | 65.1 ± 5.5 | 65.9 ± 5.7 |

For the selected dataset, baseline approach is capable of building correct scenarios in the cases when similar keywords or similar linguistic phrases deliver the only dialogue scenario that is correct. On the contrary, DT-Q dialogue formation does not always succeed because some scenarios deviate from actual ones in the training set, although are still plausible. Hence we see 10 and 5% improvement over the first and second baselines respectively for a basic, single-step scenario (See Table 1). As scenario becomes more complex, the chance that the proper scenario is selected by topic relevance decreases. At the same time, overall scenario formation complexity increases, and therefore an error rate for DT-Q approach increases as well. For the most complex, 3-step dialogue scenarios, DT-Q approach exceeds the baselines by 13 and 10% respectively.

When a training dataset is indexed, we add a special field to the index with chains of RST relations with selected phrases. Hence candidate answers are parsed and their DTs are built offline. At a conversation time, given a Q, the chat bot builds DT-Q and forms a query as a chain of RST relations with selected phrases. This query is then run against the special field above as an span-OR query with retained order of RST terms under default TF*IDF relevance. The purpose of such search is to obtain sequences of Qi candidates. The component, which enforces complement relation, combines Stanford NLP parsing, conferences, entity extraction, DT construction (discourse parser, Surdeanu et al 2013 and Joty et al 2016), VerbNet and Tree Kernel builder into one system.

Training

In an aspect, rhetoric agreement application 102 uses training data 125 to train rhetoric agreement classifier 120. In this manner, rhetoric agreement classifier 120 is trained to determine a similarity between pairs of questions and answers. This is a classification problem. Training data 125 can include a positive training set and a negative training set. Training data 125 includes matching request-response pairs in a positive dataset and arbitrary or lower relevance or appropriateness request-response pairs in a negative dataset. For the positive dataset, various domains with distinct acceptance criteria are selected that indicate whether an answer or response is suitable for the question.

Each training dataset includes a set of training pairs. Each training set includes a question communicative discourse tree that represents a question and an answer communicative discourse tree that represents an answer and an expected level of complementarity between the question and answer. By using an iterative process, rhetoric agreement application 102 provides a training pair to rhetoric agreement classifier 120 and receives, from the model, a level of complementarity. Rhetoric agreement application 102 calculates a loss function by determining a difference between the determined level of complementarity and an expected level of complementarity for the particular training pair. Based on the loss function, rhetoric agreement application 102 adjusts internal parameters of the classification model to minimize the loss function.

Figure 19:
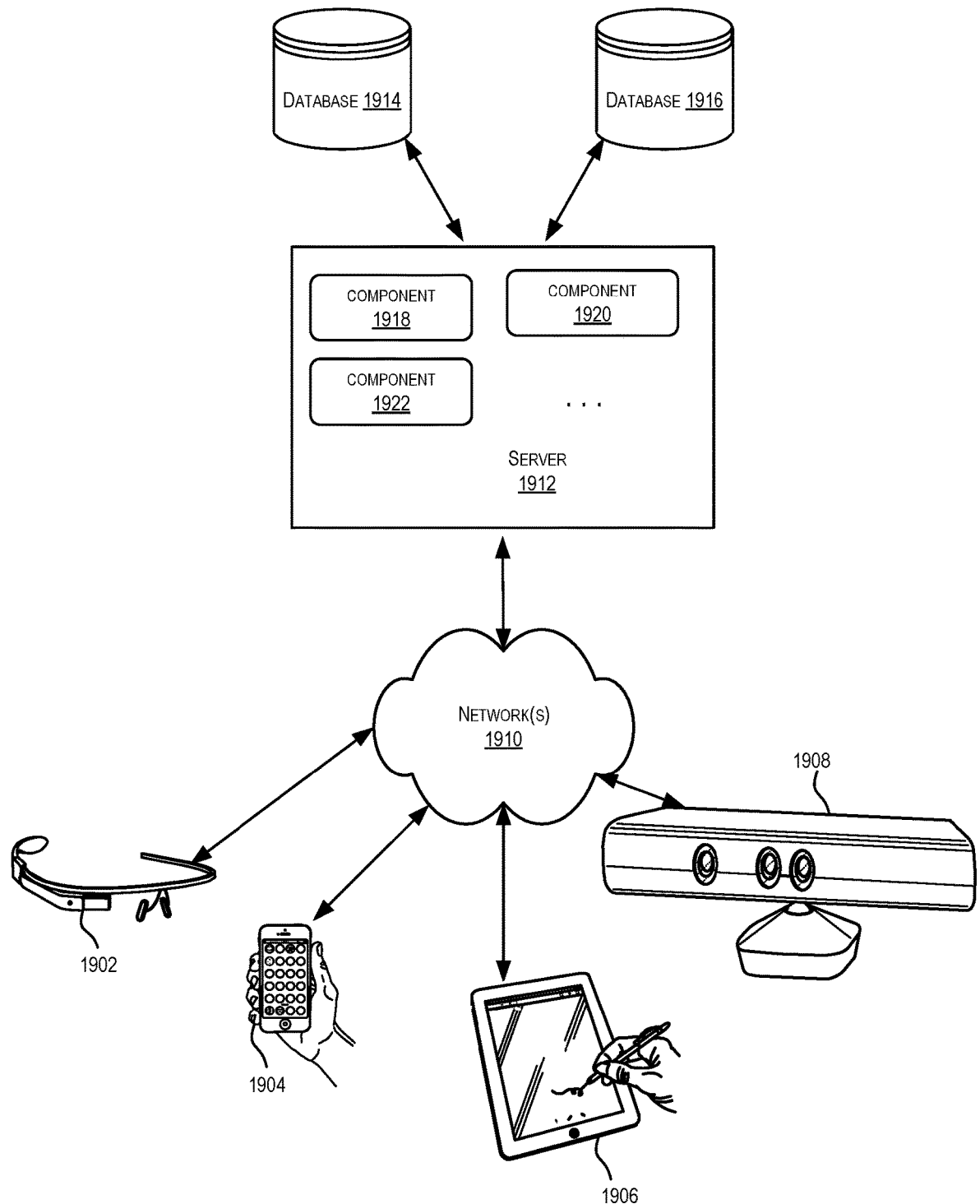
FIG. 19 depicts a simplified diagram of a distributed system for implementing one of the aspects.

FIG. 19 depicts a simplified diagram of a distributed system 1900 for implementing one of the aspects. In the illustrated aspect, distributed system 1900 includes one or more client computing devices 1902, 1904, 1906, and 1908, which are configured to execute and operate a client application such as a web browser, proprietary client (e.g., Oracle Forms), or the like over one or more network(s) 1910. Server 1912 may be communicatively coupled with remote client computing devices 1902, 1904, 1906, and 1908 via network 1910.

In various aspects, server 1912 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 1902, 1904, 1906, and/or 1908. Users operating client computing devices 1902, 1904, 1906, and/or 1908 may in turn utilize one or more client applications to interact with server 1912 to utilize the services provided by these components.

In the configuration depicted in the figure, the software components 1918, 1920 and 1922 of system 1900 are shown as being implemented on server 812. In other aspects, one or more of the components of system 1900 and/or the services provided by these components may also be implemented by one or more of the client computing devices 1902, 1904, 1906, and/or 1908. Users operating the client computing devices may then utilize one or more client applications to use the services provided by these components. These components may be implemented in hardware, firmware, software, or combinations thereof. It should be appreciated that various different system configurations are possible, which may be different from distributed system 1900. The aspect shown in the figure is thus one example of a distributed system for implementing an aspect system and is not intended to be limiting.

Client computing devices 1902, 1904, 1906, and/or 1908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1902, 1904, 1906, and 1908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1910.

Although exemplary distributed system 1900 is shown with four client computing devices, any number of client computing devices may be supported. Other devices, such as devices with sensors, etc., may interact with server 1912.

Network(s) 1910 in distributed system 1900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1910 can be a local area network (LAN), such as one based on Ethernet, Token-Ring and/or the like. Network(s) 1910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.19 suite of protocols, Bluetooth®, and/or any other wireless protocol); and/or any combination of these and/or other networks.

Server 1912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1912 can include one or more virtual machines running virtual operating systems, or other computing architectures involving virtualization. One or more flexible pools of logical storage devices can be virtualized to maintain virtual storage devices for the server. Virtual networks can be controlled by server 1912 using software defined networking. In various aspects, server 1912 may be adapted to run one or more services or software applications described in the foregoing disclosure. For example, server 1912 may correspond to a server for performing processing described above according to an aspect of the present disclosure.

Server 1912 may run an operating system including any of those discussed above, as well as any commercially available server operating system. Server 1912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1912 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1912 may also include one or more applications to display the data feeds and/or real-time events via one or more display devices of client computing devices 1902, 1904, 1906, and 1908.

Distributed system 1900 may also include one or more databases 1914 and 1916. Databases 1914 and 1916 may reside in a variety of locations. By way of example, one or more of databases 1914 and 1916 may reside on a non-transitory storage medium local to (and/or resident in) server 1912. Alternatively, databases 1914 and 1916 may be remote from server 1912 and in communication with server 1912 via a network-based or dedicated connection. In one set of aspects, databases 1914 and 1916 may reside in a storage-area network (SAN). Similarly, any necessary files for performing the functions attributed to server 1912 may be stored locally on server 1912 and/or remotely, as appropriate. In one set of aspects, databases 1914 and 1916 may include relational databases, such as databases provided by Oracle, that are adapted to store, update, and retrieve data in response to SQL-formatted commands.

Figure 20:
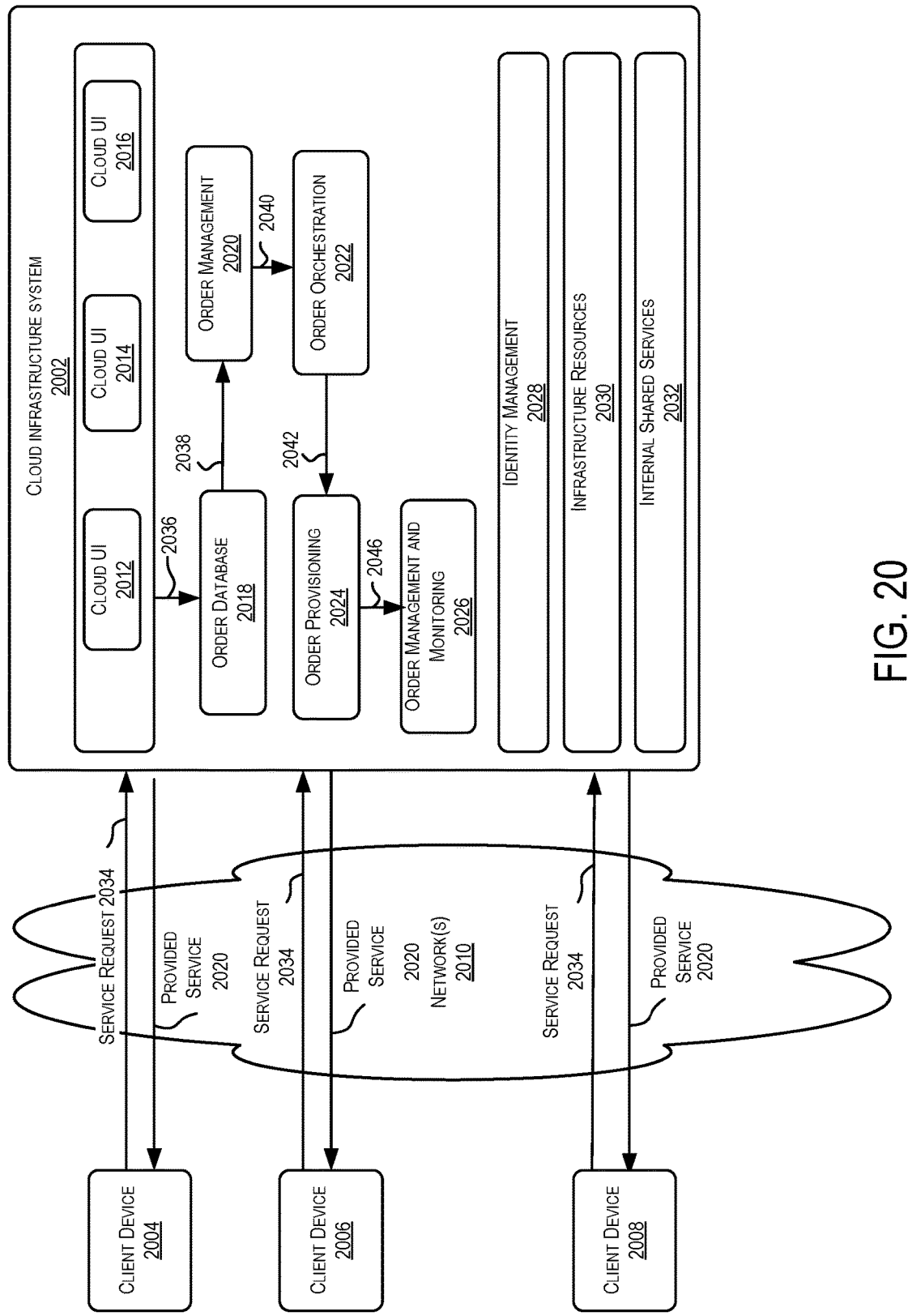
FIG. 20 is a simplified block diagram of components of a system environment by which services provided by the components of an aspect system may be offered as cloud services in accordance with an aspect.

FIG. 20 is a simplified block diagram of one or more components of a system environment 2000 by which services provided by one or more components of an aspect system may be offered as cloud services in accordance with an aspect of the present disclosure. In the illustrated aspect, system environment 2000 includes one or more client computing devices 2004, 2006, and 2008 that may be used by users to interact with a cloud infrastructure system 2002 that provides cloud services. The client computing devices may be configured to operate a client application such as a web browser, a proprietary client application (e.g., Oracle Forms), or some other application, which may be used by a user of the client computing device to interact with cloud infrastructure system 2002 to use services provided by cloud infrastructure system 2002.

It should be appreciated that cloud infrastructure system 2002 depicted in the figure may have other components than those depicted. Further, the aspect shown in the figure is only one example of a cloud infrastructure system that may incorporate an aspect of the invention. In some other aspects, cloud infrastructure system 2002 may have more or fewer components than shown in the figure, may combine two or more components, or may have a different configuration or arrangement of components.

Client computing devices 2004, 2006, and 2008 may be devices similar to those described above for 2802, 2804, 2806, and 2808.

Although exemplary system environment 2000 is shown with three client computing devices, any number of client computing devices may be supported. Other devices such as devices with sensors, etc. may interact with cloud infrastructure system 2002.

Network(s) 2010 may facilitate communications and exchange of data between clients 2004, 2006, and 2008 and cloud infrastructure system 2002. Each network may be any type of network familiar to those skilled in the art that can support data communications using any of a variety of commercially-available protocols, including those described above for network(s) 2810.

Cloud infrastructure system 2002 may comprise one or more computers and/or servers that may include those described above for server 2820.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 2002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include datasets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large datasets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These datasets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large datasets based on demand from a business, government agency, research organization, private individual, group of like-minded individuals or organizations, or other entity.

In various aspects, cloud infrastructure system 2002 may be adapted to automatically provision, manage and track a customer's subscription to services offered by cloud infrastructure system 2002. Cloud infrastructure system 2002 may provide the cloud services via different deployment models. For example, services may be provided under a public cloud model in which cloud infrastructure system 2002 is owned by an organization selling cloud services (e.g., owned by Oracle) and the services are made available to the general public or different industry enterprises. As another example, services may be provided under a private cloud model in which cloud infrastructure system 2002 is operated solely for a single organization and may provide services for one or more entities within the organization. The cloud services may also be provided under a community cloud model in which cloud infrastructure system 2002 and the services provided by cloud infrastructure system 2002 are shared by several organizations in a related community. The cloud services may also be provided under a hybrid cloud model, which is a combination of two or more different models.

In some aspects, the services provided by cloud infrastructure system 2002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2002. Cloud infrastructure system 2002 then performs processing to provide the services in the customer's subscription order.

In some aspects, the services provided by cloud infrastructure system 2002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 2002 may also include infrastructure resources 2030 for providing the resources used to provide various services to customers of the cloud infrastructure system. In one aspect, infrastructure resources 2030 may include pre-integrated and optimized combinations of hardware, such as servers, storage, and networking resources to execute the services provided by the PaaS platform and the SaaS platform.

In some aspects, resources in cloud infrastructure system 2002 may be shared by multiple users and dynamically re-allocated per demand. Additionally, resources may be allocated to users in different time zones. For example, cloud infrastructure system 2030 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 2032 may be provided that are shared by different components or modules of cloud infrastructure system 2002 and by the services provided by cloud infrastructure system 2002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 2002 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 2002, and the like.

In one aspect, as depicted in the figure, cloud management functionality may be provided by one or more modules, such as an order management module 2020, an order orchestration module 2022, an order provisioning module 2024, an order management and monitoring module 2026, and an identity management module 2028. These modules may include or be provided using one or more computers and/or servers, which may be general purpose computers, specialized server computers, server farms, server clusters, or any other appropriate arrangement and/or combination.

In exemplary operation 2034, a customer using a client device, such as client device 2004, 2006 or 2008, may interact with cloud infrastructure system 2002 by requesting one or more services provided by cloud infrastructure system 2002 and placing an order for a subscription for one or more services offered by cloud infrastructure system 2002. In certain aspects, the customer may access a cloud User Interface (UI), cloud UI 2020, cloud UI 2014 and/or cloud UI 2016 and place a subscription order via these UIs. The order information received by cloud infrastructure system 2002 in response to the customer placing an order may include information identifying the customer and one or more services offered by the cloud infrastructure system 2002 that the customer intends to subscribe to.

After an order has been placed by the customer, the order information is received via the cloud UIs, 2020, 2014 and/or 2016.

At operation 2036, the order is stored in order database 2018. Order database 2018 can be one of several databases operated by cloud infrastructure system 2018 and operated in conjunction with other system elements.

At operation 2038, the order information is forwarded to an order management module 2020. In some instances, order management module 2020 may be configured to perform billing and accounting functions related to the order, such as verifying the order, and upon verification, booking the order.

At operation 2040, information regarding the order is communicated to an order orchestration module 2022. Order orchestration module 2022 may utilize the order information to orchestrate the provisioning of services and resources for the order placed by the customer. In some instances, order orchestration module 2022 may orchestrate the provisioning of resources to support the subscribed services using the services of order provisioning module 2024.

In certain aspects, order orchestration module 2022 enables the management of business processes associated with each order and applies business logic to determine whether an order should proceed to provisioning. At operation 2042, upon receiving an order for a new subscription, order orchestration module 2022 sends a request to order provisioning module 2024 to allocate resources and configure those resources needed to fulfill the subscription order. Order provisioning module 2024 enables the allocation of resources for the services ordered by the customer. Order provisioning module 2024 provides a level of abstraction between the cloud services provided by cloud infrastructure system 2000 and the physical implementation layer that is used to provision the resources for providing the requested services. Order orchestration module 2022 may thus be isolated from implementation details, such as whether or not services and resources are actually provisioned on the fly or pre-provisioned and only allocated/assigned upon request.

At operation 2020, once the services and resources are provisioned, a notification of the provided service may be sent to customers on client devices 2004, 2006 and/or 2008 by order provisioning module 2024 of cloud infrastructure system 2002.

At operation 2046, the customer's subscription order may be managed and tracked by an order management and monitoring module 2026. In some instances, order management and monitoring module 2026 may be configured to collect usage statistics for the services in the subscription order, such as the amount of storage used, the amount data transferred, the number of users, and the amount of system up time and system down time.

In certain aspects, cloud infrastructure system 2000 may include an identity management module 2028. Identity management module 2028 may be configured to provide identity services, such as access management and authorization services in cloud infrastructure system 2000. In some aspects, identity management module 2028 may control information about customers who wish to utilize the services provided by cloud infrastructure system 2002. Such information can include information that authenticates the identities of such customers and information that describes which actions those customers are authorized to perform relative to various system resources (e.g., files, directories, applications, communication ports, memory segments, etc.) Identity management module 2028 may also include the management of descriptive information about each customer and about how and by whom that descriptive information can be accessed and modified.

FIG. 21 illustrates an exemplary computer system 2100, in which various aspects of the present invention may be implemented. The system 2100 may be used to implement any of the computer systems described above. As shown in the figure, computer system 2100 includes a processing unit 2104 that communicates with a number of peripheral subsystems via a bus subsystem 2102. These peripheral subsystems may include a processing acceleration unit 2106, an I/O subsystem 2108, a storage subsystem 2118 and a communications subsystem 2124. Storage subsystem 2118 includes tangible computer-readable storage media 2122 and a system memory 2110.

Bus subsystem 2102 provides a mechanism for letting the various components and subsystems of computer system 2100 communicate with each other as intended. Although bus subsystem 2102 is shown schematically as a single bus, alternative aspects of the bus subsystem may utilize multiple buses. Bus subsystem 2102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P2186.1 standard.

Processing unit 2104, which can be implemented as one or more integrated circuits (e.g., a conventional microprocessor or microcontroller), controls the operation of computer system 2100. One or more processors may be included in processing unit 2104. These processors may include single core or multicore processors. In certain aspects, processing unit 2104 may be implemented as one or more independent processing units 2132 and/or 2134 with single or multicore processors included in each processing unit. In other aspects, processing unit 2104 may also be implemented as a quad-core processing unit formed by integrating two dual-core processors into a single chip.

In various aspects, processing unit 2104 can execute a variety of programs in response to program code and can maintain multiple concurrently executing programs or processes. At any given time, some or all of the program code to be executed can be resident in processor(s) 2104 and/or in storage subsystem 2118. Through suitable programming, processor(s) 2104 can provide various functionalities described above. Computer system 2100 may additionally include a processing acceleration unit 2106, which can include a digital signal processor (DSP), a special-purpose processor, and/or the like.

I/O subsystem 2108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2100 may comprise a storage subsystem 2118 that comprises software elements, shown as being currently located within a system memory 2110. System memory 2110 may store program instructions that are loadable and executable on processing unit 2104, as well as data generated during the execution of these programs.

Depending on the configuration and type of computer system 2100, system memory 2110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2104. In some implementations, system memory 2110 may include multiple different types of memory, such as static random access memory (SRAM) or dynamic random access memory (DRAM). In some implementations, a basic input/output system (BIOS), containing the basic routines that help to transfer information between elements within computer system 2100, such as during start-up, may typically be stored in the ROM. By way of example, and not limitation, system memory 2110 also illustrates application programs 2112, which may include client applications, Web browsers, mid-tier applications, relational database management systems (RDBMS), etc., program data 2114, and an operating system 2116. By way of example, operating system 2116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2118 may also provide a tangible computer-readable storage medium for storing the basic programming and data constructs that provide the functionality of some aspects. Software (programs, code modules, instructions) that when executed by a processor provide the functionality described above may be stored in storage subsystem 2118. These software modules or instructions may be executed by processing unit 2104. Storage subsystem 2118 may also provide a repository for storing data used in accordance with the present invention.

Storage subsystem 2100 may also include a computer-readable storage media reader 2120 that can further be connected to computer-readable storage media 2122. Together and, optionally, in combination with system memory 2110, computer-readable storage media 2122 may comprehensively represent remote, local, fixed, and/or removable storage devices plus storage media for temporarily and/or more permanently containing, storing, transmitting, and retrieving computer-readable information.

Computer-readable storage media 2122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 2100.

By way of example, computer-readable storage media 2122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2122 may include, but is not limited to, Zip® drives, flash memory cards, universal serial bus (USB) flash drives, secure digital (SD) cards, DVD disks, digital video tape, and the like. Computer-readable storage media 2122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2100.

Communications subsystem 2124 provides an interface to other computer systems and networks. Communications subsystem 2124 serves as an interface for receiving data from and transmitting data to other systems from computer system 2100. For example, communications subsystem 2124 may enable computer system 2100 to connect to one or more devices via the Internet. In some aspects, communications subsystem 2124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 2124 can provide wired network connectivity (e.g., Ethernet) in addition to or instead of a wireless interface.

In some aspects, communications subsystem 2124 may also receive input communication in the form of structured and/or unstructured data feeds 2126, event streams 2128, event updates 2121, and the like on behalf of one or more users who may use computer system 2100.

By way of example, communications subsystem 2124 may be configured to receive unstructured data feeds 2126 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 2124 may also be configured to receive data in the form of continuous data streams, which may include event streams 2128 of real-time events and/or event updates 2121, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2124 may also be configured to output the structured and/or unstructured data feeds 2126, event streams 2128, event updates 2121, and the like to one or more databases that may be in communication with one or more streaming data source computers coupled to computer system 2100.

Computer system 2100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method for managing a session of dialogue with an autonomous agent, the method comprising:
    generating, from a question sentence comprising text, a question communicative discourse tree that represents rhetorical relationships between elementary discourse units in the text, at least one of the elementary discourse units comprising a verb and a plurality of words, wherein generating the question communicative discourse tree comprises:
        generating, from the text, a discourse tree that represents rhetorical relationships between the elementary discourse units, wherein the discourse tree comprises nodes, each nonterminal node of the nodes representing a rhetorical relationship between two of the elementary discourse units, and each terminal node of the nodes is associated with one of the elementary discourse units;
        accessing a plurality of verb signatures, wherein each verb signature comprises the verb of the respective elementary discourse unit and a sequence of thematic roles, wherein thematic roles describe a relationship between the verb and related words;
        determining, for each verb signature of the plurality of verb signatures, a plurality of thematic roles of the respective signature that match a role of a word in the respective elementary discourse unit;
        selecting a particular verb signature from the plurality of verb signatures based on the particular verb signature comprising a highest number of matches; and
        associating the particular verb signature with the respective elementary discourse unit;
    identifying a question sub-communicative discourse tree from the question communicative discourse tree, wherein the question sub-communicative discourse tree comprises at least one of the elementary discourse units having a corresponding verb signature and represents a sub-question;
    accessing a plurality of candidate answers, each candidate answer comprising a plurality of elementary discourse units;
    generating, for each candidate answer of a plurality of candidate answers, a candidate answer communicative discourse tree that represents rhetorical relationships between elementary discourse units in the respective candidate answer;
    for each candidate answer, computing a level of rhetorical agreement between the question sub-communicative discourse tree and the respective candidate answer communicative discourse tree, the computing comprising:
        pairing the question sub-communicative discourse tree and the respective candidate answer discourse tree;
        applying a classification model to the paired tree; and
        receiving, from the classification model, the computed level of rhetorical agreement;
    selecting an answer from the candidate answers based on the computed level of rhetorical agreement; and
    providing the selected answer to a user device.

2. The method of claim 1, wherein identifying the question sub-communicative discourse tree further comprises identifying a rhetorical relation that is (i) not joint and (ii) not elaboration.

3. The method of claim 1, wherein accessing a plurality of candidate answers comprises searching for keyword matches derived from elementary discourse units of the question communicative discourse tree against (i) a database of a discourse corpus, (ii) a database of a keyword corpus, or (iii) past utterances received.

4. The method of claim 3, further comprising:
    selecting an additional answer from the candidate answers based on an additional computed rhetorical agreement;

providing the additional answer to the user device;
receiving, from the user device, an indication of a preferred answer of the selected answer and the additional answer; and
performing an additional search for keyword matches.

5. The method of claim 3, further comprising:
requesting clarification from a user of the question sentence based on a keyword search;
generating a new sub-communicative discourse tree from the clarification; and
providing the new sub-communicative discourse tree and an additional candidate answer discourse tree to the classification model.

6. The method of claim 1, wherein the rhetorical relationships include a contrast, a solution, a motivation, a background information, an evidence, an antithesis, an emphasis of an attitude or a belief, a purpose, a temporal circumstance, a spatial circumstance, or a situational circumstance.

7. The method of claim 1, wherein the classification model is a nearest neighbor model or a tree-kernel learning model.

8. The method of claim 1 wherein selecting the answer from the plurality of candidate answers comprises ranking the candidate answer communicative discourse trees and selecting a candidate answer associated with a highest ranked communicative discourse tree.

9. The method of claim 8, wherein the ranking is determined by an answer popularity of past searches, a searching rank learned by a search engine on a basis of a number of searches for a same user or a same type of query.

10. A system for managing a session of dialogue with an autonomous agent, the system comprising:
a non-transitory computer-readable medium storing computer-executable program instructions; and
a processing device communicatively coupled to the non-transitory computer-readable medium for executing the computer-executable program instructions, wherein executing the computer-executable program instructions configures the processing device to perform operations comprising:
generating, from a question sentence comprising text, a question communicative discourse tree that represents rhetorical relationships between elementary discourse units in the text, at least one of the elementary discourse units comprising a verb and a plurality of words, wherein generating the question communicative discourse tree comprises:
generating, from the text, a discourse tree that represents rhetorical relationships between the elementary discourse units, wherein the discourse tree comprises nodes, each nonterminal node of the nodes representing a rhetorical relationship between two of the elementary discourse units, and each terminal node of the nodes is associated with one of the elementary discourse units;
accessing a plurality of verb signatures, wherein each verb signature comprises the verb of the respective elementary discourse unit and a sequence of thematic roles, wherein thematic roles describe a relationship between the verb and related words;
determining, for each verb signature of the plurality of verb signatures, a plurality of thematic roles of the respective signature that match a role of a word in the respective elementary discourse unit;
selecting a particular verb signature from the plurality of verb signatures based on the particular verb signature comprising a highest number of matches; and
associating the particular verb signature with the respective elementary discourse unit;
identifying a question sub-communicative discourse tree from the question communicative discourse tree, wherein the question sub-communicative discourse tree comprises at least one of the elementary discourse units having a corresponding verb signature and represents a sub-question;
accessing a plurality of candidate answers, each candidate answer comprising a plurality of elementary discourse units;
generating, for each candidate answer of a plurality of candidate answers, a candidate answer communicative discourse tree that represents rhetorical relationships between elementary discourse units in the respective candidate answer;
for each candidate answer, computing a level of rhetorical agreement between the question sub-communicative discourse tree and the respective candidate answer communicative discourse tree, the computing comprising:
pairing the question sub-communicative discourse tree and the respective candidate answer discourse tree;
applying a classification model to the paired tree; and
receiving, from the classification model, the computed level of rhetorical agreement;
selecting an answer from the candidate answers based on the computed level of rhetorical agreement; and
providing the selected answer to a user device.

11. The system of claim 10, wherein identifying the sub-communicative discourse tree further comprises identifying a rhetorical relation that is (i) not joint and (ii) not elaboration.

12. The system of claim 10, wherein accessing a plurality of candidate answers comprises searching for keyword matches derived from elementary discourse units of the question communicative discourse tree against (i) a database of a discourse corpus, (ii) a database of a keyword corpus, or (iii) past utterances received.

13. The system of claim 12, the operations further comprising:
selecting an additional answer from the candidate answers based on an additional computed rhetorical agreement;
providing the additional answer to the user device;
receiving, from the user device, an indication of a preferred answer of the selected answer and the additional answer; and
performing an additional search for keyword matches.

14. A non-transitory computer-readable storage medium storing computer-executable program instructions, wherein when executed by a processing device, the computer-executable program instructions cause the processing device to perform operations comprising:
generating, from a question sentence comprising text, a question communicative discourse tree that represents rhetorical relationships between elementary discourse units in the text, at least one of the elementary discourse units comprising a verb and a plurality of words, wherein generating the question communicative discourse tree comprises:
generating, from the text, a discourse tree that represents rhetorical relationships between the elementary discourse units, wherein the discourse tree comprises nodes, each nonterminal node of the nodes representing a rhetorical relationship between two of the elementary discourse units, and each terminal node of the nodes is associated with one of the elementary discourse units;

accessing a plurality of verb signatures, wherein each verb signature comprises the verb of the respective elementary discourse unit and a sequence of thematic roles, wherein thematic roles describe a relationship between the verb and related words;

determining, for each verb signature of the plurality of verb signatures, a plurality of thematic roles of the respective signature that match a role of a word in the respective elementary discourse unit;

selecting a particular verb signature from the plurality of verb signatures based on the particular verb signature comprising a highest number of matches; and associating the particular verb signature with the respective elementary discourse unit;

identifying a question sub-communicative discourse tree from the question communicative discourse tree, wherein the question sub-communicative discourse tree comprises at least one of the elementary discourse units having a corresponding verb signature and represents a sub-question;

accessing a plurality of candidate answers, each candidate answer comprising a plurality of elementary discourse units;

generating, for each candidate answer of a plurality of candidate answers, a candidate answer communicative discourse tree that represents rhetorical relationships between elementary discourse units in the respective candidate answer;

for each candidate answer, computing a level of rhetorical agreement between the question sub-communicative discourse tree and the respective candidate answer communicative discourse tree, the computing comprising:
  pairing the question sub-communicative discourse tree and the respective candidate answer discourse tree;
  applying a classification model to the paired tree; and
  receiving, from the classification model, the computed level of rhetorical agreement;

selecting an answer from the candidate answers based on the computed level of rhetorical agreement; and providing the selected answer to a user device.

15. The non-transitory computer-readable storage medium of claim 14, operations further comprising determining the plurality of candidate answers by:
  obtaining, from one or more elementary discourse units of the question communicative discourse tree, one or more keywords; and
  responsive to identifying, in an external database, the one or more keywords, forming one or more of the plurality of candidate answers from the one or more keywords.

16. The non-transitory computer-readable storage medium of claim 14, wherein the classification model uses nearest neighbor learning or tree kernel learning.

\* \* \* \* \*

UNITED STATES PATENT AND TRADEMARK OFFICE
CERTIFICATE OF CORRECTION

PATENT NO. : 11,537,645 B2
APPLICATION NO. : 16/240232
DATED : December 27, 2022
INVENTOR(S) : Boris Galitsky It is certified that error appears in the above-identified patent and that said Letters Patent is hereby corrected as shown below:

On the Title Page

On page 3, Column 1, under Other Publications, Line 8, delete "ofthe" and insert -- of the --, therefor.

On page 3, Column 1, under Other Publications, Line 9, delete "ofthe" and insert -- of the --, therefor.

On page 3, Column 1, under Other Publications, Line 52, delete "ofthe" and insert -- of the --, therefor.

On page 4, Column 1, under Other Publications, Line 7, delete "ofthe" and insert -- of the --, therefor.

On page 4, Column 1, under Other Publications, Line 19, delete "ofthe" and insert -- of the --, therefor.

On page 4, Column 2, under Other Publications, Line 8, delete "ofthe" and insert -- of the --, therefor.

On page 5, Column 2, under Other Publications, Line 14, delete "ofthe" and insert -- of the --, therefor.

On page 6, Column 1, under Other Publications, Line 39, delete "ofthe" and insert -- of the --, therefor.

In the Specification

In Column 30, Line 59, delete "$(E_1, b_1))$" and insert -- $(E_1, b_1))$ --, therefor.

In Column 32, Line 10, delete "$\lambda \Lambda_{j=1}^{nc(n1)}$" and insert -- $\lambda \Pi_{j=1}^{nc(nl)}$ --, therefor.

Signed and Sealed this
Seventeenth Day of October, 2023

Katherine Kelly Vidal
*Director of the United States Patent and Trademark Office*